United States Patent
Cruz et al.

(10) Patent No.: US 12,063,298 B2
(45) Date of Patent: *Aug. 13, 2024

(54) OPTICAL ENCRYPTION TERMINAL, CRYPTOGRAPHY KEY DISTRIBUTION SYSTEM AND METHOD OF GENERATING CRYPTOGRAPHY KEYS IN A CRYPTOGRAPHY KEY DISTRIBUTION SYSTEM

(71) Applicants: CUP Sciences, Inc., Long Beach, CA (US); The University Court of the University of St. Andrews, Fife (GB); King Abdullah University of Science and Technology, Jeddah (SA)

(72) Inventors: Aluizio Cruz, Paramount, CA (US); Andrea Fratalocchi, Jeddah (SA); Valerio Mazzone, Jeddah (SA); Andrea Di Falco, Fife (GB)

(73) Assignees: CUP Sciences, Inc., Long Beach, CA (US); The University Court of the Unversity of St. Andrews, Fife (GB); King Abdullah University of Science and Technology, Thuwal (SA)

( * ) Notice: Subject to any disclaimer, the term of this patent is extended or adjusted under 35 U.S.C. 154(b) by 356 days.

This patent is subject to a terminal disclaimer.

(21) Appl. No.: 17/275,932

(22) PCT Filed: Sep. 16, 2019

(86) PCT No.: PCT/EP2019/074746
§ 371 (c)(1),
(2) Date: Mar. 12, 2021

(87) PCT Pub. No.: WO2020/053448
PCT Pub. Date: Mar. 19, 2020

(65) Prior Publication Data
US 2022/0166613 A1 May 26, 2022

Related U.S. Application Data

(63) Continuation-in-part of application No. 16/132,017, filed on Sep. 14, 2018, now Pat. No. 11,240,015.

(51) Int. Cl.
*H04L 9/08* (2006.01)

(52) U.S. Cl.
CPC .......... *H04L 9/0858* (2013.01); *H04L 9/0825* (2013.01); *H04L 9/083* (2013.01); *H04L 9/0866* (2013.01)

(58) Field of Classification Search
CPC ..... H04L 9/0858; H04L 9/083; H04L 9/0838; H04L 9/0866; G01N 21/47; G02B 6/4293
See application file for complete search history.

(56) References Cited

U.S. PATENT DOCUMENTS 6,810,407 B1 * 10/2004 Jaques ................ G02F 1/3517
                                                              708/801
8,433,067 B2 * 4/2013 Nakagata ................ G09C 5/00
                                                              380/205

(Continued)

OTHER PUBLICATIONS

International Search Report and Written Opinion in Application No. PCT/EP2019/074746, dated Dec. 3, 2019, in 11 pages.

(Continued)

*Primary Examiner* — Mohammed Waliullah
(74) *Attorney, Agent, or Firm* — Knobbe, Martens, Olson & Bear, LLP

(57) ABSTRACT

An optical encryption terminal for generating and distributing a cryptographic key signal in a cryptography key distribution system having at least two optical encryption terminals. The optical encryption terminal comprises an electronic processing unit and the optical encryption terminal is configured to selectively receive optical input signals generated by a source of electromagnetic radiation and optical input signals generated by a further optical encryption terminal, and to selectively output first optical output signals to a detection element and second optical output signals to the further optical encryption terminal, wherein the first optical output signals are based on the optical input signals generated by the further optical encryption terminal and transformed in accordance with an optical encryption pattern provided at the optical encryption terminal.

19 Claims, 26 Drawing Sheets

(56) References Cited

U.S. PATENT DOCUMENTS

| | | | | |
|---|---|---|---|---|
| 2010/0272259 A1* | 10/2010 | Kim | .................. | H04L 63/162 380/256 |
| 2011/0058225 A1* | 3/2011 | Lee | .................. | H04N 1/444 358/3.28 |
| 2020/0177376 A1 | 6/2020 | Cruz et al. | | |

OTHER PUBLICATIONS

Mazzone, Valerio, et al., "Ultra-fast secure communication with complex systems in classical channels (Conference Presentation)," Abstract, Proceedings of SPIE, ISSN 0277-786X vol. 10524, SPIE, US, vol. 10108, Apr. 28, 2017, 101080R, XP060088396, ISBN: 978-1-5106-1533-5, 1 page.

Mazzone, Valerio, et al.: "Ultra-fast secure communication with complex systems in classical channels", XP055644938, DOI: 10.1117/12.2251940; URL:http://dx.doi.org/10.1117/12.2251940.5393348501001; [retrieved on Nov. 21, 2019], 9 pages.

Menezes, Alfred J., et al., "Handbook of Applied Cryptography", Jan. 1, 1997, pp. 20, 21, 192, 193, 394, 395, 535, CRC Press Series on Discrete Mathematics and its Applications, CRC Press, Boca Raton, FL, XP002519947, ISBN: 978-0-8493-8523-0, 7 pages.

\* cited by examiner

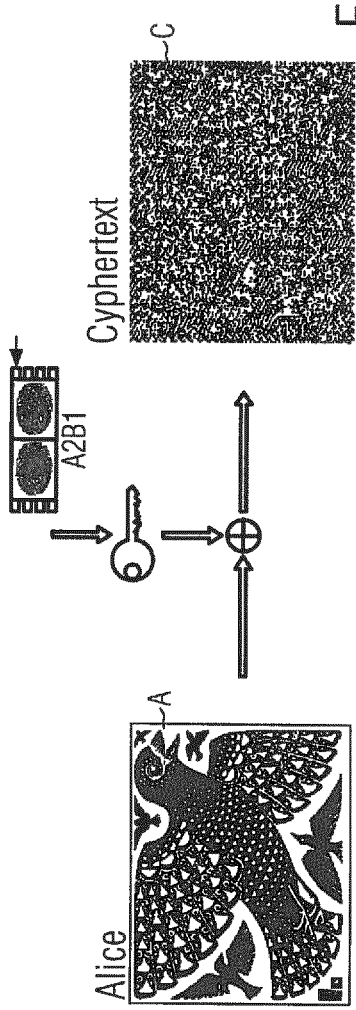
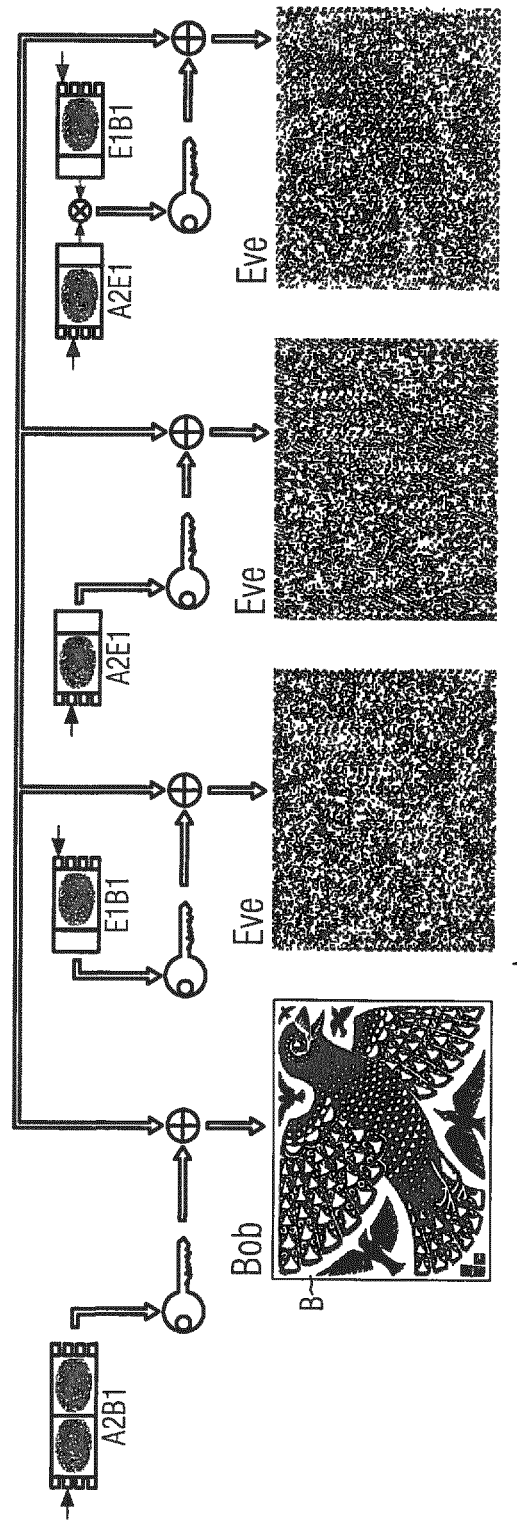
FIG. 8a
FIG. 8b
FIG. 8c
FIG. 8d

OPTICAL ENCRYPTION TERMINAL, CRYPTOGRAPHY KEY DISTRIBUTION SYSTEM AND METHOD OF GENERATING CRYPTOGRAPHY KEYS IN A CRYPTOGRAPHY KEY DISTRIBUTION SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

The present invention generally relates to optical encryption and, particularly, to generation and distribution of cryptographic key signals in cryptography key distribution systems. In some aspects, the present inventions relates to perfect secrecy cryptography via correlated mixing of chaotic waves in irreversible time-varying silicon chips.

Cryptography is the study of techniques for developing secure communications in the presence of third parties, known as adversaries. Generally, cryptographic schemes show two main components: a message to be sent and a cipher representing an algorithm that is applied and inverted to encode and decode the message, respectively.

Modern cryptographic techniques are based on ciphers that are increasingly difficult to invert without a key, which represents additional information in the form of a string of characters and/or numbers that has to be possessed by both parties sharing encrypted information.

With advancing digitalization in many fields of the everyday life employing digital data (i.e. the internet, and the Internet of Things IoT) as an increasingly dominant element of communication and commerce between different parties, devices and objects, there is a constant need for reliable tools which allow different parties to exchange sensitive information without being intercepted by third parties. Obviously, a keyed communication between two parties can only be considered secure as long as the cipher is only and exclusively known to the parties in communication. Furthermore, as the key must be known to the parties in communication beforehand, the key must be distributed among the parties in the communication in a secure manner without giving third parties (i.e., at least one eavesdropper) the opportunity to intercept a distributed key.

It is therefore an object to provide parties (individual users, computers, personal electronic devices, networked objects and appliances) with means for generating and distributing encryption keys that cannot be cloned or intercepted by any type of eavesdropper.

The above described problems and objects are solved in a first aspect of the present invention by an optical encryption terminal for generating and distributing a cryptographic key signal in a cryptography key distribution system, wherein the cryptography key distribution system has at least two optical encryption terminals. In accordance with some illustrative embodiments of the present invention, the optical encryption terminal comprises an electronic processing unit, wherein the optical encryption terminal is configured to selectively receive first optical input signals generated by a source of electromagnetic radiation and second optical input signals generated by a further optical encryption terminal, and to selectively output first optical output signals to a detection element and second optical output signals to the further optical encryption terminal, the first optical output signals being based on the second optical input signals being transformed in accordance with an optical encryption pattern provided at the optical encryption terminal. Furthermore, the optical encryption terminal is configured to determine, using the electronic processing unit, a cryptographic key signal on the basis of at least one radiometric and/or photometric quantity associated with the first optical output signals detected by the detection element.

In a second aspect of the present invention, a cryptography key distribution system is provided, comprising: a first optical encryption terminal configured to transform optical input signals into optical output signals in accordance with a first optical encryption pattern provided at the first optical encryption terminal; a second optical encryption terminal configured to transform optical input signals into optical output signals in accordance with a second optical encryption pattern provided at the second optical encryption terminal, the first and second optical encryption terminals being optically coupled so as to mutually exchange optical output signals; a first source of electromagnetic radiation configured to provide the first optical encryption terminal with first input signals of electromagnetic radiation; a second source of electromagnetic radiation configured to provide the second optical encryption terminal with second input signals of electromagnetic radiation; a first detection element configured to detect at least one first radiometric and/or photometric quantity associated with first optical output signals of the first optical encryption terminal, the first optical output signals being based on the second input signals being successively transformed by the second and first optical encryption terminals; a second detection element configured to detect at least one second radiometric and/or photometric quantity associated with second optical output signals of the second optical encryption terminal, the second optical output signals being based on the first input signals being successively transformed by the first and second optical encryption terminals; a first electronic processing unit coupled to the first detection element, the first electronic processing unit being configured to determine a first cryptographic key signal on the basis of at least one first radiometric and/or photometric quantity detected by the first detection element; and a second electronic processing unit coupled to the second detection element, the second electronic processing unit being configured to determine a second cryptographic key signal on the basis of at least one second radiometric and/or photometric quantity detected by the second detection element.

In a third aspect of the present invention, a method of generating cryptographic key in a cryptography key distribution system having a first optical encryption terminal and a second optical encryption terminal is provided, the method comprising: providing the first optical encryption terminal with electromagnetic radiation of a first source of electromagnetic radiation as first optical input signals, transforming the first optical input signals into first optical output signals in accordance with a first optical encryption pattern formed at the first optical encryption terminal, providing the second optical encryption terminal with the first optical output signals as second optical input signals, transforming the second optical input signals into second optical output signals in accordance with a second optical encryption pattern formed at the second optical encryption terminal, detecting at least one first radiometric and/or photometric quantity associated with the second optical output signals, and determining a first cryptographic key on the basis of the at least one detected first radiometric and/or photometric quantity.

Referring to the above described first to third aspects of the present disclosure, some illustrative embodiments of the present disclosure will be described in greater detail.

After a complete lecture of the present disclosure, the person skilled in the art will appreciate that the optical encryption terminal of the first aspect may allow for generating and distributing a cryptographic key signal in a cryptography key distribution system between two optical encryption terminals where, on the basis of optical signals exchanged between the two optical encryption terminals of the cryptography key distribution system, a cryptographic key is generated and shared between two parties in communication via the optical encryption terminals. Herein, the generated and shared cryptographic key may be completely generated only after a signal is subjected to the action of the optical encryption terminals in communication. Accordingly, an eavesdropper may not intercept the cryptographic key that is not completely generated in a communication path between the two communicating parties. It is only the combined action of two optical encryption terminals in optical communication on the basis of which the complete cryptographic key signal may be determined.

In accordance with some illustrative embodiments of the first aspect, the optical encryption pattern may comprise a plurality of regions of a first material randomly arranged in a second material, wherein the first and second materials differ in at least one optical characteristic from each other.

Accordingly, an optical encryption of exchanged optical signals may be provided, increasing the level of security of cryptographic key signals to be generated and distributed in a cryptography key distribution system employing at least two optical encryption terminals of the first aspect.

In accordance with some further advantageous examples herein, the first material may have a greater absorptive and/or transmissive and/or diffractive characteristic with regard to the electromagnetic radiation than the second material.

Accordingly, an easy and cheap way of implementing the optical encryption pattern in the optical encryption terminal may be provided.

In accordance with other advantageous embodiments herein, the plurality of regions of the first material may be arranged in accordance with a predefined pattern, such as a user individual pattern, e.g. a fingerprint of a user of the optical encryption terminal. Accordingly, upon using for instance the fingerprint of a user, a unique optical encryption pattern may be implemented.

In accordance with some other illustrative embodiments of the first aspect, the optical encryption pattern may be formed in a photonic nanostructure.

By means of photonic nanostructures employing random and/or chaotic scattering components, optical encryption patterns for multi-use may be realized in an easy and inexpensive way. Alternatively, optical encryption patterns for single use may be, for example, realized by temporary scattering components, that is, scattering components that maintain a certain scattering behavior only for a certain time interval long enough that a single cryptographic key may be generated at each of the first and second encryption terminals, i.e., a time scale on which electromagnetic radiation travels back and forth between the first and second encryption terminals.

In accordance with some advantageous embodiments herein, the photonic nanostructures may for example be realized in silicon on insulator technology, where light is confined on the plane of the chip via total internal reflection. In accordance with some special illustrative examples, the scattering components may be obtained by drilling holes in the silicon top layer, with diameters comprised between 0.1*lambda and lambda, where lambda is the wavelength of light in the medium (e.g. in the C and L band, i.e. wavelength range from 1530 nm to 1625 nm). The top surface of the chip and the holes can be left uncoated, or coated with other materials, like polymers (e.g. PMMA, SU8) or dielectric layers (e.g. $SiO_2$) for robustness and packaging requirements. Other embodiments can be realized in random scattering materials, including high refractive contrast semiconductors (e.g. including also GaAs, GaP, $Si_3N_4$, InP, etc.), treated to scatter light randomly in or out of the plane of the chip, or colloidal solutions of strongly scattering particles with dimensions comprised between 0.1*lambda and lambda (e.g. particles made of metal, alumina, TiO2, silicon, etc.) in a polymeric matrix (e.g. PMMA, Polymide, SU8, PDMS, etc.). Additionally, or alternatively, the optical encryption pattern can be realized in biomaterials or by using directly human interfaces, such as, e.g., human fingerprints or retinas.

With regard to the second aspect, the accordingly provided cryptography key distribution system may allow for generating and distributing cryptographic key signals between first and second optical encryption terminals where, on the basis of optical signals exchanged between the first and second optical encryption terminals of the cryptography key distribution system, first and second cryptographic key signals are generated and shared between two parties in communication via the first and second optical encryption terminals. Herein, the generated and shared first and second cryptographic key signals may be completely generated only after a signal is subjected to the action of both, the first and second optical encryption terminals in communication. Accordingly, an eavesdropper may not intercept the first and second cryptographic key signals which may only be determined after the combined action of first and second optical encryption terminals in optical communication is known.

In accordance with some illustrative embodiments of the second aspect, each of the first and second optical encryption patterns may comprise a plurality of regions of a first material arranged in a second material in accordance with a predefined pattern, wherein the first and second materials differ in at least one optical characteristic from each other.

Accordingly, an optical encryption of exchanged optical signals may be provided, increasing the level of security of cryptographic key signals to be generated and distributed in the cryptography key distribution system.

In accordance with some further advantageous examples herein, the first material may have a greater absorptive and/or transmissive and/or diffractive characteristic with regard to the electromagnetic radiation than the second material.

Accordingly, an easy and cheap way of implementing the first and second optical encryption patterns may be provided.

In accordance with other advantageous embodiments herein, the plurality of regions of the first material may be arranged in accordance with a fingerprint of a user of the first or second optical encryption terminals.

Accordingly, upon using the fingerprint of a user, a unique optical encryption pattern may be implemented.

In accordance with some other illustrative embodiments of the second aspect, each of the first and second optical encryption patterns may be formed in a photonic nano structure.

By means of photonic nanostructures, each of the first and second optical encryption patterns may be realized in an easy and inexpensive way.

In accordance with some advantageous embodiments herein, the photonic nanostructures may for example be realized in silicon on insulator technology, where light is confined on the plane of the chip via total internal reflection. The scattering components are obtained by drilling holes in the silicon top layer, with diameters comprised between 0.1*lambda and lambda, where lambda is the wavelength of light in the medium. The top surface of the chip and the holes can be left uncoated, or coated with other materials, like polymers (e.g. PMMA, SU8) or dielectric layers (e.g. SiO2) for robustness and packaging requirements. Other embodiments can be realized in random scattering materials, including high refractive contrast semiconductors (e.g. including also GaAs, GaP, Si3N4, InP, etc.), treated to scatter light randomly in or out of the plane of the chip, or colloidal solutions of strongly scattering particles with dimensions comprised between 0.1*lambda and lambda (e.g. particles made of metal, alumina, TiO2, silicon, etc.) in polymeric matrix (e.g. PMMA, Polymide, SU8, PDMS, etc.). The optical encryption pattern can also be realized in biomaterials or by using directly human interfaces, such as, e.g., human fingerprints or retinas.

With regard to the third aspect, the accordingly provided method may allow for generating cryptographic keys in a cryptography key generation and distribution system, where the first cryptographic key is generated at the first optical encryption terminal on the basis of optical signals exchanged between the first and second optical encryption terminals of the cryptography key distribution system between two parties in communication via the first and second optical encryption terminals. Herein, the generated first cryptographic key may be completely generated only after a signal is subjected to the action of both, the first and second optical encryption terminals in communication. Accordingly, an eavesdropper may not intercept the first cryptographic key which is only determined at the first optical encryption terminal.

In accordance with some illustrative embodiments herein, the method may further comprise: providing the second optical encryption terminal with electromagnetic radiation of a second source of electromagnetic radiation as third optical input signals, transforming the third optical input signals into third optical output signals in accordance with the second optical encryption pattern, providing the first optical encryption terminal with the third optical output signals as fourth optical input signals, transforming the fourth optical input signals into fourth optical output signals in accordance with the first optical encryption pattern, detecting at least one second radiometric and/or photometric quantity associated with the fourth optical output signals, and determining a second cryptographic key on the basis of the at least one detected second radiometric and/or photometric quantity.

In accordance with some advantageous embodiments herein, the first and second cryptographic keys may be identical upon the electromagnetic radiation of the first and second sources of electromagnetic radiations providing identical optical input signals.

The present disclosure will now be described with reference to the attached figures. Various structures, systems and devices are schematically depicted in the drawings for purposes of explanation only and so as to not obscure the present disclosure with details which are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary or customary meaning as understood by those skilled in the art, is intended to be implied by consistent usage of the term or phrase herein. To the extent that a term or phrase is intended to have a special meaning, i.e., a meaning other than that understood by skilled artisans, such a special definition shall be expressively set forth in the specification in a definitional manner that directly and unequivocally provides the special definition for the term or phrase.

Further effects and advantages will be apparent from the following detailed description in combination with the accompanying drawings, wherein:

FIG. 1 schematically illustrates a cryptography key distribution system in accordance with some illustrative embodiments of the present invention;

FIGS. 2a and 2b show process flows of a method of generating and distributing cryptographic keys in a cryptography key distribution system in accordance with some illustrative embodiments of the present invention;

FIG. 3 schematically illustrates an optical encryption terminal in accordance with some illustrative embodiments of the present disclosure;

FIG. 4 schematically illustrates an optical encryption terminal in accordance with some further illustrative embodiments of the present disclosure;

FIG. 5 schematically illustrates a cryptography key distribution system in accordance with some illustrative embodiments of the present disclosure;

FIGS. 6a to 6e schematically illustrate an optical encryption terminal in accordance with some special illustrative embodiments of the present disclosure, together with measurements performed at the optical encryption terminal;

FIG. 7 schematically illustrates an optical encryption terminal in accordance with other illustrative embodiments of the present disclosure;

FIGS. 8a to 8d shows an illustrative process of encrypting and decrypting data in a cryptography key generation and distribution system in accordance with some illustrative embodiments of the present disclosure;

FIG. 9 shows a block representation of a communication system according to the invention; and FIG. 10a shows experimental data illustrating a graph of power density spectra of sources used by Alice and Bob, FIG. 10b shows experimental data illustrating a graph of power density spectrum measured by Alice;

FIG. 10c shows a graph illustrating the relative difference between the spectra measured by Alice and Bob; and FIG. 10d shows a representation of a key resulting from the spectrum of FIG. 10b as a binary square dot matrix;

FIG. 11 schematically illustrates with regard to the illustrations FIG. 11(a) to (c) a Protocol scheme for perfect secrecy key generation on classical channels;

FIG. 12 schematically illustrates with regard to the diagrams in FIG. 12(a) to (f) a protocol security against time-domain and spectral attacks;

FIG. 13 schematically show an integrated fingerprint silicon chip design and chaotic analysis in accordance with some special illustrative embodiments of the present disclosure;

FIG. 14 schematically illustrate a wave analysis of fingerprint chips from FDTD simulations as performed by the inventors; and FIG. 15 illustrates experiments on single fingerprint chips.

FIG. 16 illustrates experiments on key distribution and attacks in the spectral domain.

FIG. 17 illustrates the outcomes of active attacks for different probabilities of $P_{eve}$, normalized with respect to the probability chosen by the users $P_{Alice}$, $P_{Bob}$ to change state after each communication step.

FIG. 18 is a block scheme of the multi-bit AHB transform.

FIG. 19 shows training of the nonlinear AHB transform for generating optimized bit sequences.

FIG. 20 shows probability $P^{(ov)}$ of observing repeated states at the same position in Alice and Bob's sequences as a function of the users probabilities $P^{(Alice)}$ and $P^{(Bob)}$ to change state after each repeated communication.

FIG. 21 shows geometrical calculation of reflected trajectories of an identical input condition impinging two scatterers displaced by $\epsilon(a)$.

FIG. 22 is a block scheme for integrated ultrafast light modulation with on-chip light couplings from end-to-end of the communication line.

FIG. 23 shows power density spectrum $P_s(\omega)$ of the source used by Alice and Bob.

FIG. 24 shows statistical tests on generated keys.

In the following detailed description, at least some illustrative embodiments of the above described first to third aspects of the present disclosure will be described in combination with the Figures in greater detail.

FIG. 1 schematically illustrates a cryptography key distribution system 100 in accordance with some illustrative embodiments of the present disclosure. The cryptography key distribution system 100 comprises a first optical encryption terminal 110A and a second optical encryption terminal 110B, each of which being configured to transform optical input signals into optical output signals.

As depicted in FIG. 1, the first optical encryption terminal 110A may comprise a first optical pad 112A with a first optical encryption pattern 114A that may be provided at the first optical encryption terminal 110A. In accordance with some illustrative examples herein, the first optical encryption pattern 114A may be provided by a first optical scattering and/or diffraction pattern that is provided at the first optical pad 112A. In accordance with some special illustrative examples herein, the first optical encryption pattern 114A may be permanently formed in the optical pad 112A, e.g., the first optical scattering and/or diffraction pattern may be formed in the first optical pad 112A by etching, cutting, scratching, etc. a targeted or desired pattern into the first optical pad 112A. The first optical scattering and/or diffraction pattern may be formed as a photonic nano structure, exemplary fabrication of which is explained above.

Alternatively, the first optical encryption pattern 114A may be temporarily formed during time, the cryptography key distribution system 100 is employed for generating and distributing a cryptographic key. For example, a user of the first optical encryption terminal 110A may temporarily couple the first optical encryption pattern 114A with the first optical encryption terminal 110A at least during the time when at least one cryptographic key is to be generated and/or distributed in the cryptography key distribution system 100. Some illustrative and non-limiting examples of implementations of the first optical encryption pattern will be described with regard to FIGS. 6 and 7 below.

In accordance with some illustrative embodiments of the present disclosure, the second optical encryption terminal 110B may comprise a second optical pad 112B with a second optical encryption pattern 114B that may be provided at the second optical encryption terminal 110B. In accordance with some illustrative examples herein, the second optical encryption pattern 114B may be provided by a second optical scattering and/or diffraction pattern that may be provided at the second optical pad 112B similarly to the first optical encryption pattern 114A at the first optical pad 112A. In accordance with some special illustrative examples herein, the second optical encryption pattern 114B may be permanently formed in the second optical pad 112B, e.g., the second optical scattering and/or diffraction pattern may be formed in the second optical pad 112B by etching, cutting, scratching, etc. a targeted or desired pattern into the second optical pad 112B. Alternatively, the second optical encryption pattern 114B may be temporarily formed at least during the time the cryptography key distribution system 100 is employed for generating and distributing a cryptographic key. For example, a user of the second optical encryption pattern 114B may temporarily couple the second optical encryption pattern 114B with the second optical encryption terminal 110BA at least during the time when at least one cryptographic key is to be generated and/or distributed in the cryptography key distribution system 100. Some illustrative and non-limiting examples of implementations of the second optical encryption pattern 114B will be described with regard to FIGS. 6 and 7 below.

In accordance with some illustrative embodiments of the present disclosure, a first source 120A of electromagnetic radiation may be provided, the first source 120A of electromagnetic radiation being configured to provide first input signals OIS-A of electromagnetic radiation to the first optical pad 112A. In accordance with some illustrative embodiments of the present disclosure, the first source 120A of electromagnetic radiation may be an integral element of the first optical encryption terminal 110A. This does not pose any limitation on the present disclosure and, alternatively, the first source 120A of electromagnetic radiation may be provided as an exterior element with regard to the first optical encryption terminal 110A. For example, the first source 120A may be temporarily coupled to the first optical encryption terminal 110A during the time when at least one cryptographic key is generated in the cryptography key distribution system 100.

In accordance with some illustrative embodiments of the present disclosure, the first input signals OIS-A of electromagnetic radiation output by the first source 120A of electromagnetic radiation may be optically coupled with the first optical pad 112A so as to provide the first input signals OIS-A as optical input signals to the first optical pad 112A. Accordingly, the person skilled in the art will appreciate that the first optical encryption terminal 110A may have at least one input channel (not illustrated) by means of which electromagnetic radiation emitted by the first source 120A of electromagnetic radiation may be optically coupled to the first optical encryption terminal 110A when the first source 120A is not an integral part of the first optical encryption terminal 110A. For example, the first optical pad 112A may have at least one input channel (not illustrated) by means of which electromagnetic radiation emitted by the first source 120A of electromagnetic radiation may be optically input into the first optical pad 112A.

In accordance with some illustrative embodiments of the present invention, a first detection element 130A may be provided, the first detection element 130A being configured to detect at least one first radiometric and/or photometric quantity of first optical output signals OOS-AB that are output by the first optical pad 112A towards the first detection element 130A.

The person skilled in the art will appreciate that a first radiometric quantity may represent a sum of radiation quantities at various wavelengths (A), while a first photometric quantity may be represented by a weighted sum of radiation quantities at various wavelengths, a weighting factor defining a weight of the weighted sum in accordance with photopic or scotopic spectra luminous efficiency functions. Generally, radiometric and/or photometric quantities may be based on at least one of a luminous flux, a luminous intensity, a luminance, and an illuminance of the first optical output signals OOS-AB. Radiometric and photometric quantities are related by the following equation:

$$X_v = X_e * V(\lambda) * K_m,$$

where $X_v$ denotes a photometric quantity, $X_e$ denotes a radiometric quantity, $V(\lambda)$ denotes a spectral luminous efficiency and the factor $K_m$ denotes an efficiency factor, e.g., $K_m$ of red light may be about 6831 m/W, $K_m$ of green light may be about 683.11 m/W, and $K_m$ of blue light may be about 68.31 m/W.

In accordance with some illustrative embodiments of the present invention, the first detection element 130A may be provided as an integral element of the first optical encryption terminal 110A. In accordance with alternative embodiments of the present invention, the first detection element 130A may be an exterior element to the first optical encryption terminal 110A, the first detection element 130A being optically coupled to the first optical encryption terminal 110A so as to receive first optical output signals OOS-AB of the first optical pad 112A and to detect at least one first radiometric and/or photometric quantity associated with the first optical output signals OOS-AB of the first optical pad 112A, the first optical output signals OOS-AB being based on optical input signals which are received by the first optical encryption terminal 112A as optical signals output by the second optical encryption terminal 112B towards the first optical encryption terminal 110A.

In accordance with some illustrative embodiments of the present invention, results of detections of at least one first radiometric and/or photometric quantity obtained by the first detection element 130A may be output as first measurement signals SA to a first electronic processing unit 116A. In accordance with some illustrative examples herein, the first electronic processing unit 116A may be an integral element of the first optical encryption terminal 110A, the first electronic processing unit 116A being configured to determine a first cryptographic key signal keyA on the basis of the at least one first radiometric and/or photometric quantity provided to the first electronic processing unit 116A via the first measurement signals SA.

Now, reference is made to the second optical encryption terminal 110B. In accordance with some illustrative embodiments of the present disclosure, a second source 120B of electromagnetic radiation may be provided, the second source 120B of electromagnetic radiation being configured to provide second input signals OIS-B of electromagnetic radiation to the second optical pad 112B. In accordance with some illustrative embodiments of the present disclosure, the second source 120B of electromagnetic radiation may be an integral element of the second optical encryption terminal 110B. This does not pose any limitation on the present disclosure and, alternatively, the second source 120B of electromagnetic radiation may be provided as an exterior element with regard to the second optical encryption terminal 110B. For example, the second source 120B may be temporarily coupled to the second optical encryption terminal 110B during the time when at least one cryptographic key is generated and/or distributed in the cryptography key distribution system 100.

In accordance with some illustrative embodiments of the present disclosure, the second input signals OIS-B of electromagnetic radiation output by the second source 120B of electromagnetic radiation may be optically coupled with the second optical pad 112B so as to provide the second input signals OIS-B as optical input signals to the second optical pad 112B. Accordingly, the person skilled in the art will appreciate that the second optical encryption terminal 110B may have at least one input channel (not illustrated) by means of which electromagnetic radiation emitted by the second source 120B of electromagnetic radiation may be optically coupled to the second optical encryption terminal 110B when the second source 120B is not an integral part of the second optical encryption terminal 110B. For example, the second optical pad 112B may have at least one input channel (not illustrated) by means of which electromagnetic radiation emitted by the second source 120B of electromagnetic radiation may be optically input into the second optical pad 112B.

In accordance with some illustrative embodiments of the present invention, a second detection element 130B may be provided, the second detection element 130B being configured to detect at least one second radiometric and/or photometric quantity of second optical output signals OOS-BA that are output by the second optical pad 112B towards to the second detection element 130B.

In accordance with some illustrative embodiments of the present disclosure, the first and second detection elements 130A and 130B are of the same type. For example, the first and second detection elements 130A and 130B may have equal resolutions, relative amplitudes, and the like.

The person skilled in the art will appreciate that a second radiometric quantity may represent a sum of radiation quantities at various wavelengths (A), while a second photometric quantity may be represented by a weighted sum of radiation quantities at various wavelengths, a weighting factor defining a weight of the weighted sum in accordance with photopic or scotopic spectra luminous efficiency functions. Generally, radiometric and/or photometric quantities may be based on at least one of a luminous flux, a luminous intensity, a luminance, and an illuminance of the second optical output signals OOS-BA.

In accordance with some illustrative embodiments of the present invention, the second detection element 130B may be provided as an integral element of the second optical encryption terminal 110B. In accordance with alternative embodiments of the present invention, the second detection element 130B may be an exterior element to the second optical encryption terminal 110B, the second detection element 130B being optically coupled to the second optical encryption terminal 110B so as to receive second optical output signals OOS-BA of the second optical pad 112B and to detect at least one second radiometric and/or photometric quantity associated with the second optical output signals OOS-BA of the second optical pad 112B, the second optical output signals OOS-BA being based on optical input signals which are received by the second optical encryption terminal 112B as optical signals output by the first optical encryption terminal 112A towards the second optical encryption terminal 110B.

In accordance with some illustrative embodiments of the present invention, results of detections of at least a second radiometric and/or photometric quantity obtained by the second detection element 130B may be output as second measurement signals SB to a second electronic processing unit 116B. In accordance with some illustrative examples herein, the second electronic processing unit 116B may be an integral element of the second optical encryption terminal 110B, the second electronic processing unit 116B being configured to determine a second cryptographic key signal keyB on the basis of the at least one second radiometric and/or photometric quantity provided to the second electronic processing unit 116B via the second measurement signals SB.

After a complete reading of the present disclosure, the person skilled in the art will appreciate that the cryptography key distribution system 100, as depicted in FIG. 1, may comprise the first and second optical encryption terminals 110A, 110B which are optically coupled so as to mutually exchange optical output signals, as it is schematically indicated in FIG. 1 by means of the signals OOS-A and OOS-B. Particularly, electromagnetic radiation as provided by the first source of electromagnetic radiation 120A, may be transformed by the first optical encryption terminal 110A into the optical output signals OOS-A of the first encryption terminal 110A. The optical output signals OOS-A of the first optical encryption terminal 110A may be provided to the second optical encryption terminal 110B as optical input signals which are transformed into optical output signals by the second encryption pattern 114B of the second optical encryption terminal 110B towards the second detection element 130B. Particularly, electromagnetic radiation generated by the first source 120A of electromagnetic radiation may be successively transformed by the first optical encryption pattern 114A of the first optical encryption terminal 112A and the second optical encryption pattern 114B of the second option encryption terminal 112B, prior to being detected by the second detection element 130B.

Furthermore, electromagnetic radiation of the second source 120B of electromagnetic radiation may be detected by the first detection element 130A after being successively transformed by the second optical encryption pattern 114B of the second optical encryption terminal 110B and the first optical encryption pattern 114A of the first option encryption terminal 112A. Accordingly, optical key signals may be exchanged between the first and second optical encryption terminals 112A, 112B, resulting in the exchange of cryptographic key signals keyA and keyB at the first and second optical encryption terminals 110A, 110B.

In accordance with some illustrative and non-limiting examples of the present invention, the first and/or second detection elements may be implemented by means of charge coupled devices (CCDs), photoconductive detectors, such as photodiodes and phototransistors, and the like.

In accordance with some illustrative and non-limiting examples of the present invention, the first and/or second electronic processing units may be implemented by means of a computing device, such as a central processing unit (CPU) and the like.

In accordance with some illustrative and non-limiting examples of the present disclosure, the first and second optical encryption terminals 110A, 110B may be optically coupled by means of at least one optic fiber, e.g., a mono mode fiber, a multi-mode fiber, and the like. For example, an optical fiber may have a core width of 10 micrometers or less, e.g., in a range from about 1 micrometer to about 10 micrometers, such as about 7 micrometers, and a cladding thickness of 125-150 micrometers.

In accordance with some illustrative and non-limiting examples of the present disclosure, the source could either be a broadband signal generated amplifying in the C+L band a diode via amplified spontaneous emission or by a tunable signal frequency laser in the standard telecommunication C+L band.

In accordance with some illustrative and non-limiting examples of the present disclosure, the optical fiber may be directly coupled to at least one of the optical encryption terminals 110A, 110B, that is, collimating optics may be avoided when coupling the optical fiber with at least one of the optical encryption terminals 110A, 110B. In some special illustrative example herein, the at least one of the optical detection elements 130A, 130B may comprise a fiber spectrum analyzer.

In accordance with some illustrative embodiments of the present disclosure, a method of generating a cryptographic key in accordance with some illustrative embodiments of the present disclosure will be described with regard to the cryptography key distribution system 100 of 1 in combination with the process flow depicted in FIG. 2a.

In accordance with some illustrative embodiments herein, the first optical encryption terminal 110A may be provided with electromagnetic radiation of the first source 120A of electromagnetic radiation (c.f. step S210 in FIG. 2a) as first optical input signals OIS-A.

The first optical input signals OIS-A may be transformed into first optical input signals OOS-A in accordance with the first optical encryption pattern 114A, which is formed at the first optical encryption terminal 110A (c.f. S215 in FIG. 2a).

The second optical encryption terminal 110B may be provided with the first optical input signals OOS-A as second optical input signals (c.f. S220 in FIG. 2a). The second optical input signals may be transformed into second optical output signals OOS-BA in accordance with the second optical encryption pattern 114B which is formed at the second optical encryption terminal 110B (c.f. S225 in FIG. 2a).

At least one first radiometric and/or photometric quantity associated with the second optical output signals OOS-BA may be detected by means of the second detection element 130B (c.f. S230 in FIG. 2a).

As schematically illustrated in FIG. 1, the second detection element 130B may provide the detected radiometric and/or photometric quantity or quantities as electronic measurement signals SB to the second electronic processing unit 116B.

The first cryptographic key signal keyB may be determined on the basis of the at least one first radiometric and/or photometric quantity provided to the second processing unit 116B via the electronic measurement signals SB (c.f. S235 in FIG. 2a).

With regard to FIG. 2b, a method of generating another cryptographic key in accordance with some illustrative embodiments of the present disclosure will be described with regard to the cryptography key distribution system 100 of 1 in combination with the process flow depicted in FIG. 2a.

In accordance with some illustrative embodiments of the present disclosure, the second optical pad 112B of the second optical encryption terminal 110B may be provided with electromagnetic radiation of the second source 120B of electromagnetic radiation as third optical input signals OIS-B (c.f. S240 in FIG. 2b).

The third optical input signals may be transformed into third optical output signals OOS-B of the second optical encryption terminal 110B towards the first optical encryption terminal 110A in accordance with the second optical encryption pattern 114B of the second optical encryption terminal 110B (c.f. S245 in FIG. 2b).

The first optical encryption terminal 110A may be provided with the third optical output signals OOS-B of the second optical encryption terminal 110B as fourth input signals to the first optical encryption terminal 110A (c.f. S250 in FIG. 2b).

The fourth optical input signals may be transformed into fourth optical output signals OOS-AB in the first optical encryption terminal 110A in accordance with the first optical encryption pattern 114A (c.f. S255 in FIG. 2b).

The fourth optical output signals OOS-AB of the first optical pad 112A of the first optical encryption terminal 110A may be received by the first detection element 130A and at least one second radiometric and/or photometric quantity associated with the fourth optical output signals OOS-AB may be detected (c.f. S260 in FIG. 2b). On the basis of the at least one second radiometric and/or photometric quantity, electronic measurement signals SA may be output by the first detection element 130A to the first electronic processing unit 116A and a second cryptographic key signal may be determined on the basis of the at least one second radiometric and/or photometric quantity (c.f. S265 in FIG. 2b).

Accordingly, cryptography key signals keyA and keyB may be generated in the cryptography key distribution system 100 at the output of the first and second optical encryption terminals 110A and 110B.

The person skilled in the art will appreciate that the process flows depicted in FIGS. 2a and 2b may be combined such that the key signals keyA and keyB may be determined simultaneously or successively. For example, the key signal keyA may be determined prior to determining the key signal keyB or vice versa.

In accordance with some illustrative embodiments of the present disclosure, the first and third optical input signals OIS-A and OIS-B may be similar, e.g., identical. For example, the first and second source 120A and 120B may emit electromagnetic radiation that is substantially equal, e.g., with regard to an emitted power density spectrum of electromagnetic radiation. Herein, the second and fourth optical output signals OOS-AB and OOS-BA may be identical and the determined cryptography key signals keyA and keyB may be the same. Accordingly, a cryptographic key may be exchanged between the users of the optical encryption terminals 110A and 110B.

With regard to FIG. 3, an optical encryption terminal 312 in accordance with some illustrative embodiments of the present disclosure will be described below in greater detail.

FIG. 3 schematically illustrates, in a schematic block diagrammatic view, the optical encryption terminal 312 for generating and distributing a cryptographic key signal in a cryptography key distribution system (e.g., the cryptography key distribution system 100 as described above with regard to FIG. 1), the cryptography key distribution system having the optical encryption terminal 312 and at least one further optical encryption terminal (not illustrated), wherein the optical encryption terminal 312 comprises an electronic processing unit 324.

In accordance with some illustrative examples, the optical encryption terminal 312 may be configured to selectively receive first optical input signals (indicated by arrows 303 and 308 in FIG. 3, representing optical input signals being generated by a source 348 of electromagnetic radiation) and second optical input signals (indicated by arrow 304 in FIG. 3, representing optical input signals being generated by a further optical encryption terminal (not illustrated)) being optically input into the optical encryption terminal 312 via a first optical input/output port 351).

In accordance with some illustrative embodiments of the present disclosure, the optical encryption terminal 312 may be configured to selectively output optical output signals (indicated by 301 in FIG. 3) to a detection element 363 via a second optical input/output port 350, and to the further optical encryption terminal (not illustrated) via the first optical input/output port 351 as indicated by arrow 305 in FIG. 3. The optical output signals 301 and 305 are based on respective input signals 304 and 302 that are transformed in accordance with an optical encryption pattern 316 provided at the optical encryption terminal 312 similarly to the optical encryption patterns 114A, 114B described above with regard to FIG. 1. The optical output signals 301 output to the detection element 363 are based on the optical input signals 301 generated by the further optical encryption terminal (not illustrated).

Using the electronic processing unit 324, a cryptographic key signal may be determined on the basis of at least one radiometric and/or photometric quantity (similar to the first and second radiometric and/or photometric quantities described above) detected by the detection element 363 and being coupled into the optical encryption terminal 312 via the first optical input/output port 351 and being transformed by the optical encryption pattern 316.

In accordance with some illustrative embodiments of the present disclosure, the optical input signals 303 and 308 may be provided to the second optical input/output port 350 and may be directed to the optical encryption pattern 316 for transforming the optical input signals 303, 308 into optical output signal 305 being output from the first optical input/output port 351 to the further optical encryption terminal (not illustrated).

In accordance with some illustrative embodiments of the present disclosure, a beam splitter 360 may be provided in between the detection element 363 and the second optical input/output port 350 of the optical encryption terminal 312. Alternatively, the beam splitter 360 may be provided as an integral part of the optical encryption terminal in between the second optical input/output port 350 and the optical encryption pattern 316.

In accordance with some illustrative embodiments of the present disclosure, the electromagnetic radiation generated by the source 348 of electromagnetic radiation may be collimated into a collimated beam by means of a collimating optics 361 and directed to the beam splitter 360 by means of a reflecting surface 365. This does not pose any limitation to the present disclosure and the person skilled in the art will appreciate that at least one of the collimating optics 361 and the reflecting element 365 may be optional.

In accordance with some illustrative embodiments of the present disclosure, the beam splitter 360 may be a polarizing beam splitter. In accordance with some special illustrative examples herein, a polarization element 364 may be disposed between the source 348 and the beam splitter 360. Upon selecting an orientation of the polarizing element 364 perpendicular with regard to an orientation of the polarizing beam splitter 360, i.e., electromagnetic radiation passing the polarizing element 364 may be polarized such that the polarized electromagnetic radiation may not pass through the polarizing beam splitter towards the detection element 363. Accordingly, interference between the optical output signals 301 being transformed by the optical encryption pattern 316 at the detection optical element 363 with optical input signals generated by the source 348 is avoided.

A person skilled in the art might appreciate that the encryption terminal schematics depicted in FIG. 3 can be realized with fiber optics technology, where a single mode or multimode fiber is placed after the collimating lens to guide the light energy along the path 361, 301, and the beam splitter 360 is a fiber circulator. The polarization element 364 might be realized by a fiber-based polarization controller.

With regard to FIG. 4, generation and distribution of a cryptographic key signal in an optical encryption terminal 418 (may be similar to at least one of the optical encryption terminals as described above with regard to FIGS. 1 to 3) of a cryptography key distribution system (e.g., the cryptography key distribution system 100 as described above with regard to FIG. 1) is schematically illustrated in a block diagrammatic view.

As schematically depicted in FIG. 4, the optical encryption terminal 418 may comprise an optical encryption pattern 416, a source 420, a detection element 422, and an electronic processing unit 424. In accordance with some illustrative examples herein, the source 420, the detection element 422, the optical encryption pattern 416, and the electronic processing unit 424 may be integrated into the optical encryption terminal 418. Alternatively, at least one of the source 420 and the detection element 422 may be optional and the optical encryption terminal 418 may be configured to couple to the optional and omitted element.

In accordance with some illustrative embodiments of the present disclosure, the source 420 of the optical encryption terminal 418 may generate a signal of electromagnetic radiation 426, including and not limited to, e.g., a Gaussian wave packet and/or a wave packet having a spectrum with a profile of a Lorentz or Cauchy distribution and/or a Voigt profile, having a characteristic width around a center wavelength. The emitted electromagnetic radiation 426 may be emitted along a light path 428 towards the optical encryption pattern 416 before leaving the optical encryption terminal 418 towards a further optical encryption terminal (not illustrated).

In accordance with some illustrative embodiments of the present disclosure, the optical encryption terminal 418 may receive optical input signals from the other optical encryption terminal (not illustrated) that is exposed to the optical encryption pattern 416 along a light path 432 and being directed towards the detection element 422 as optical signals being subjected to the combined effect of the optical encryption pattern 416 of the optical encryption terminal 418 and another optical encryption pattern (not illustrated) of the other optical encryption terminal (not illustrated).

In accordance with some illustrative embodiments of the present disclosure, the detection element 422 of the optical encryption terminal 418 may be configured to determine a power distribution spectrum (p.d.s.) of the received optical signal 430, as schematically indicated by means of the spectrum 434 in FIG. 4. Herein, the power density spectrum (p.d.s. or PDS), or spectral density, $S_{xx}(f)$ of an optical signal $x(t)$ describes the distribution of power into frequency components composing that signal. The p.d.s. is represented as a plot with the frequency on the horizontal axis and the distribution of optical power on the vertical axis.

In accordance with some illustrative but non-limiting embodiments of the present disclosure, the detection element 422 may comprise an optical spectrum analyzer or an optical spectrometer.

In accordance with some illustrative embodiments of the present disclosure, the electronic processing unit 424 may be configured to determine a cryptographic key signal 436 on the basis of the output spectrum 434 detected by the detection element 422. Accordingly, a cryptographic key signal may only be generated after optical signals 430 being subjected to the combined action of the optical encryption pattern 416 and the other optical encryption pattern (not illustrated) of the further optical encryption terminal (not illustrated) is detected.

With regard to FIG. 5, a cryptography key distribution system 510 in accordance with some illustrative embodiments of the present disclosure will be described.

In accordance with some illustrative embodiments herein, the cryptography key distribution system 510 as depicted in FIG. 5 may represent a system for generating and distributing a cryptographic key between two users 512 and 514, particularly, for rendering two identical copies available at the two optical encryption terminals of the users 512 and 514, similarly to the cryptography key distribution system 100 as described above with regard to FIG. 1. The two users 512 and 514 may be separated from each other by an arbitrary distance L, which may be as large as up to 100 kilometers for intra-city networks and larger for inter-city networks. Long distances can be reached with the use of standard telecommunication optical amplifiers. In accordance with some illustrative embodiments of the present disclosure, electromagnetic radiation signals 527a (electromagnetic radiation signals from user 512 to user 514) and 527b (from user 514 to user 512) may be exchanged between the two users 512 and 514, the two signals 527a, 527b being subjected to transformations associated with optical encryption patterns as schematically illustrated by the region 516 representing the combined action of two optical encryption patterns. Each of the users 512 and 514 may have an optical encryption terminal for deriving a cryptographic key from power distribution spectra 518a, 518b as measured at each end, i.e., the user 512 measures a p.d.s. from the electromagnetic radiation 527b, while the user 514 measures the p.d.s. 518b of the electromagnetic radiation 527a. Each of the users 512, 514 may employ an optical encryption terminal as described above to FIGS. 1 to 4.

In accordance with some illustrative embodiments of the present disclosure, a cryptographic key may be determined on the basis of the measured p.d.s. 518a and 518b, respectively. In accordance with an illustrative but not limiting example, each numeric value of the spectrum 518a and 518b may be rendered for extracting an amplitude between zero and one (i.e., the mantissa) and the absolute value of an exponent of the numeric value. Upon, for example, rounding the mantissa to the nearest integer and converting the absolute value of the determined exponent to a binary value, five binary digits may be obtained. For example, in case that a numeric value in the spectrum is measured as the number $2.2*10^{13}$ (in arbitrary units), the mantissa is 0.22, while the absolute value of the exponent is 12. When rounding the mantissa to the nearest integer, "0" is obtained, while converting the absolute value of the exponent into four binary digits, the sequence binary 1100 is obtained. Accordingly, the five bit binary sequence 01100 represents the measured number $2.2*10^{11}$ in arbitrary units, where the last four digits represent a binary representation of the integer number 12, and the first number is the rounded nearest integer to 0.22. Therefore, when assuming, for example, a measurement resolution of 1000 points per 100 nm optical bandwidth (i.e., a resolution of 0.1 nm), a key with a length of 5 kB for each spectrum may be obtained.

Alternatively, a measured spectrum may be partitioned into regions as indicated by broken lines in the spectra 518a and 518b, and from a mean value within each region, a binary digit "1" and "0" may be determined by, for example, comparing the mean value with specific threshold values or rounding a fraction of the mean value relative to a total mean value of all regions to the nearest integer and converting it into a binary digit. Accordingly, a sequence of binary digits, such as "1011" as indicated in FIG. 5, may be obtained by each user 512, 514.

With regard to FIGS. 6a to 6e, an optical encryption terminal in accordance with some illustrative embodiments of the present disclosure will be described and measurements performed by the inventors with regard to the described optical encryption terminal will be presented and discussed.

FIG. 6a schematically illustrates an optical encryption terminal 600 in accordance with some illustrative embodiments of the present disclosure. The optical encryption terminal 600 may comprise an optical pad 610 having an optical encryption pattern 620 formed therein, a plurality of input ports 630 (e.g., four input ports 632, 634, 636 and 638) and an output port 640 (the number of input and output ports is not limited and the person skilled in the art will appreciate that at least one input port and at least one output port may be provided).

In accordance with some illustrative embodiments of the present disclosure, the optical pad 610 may be implemented as a so-called "fingerprint chip", wherein the optical encryption pattern 620 may be realized as an image of a user's fingerprint encoded into a crystal structure. In accordance with some illustrative examples herein, the optical pad 610 may be a photonic nanostructure having implemented therein the optical encryption pattern 620, e.g., as a series of circular holes patterned in the optical pad 610 with a shape in accordance with a user's fingerprint. For example, a digital image of a user's fingerprint may be transferred into a photonic structure via techniques known in the art of photonic nanostructure fabrication, including, and not limited to, electron-beam lithography, nano-imprinting and photo-lithography. The fingerprint chip of the optical encryption terminal 600, as depicted in FIG. 6a, may allow providing a user with an individually customized encryption terminal that is impossible to clone to a sufficient degree of exactness. However, the implementation of the optical encryption pattern 620 as an image of a fingerprint does not pose any limitation on the present disclosure and the person skilled in the art will appreciate that any other pattern may be used for implementing the optical encryption pattern, such as any pattern that is uniquely associated to the user, or any arbitrary pattern, not uniquely linked to a user, such as a random pattern. The user individual pattern can be generated from a user's body characteristic, e.g., a footprint of a user's foot, a print of a user's toe, a print of a user's retina or any other image that a user desires to base the optical encryption pattern 620 on.

Upon employing the optical encryption terminal 600 in a cryptography key distribution system, e.g., any of the cryptography key distribution systems as described above with regard to FIG. 1 to 5, the optical encryption terminal 600 may be coupled to a source (not illustrated in FIG. 6a) of electromagnetic radiation and a detection element (not illustrated in FIG. 6a) via its input ports 630. At the output side, the optical encryption terminal 600 may be optically coupled with another optical encryption terminal (not illustrated) by optically coupling another optical encryption terminal (not illustrated) to the output port 640 in FIG. 6a.

With regard to FIG. 6b, a test setup for performing measurements on the optical encryption terminal 600, as used by the inventors in an actual test setup, will be described.

In tests performed by the inventors, the optical encryption terminal 600 was coupled to a source 650a of electromagnetic radiation and a detection element 652a at the input side 650a, wherein the detection element 652a is coupled to an electronic processing unit 654a for outputting power distribution spectra. The source 656a and detection element 652a were selectively coupled to an input port of the plurality of input ports 630. At the output side 650b, a source 656b, a detection element 652b and an electronic processing unit 654b were optically and electronically coupled with the output port 640 of the optical encryption terminal 600.

With regard to FIG. 6c, obtained power distribution spectra in accordance with four modes indicated by a, b, c and d in FIG. 6c are measured on the output side 650b, particularly as obtained by the electronic processing unit 654b.

With regard to FIG. 6d, power distribution spectra are plotted in accordance with test configurations as indicated by e, f, g and h in FIG. 6d. Particularly, the test configurations a and e represent a mutual exchange between the input side 650a and the output side 650b using the same input/output channels. Similarly, the configurations b and f, c and g and d and h are test configurations in which optical signals are exchanged via corresponding input/output channels. A comparison between FIGS. 6c and 6d reveals that the power distribution spectra corresponding to the test configurations a and e match, whereas the spectra for the configuration b and f match, whereas the configurations for c and g match and in the case of d and h match.

With regard to FIG. 6e, a 2×2 signal exchange arrangement between the configurations a, b, c and d relative to the configurations e, f, g and h is charted, wherein the signals strength from one configuration with regard to the other configurations is depicted. Particularly, the configurations along the diagonal of the two dimensional arrangement is nearly identical within the range of a few percent of the signal strength. Particularly, upon the input side and the output side of the testing arrangement in FIG. 6b employing matching input/output configurations, i.e., a and e, b and f, c and g, and d and h, almost identical power distributions spectra at each side of the optical encryption terminal 600 may be measured.

With regard to FIG. 7, another illustrative embodiment of the present disclosure will be described with regard to the implementation of an optical encryption pattern as a non-permanent optical encryption pattern.

Referring to FIG. 7, an optical encryption terminal 700 is schematically illustrated during operation, the optical encryption terminal 700 having an optical encryption pattern 701 being formed by a user's finger 703 resting on an optical transparent medium, such as a prism 710. A source of electromagnetic radiation 720, e.g., a light emitting diode, laser diode and the like, may emit electromagnetic radiation towards the medium 710, wherein the electromagnetic radiation is reflected and scattered in dependence on the optical encryption pattern 701 which is temporarily formed on the medium 710, particularly as long as the finger 703 rests on the medium 710. The reflected light encoding a scattering and diffraction pattern of the optical encryption pattern 701 is directed to an output optic 730 for optically coupling the optical encryption terminal 700 with another optical encryption terminal (not illustrated) in the manner as described above with regard to the cryptography key distribution system, e.g., the cryptography key distribution system 100 as described with regard to FIG. 1. In this way, each time a user rests his finger on the medium 710, a unique optical encryption pattern 701 may be formed, particularly in a non-repetitive and unclonable manner. In this way, a secure generation and distribution of cryptographic keys may be provided.

In accordance with some illustrative embodiments of the present disclosure, optical encryption terminals may be implemented as integrated fingerprint chips. The person skilled in the art will appreciate that integrated fingerprint chips represent an illustrative implementation of a physical one-time pad that allows creating and distributing cryptographic keys in a cryptography key distribution system employing two integrated fingerprint chips of two communicating users. The person skilled in the art will appreciate that integrated fingerprint chips exploit a complex random scattering of light and create unique physical keys that are impossible to duplicate or clone. The security of exchanged keys in a cryptography key distribution system employing such integrated fingerprint chips is not based on statistical arguments, but relies on the impossibility for a third person to get access to the cryptography key distribution system created by the two different fingerprint chips of the two communicating users. In experiments, the inventors measured that, even using two fingerprint chips that were fabricated under the same experimental conditions, two fingerprint chips having slightly different characteristics are generated which allow generating cryptography keys that are totally different and uncorrelated with each other. Despite of using two fingerprint chips with the same experimental conditions, imperfections are introduced into the fingerprint chips resulting in unique features of each fingerprint chips which guarantees the uniqueness of the key generated by a system of two specific fingerprint chips.

With regard to FIG. 8, a situation is schematically illustrated where the inventors made use of two fingerprint chips communicating via channels A2, B2 for generating and distributing a key which is used by the user "Alice" to encrypt a picture "A". Only upon the second user "Bob" using a key measured by matching channels A to B1, a key for successfully decrypting the cipher text is obtained (c.f. FIG. 8c). With regard to FIG. 8d, unsuccessful attempts of an eavesdropper "Eve" to intercept a communication between "Alice" and "Bob" is illustrated. Therefore, a secure communication between "Alice" and "Bob" is implemented.

In the following, a man in the middle attack performed by the eavesdropper, such as "Eve" in FIG. 8, will be described with reference to FIGS. 9 and 10.

FIG. 9 shows a block representation of a communication system 900 between "Alice" and "Bob" (such as "Alice" and "Bob" in FIG. 8), in an illustrative case where an optical chip 910A of Alice and an optical chip 910B of Bob are connected to a multichannel communication network 920, e.g., a standard multichannel communication network. In accordance with some illustrative and non-limiting examples herein, each channel (e.g., modes of a fiber) of the multichannel communication network 920 may be able to carry information supplied to the communication network 920 by at least one independent source, e.g., at least Alice and Bob.s. For the present discussion of the man in the middle attack, each of the block of the communication system 900 is represented by a transfer function which may be understood as indicating the response to an incoming signal.

Particularly, each of the optical chips 910A and 910B is represented by a respective transfer function $H_{a/b}(\omega)$, while each channel of the multichannel communication network 920 is represented by a transfer function $C_{na/b}(\omega)$, which may be also understood as representing the frequency dependent input-output relationship for signals entering and going out from the respective optical chip 910A, 910B. Furthermore, a source is represented in FIG. 9 by a power density spectrum $|S(\omega)|^2$ and $P_{alice}$, $P_{bob}$ and $P_{a/b}$, respectively, indicate in FIG. 9 a power density spectra measured by Alice, Bob and Eve, respectively.

During each communication between Alice and Bob, the source signal $|S(\omega)|^2$ is first modified by the optical chips of Alice and Bob. The emerging signal is then coupled to different channels and transmitted to the other side, where is then retrieved. The power density spectrum measured by Alice and Bob is:

$$P_{alice/bob}(\omega) = |S(\omega)|^2 \cdot |H_a^{(j)}(\omega)|^2 \cdot |H_b^{(j)}(\omega)|^2 \cdot |C(\omega)|^2, \quad (1)$$

where $|C(\omega)|^2$ is the contribution of the full transmission system, which can be represented as follows:

$$|C(\omega)|^2 = \sum_n |C_{na}(\omega)|^2 \cdot |C_{nb}(\omega)|^2, \quad (2)$$

with $C_{na}(\omega)$ and $C_{nb}(\omega)$ the transfer function of each channel that connects Eve with Alice and Bob. The power density spectrum measured at Eve side, conversely, reads as follows:

$$P_x(\omega) = |S(\omega)|^2 \cdot |H_x^{(j)}(\omega)|^2 \cdot \sum_n |C_{nx}(\omega)|^2, \quad (3)$$

with x=a, b indicating the signal measured by Eve when the communication is initiated by (a) Alice or (b) Bob, respectively. By comparing Eqs. (3) with (1)-(2) we immediately observe that Eve cannot reproduce the power density spectra measured by Alice/Bob, due to the incomplete spectral information on the transmission channel $$\sum_n |C_{nx}(\omega)|^2,$$

which Eve measures without the possibility of determining the full transmission line $C(\omega)$. In fact, in the case where Eve does the product of the acquired spectra $P_e(\omega) = P_a(\omega) \cdot P_b(\omega)$, the information on the transmission system retrieved by Eve is:

$$P_e \propto \sum_n |C_{na}(\omega)|^2 \cdot \sum_m |C_{mb}(\omega)|^2 \neq \sum_n |C_{na}(\omega)|^2 \cdot |C_{nb}(\omega)|^2 = |C(\omega)|^2, \quad (4)$$

which does not represent the contribution of the transmission line $|C(\omega)|^2$ measured by Alice and Bob. In order to reconstruct the function $C(\omega)$ Eve needs to independently measure and store the signal traveling on all the possible channels, extract the transfer function $C_{nx}(\omega)$ of each channel and indirectly reconstruct the channel transfer function $C(\omega)$ from (2). Even with the latest advances in communication data analysis, however, this type of measure is impossible: in a standard optical communication network, there are millions of single-mode fibers, and the user does not know a-priori in which channel the traffic is routed. In the proximity of the user, where there is typically a single line, the information is usually multiplexed in multimode fibers with thousands of modes; and storing in real time the content of information on each channel is not possible. In wireless networks or free-space links, there is an infinite number of channels and paths where electromagnetic waves can travel; and monitoring all of them is impossible.

It should be noted that even in situations when this type of measure could be hypothetically possible, the reconstruction of the information exchanged between Alice and Bob would still be impossible. In a situation when there is a single fiber connecting Alice and Bob and the fiber is single-mode, the product of the power density spectra $P_e(w) = P_a(w) \cdot P_b(w)$ measured by Eve is as follows:

$$P_e = |S(\omega)|^4 \cdot |H_a^{(j)}(\omega)|^2 \cdot |H_b^{(j)}(\omega)|^2 \cdot |C_{1a}(\omega)|^2 \cdot |C_{1b}(\omega)|^2, \quad (5)$$

By comparing Eqs. (5) with Eqs. (1)-(2) in the case of n=1 channel, we immediately observe that the measurements of Eve do not reproduce the signal exchanged between Alice and Bob, due to the power density spectrum of the source $|S(\omega)|^4 \equiv P^2$ (with $P_s = |S(\omega)|^2$ defining the power density spectrum of Alice source), which is present 2 times in all measurements of Eve owing to the bidirectional nature of our communication scheme. The source belongs to Alice and Bob only and is not accessible to Eve. However even in the case where Eve has physical access to the source, she still cannot measure $P_s$. The quantity $P_s$ in the block diagram of Supplementary FIG. 9 is in fact an ideal quantity, which represents the isolated density spectrum of the source when is not connected to any instrument. It is well known that measuring this quantity is impossible: as soon as Eve connects the source to an instrument, in fact, she breaks the isolated nature of the source and introduces in the measure a spectrally varying coupling coefficient, which is not a-priori known and that affect all the results. This problem is the same of measuring the ideal temperature of a body. As soon as a thermometer is put in contact with the body, the temperature of this system changes, and the thermometer reads just an equilibrium temperature between the body and the thermometer and not the real temperature of the body. This type of uncertainty is embedded in the intrinsic nature of our measurements and cannot be avoided.

In order to illustrate this point quantitatively for the communication scheme described above with regard to illustrative embodiments of the present disclosure, the inventor performed experiments, the results of which are illustrated in FIG. 10.

FIG. 10a shows a graph illustrating a power density spectra of sources used by Alice and Bob, measured with the same physical apparatus used by Alice and Bob in the key distribution scheme of the present disclosure. The sources employed by Alice and Bob may substantially have the same power density spectrum. The inventors repeated the measurement over different times and the measurements were observed to be stable.

FIG. 10b shows in log-scale a representative power density spectrum measured at Alice side, and corresponding to the input condition $A_2B_1$. Contrary to the source, the power density spectrum varies over different decades, showing a quite complex oscillatory pattern.

FIG. 10c reports in log-scale the relative difference between the spectra measured by Alice and Bob (indicated in FIG. 10c as $\Delta_{alice-bob}$) and between Alice and Eve (indicated in FIG. 10c as $\Delta_{alice-eve1}$) in the case where Eve tries to reconstruct the spectrum of Alice via normalization $P_{eve} = P_e/P_s$. The spectra are totally different, of more than one order of magnitude. This originates from the fact that what Eve measures is just a representation of the spectrum, with a coupling coefficient between the source and the instrument that is unknown.

However, even in the case where the spectra of Alice and Eve are normalized on their maximum (indicated in FIG. 10c as $\Delta_{alice-eve2}$), their shape is still different in most of their part. This originates from the fact that uncertainties in $P_s$, even if small, are exponentially amplified when the spectra are normalized via $1/P_s$, especially in the points where the amplitudes are small. It is well known that these types of normalizations cannot be practically employed for large bandwidth signals, as the resulting reconstructions are very noisy, especially for strongly oscillating spectra such as the one exchanged between Alice and Bob such as the optical chips 910A and 910B in FIG. 9.

Supplementary FIG. 10d analyzes the effects of the spectral differences between Alice, Bob and Eve on the generated key. The key resulting from the spectrum of FIG. 10b is displayed as a square matrix of zero (black points) and ones (white points) in the top panel of FIG. 10d. As it is visually observed, the generated bits are uncorrelated. The inventors computed statistics with 250 generated keys and obtained a hamming distance (i.e., the percent of different bits) between the keys generated by Alice and Bob of only 5%, while in the case of Eve (also in the case where the spectra are rescaled to the same value), becomes around 50%, which implies the maximum entropy condition where half of the bits are randomly inverted.

The person skilled in the art will appreciate after a lecture of the present disclosure that any cryptography key distribution system of the present disclosure may be implemented in a communication system for providing communication between third party devices and a controller employing a cryptography key distribution system of the present disclosure. In accordance with some illustrative and non-limiting examples, at least one of the first and second sources of electromagnetic radiation may be provided as an opto-electronic converter or modulator integrated in the third-party device. In some special illustrative examples, the communication system may be embedded or implemented in a network of physical devices, vehicles, home appliances and other items embedded with electronics, software, sensors, actuators, and connectivity which enables these objects to connect and exchange data (so-called 'Internet of things' or IoT), wherein each thing is uniquely identifiable through its embedded computing system but is able to inter-operate within the existing Internet infrastructure.

In accordance with some illustrative embodiments of the present disclosure, the above described cryptography key distribution (CKD) system may be applied to a communication system, e.g., an optical communication system. In an illustrative but not limiting example herein, the above described cryptography key distribution system may be integrated in a fiber-optic communication system.

In accordance with some illustrative embodiments herein, keying-based digital modulators, such as frequency-shift keying (FSK), amplitude-shift keying (ASK), quadrature amplitude modulation (QAM) and/or any type of phase shift keying (PSK), may be integrated in the input side and/or output side of at least one of the encryption terminals of the described cryptography distribution system. For example, a digital-to-analog-converter (DAC) means may be arranged so as to transform a transmission sequence which is transmitted to one of the encryption terminals, into an analog waveform, resulting in an electrical signal which may then be optically modulated using by a modulator and transmitted through the internal CKD's analog optical fiber. The CKD may transform the signal into an unbreakable optical image, which may then be opt-electrically converted and further digitally converted using a standard analog-to digital-converter (ADC) means or a differential Pulse Code Modulator system and which may then be re-integrated back into the communication system.

In the following, as an addendum to the preceding disclosure, the present invention will be described in an alternative manner and/or with regard to alternative embodiments. After a complete reading of the present disclosure, the person skilled in the art will understand how the following is related to the above described embodiments and how the alternative embodiments below are to be considered as equivalent to the above described embodiments. For a better understanding of the following discussion, some background of the present invention is presented in a different way when compared to the above description in order to allow a thorough understanding of the present invention and the way it may be practiced by the skilled person.

Now, it will be explained how a perfect secrecy cryptography via correlated mixing of chaotic waves in irreversible time varying silicon chips may be achieved.

Prologue

Protecting confidential data is a major challenge in the internet era. Standard cryptographic techniques are fast and scalable, but they are broken by quantum algorithms. Quantum cryptography is unclonable and more robust, but requires quantum installations that are more expensive, slower, and less scalable than classical optical networks.

A system providing a physical implementation of the alternative embodiments described in greater detail below, to the Vernam cipher by exploiting correlated chaotic wavepackets is provided, wherein these correlated chaotic wavepackets are mixed in inexpensive and CMOS compatible silicon chips that are irreversibly modified in time after and before every communication. Each chip may, for instance, contain a biometric fingerprint of a user of the system and may thus be different for each user. The person skilled in the art will appreciate that these chips may have a capacity to generate 0.1 Tbit of different keys for every communication and for every mm of length of the input channel. The keys generated in accordance with a protocol of the below described alternative embodiments may require the transmission of an amount of data that may be about 1000 times smaller than the length of the message, and may be generated at the distal end of each user without ever being visible in the communication line.

In the more detailed explanations below, it will be theoretically and experimentally demonstrated by work performed by the inventors that, when the chips are changed, none of the keys can be recreated again, not even by the users.

The discussion of the security of this protocol as presented below follows the Kerckhoffs's principle in the case of an ideal attacker who possesses an unlimited technological power, who controls the communication channel, and who accesses the system before or after the communication copying any of its part including the chips. After a complete reading of the present disclosure, the person skilled in the art will appreciate that the second law of thermodynamics and the exponential sensitivity of chaos may unconditionally protect this scheme against any attack. Theory and measurements, the inventors performed with classical telecommunication fibers, and as presented in this context will show that an attacker to this system always lies in a maximum entropy scenario, with uncertainty per bit higher than 0.99 bit: the adversary cannot do better than to guess the message exchanged by the users by best guessing it without having intercepted their communication.

BACKGROUND

With an information society that transfers an increasingly large amount of personal data over public channels, information security is an emerging worldwide challenge. Conventional cryptographic schemes based on data encryption standard (DES), advanced encryption standard (AES) and Rivest, Shamir and Adleman (RSA), encode messages with public and private keys of short length. The main advantage of these algorithms is speed, the main disadvantage is their security, which relies on computational and provable security arguments and not on unconditional proofs. A major threat lies in the development of quantum computers, which are predicted to crack any of these ciphers in a short period of time.

A perfect secrecy cryptography, known as a one-time pad (OTP) was invented at the time of the telegraph and then patented by Vernam. The Vernam cipher encodes the message via a bitwise XOR operation with a random key that is as long as the text to be transmitted, never reused in whole or in part, and kept secret. Shannon demonstrated that this scheme, properly implemented, is unbreakable and does not offer any information to an attacker except the maximum length of the message. Almost a century later, despite its proven absolute security, the OTP is still not adopted in the digital realm for lack of a practical and secure way for users to exchange the key. Since the 80s, research efforts have been dedicated towards solving this problem with point-to-point quantum key distribution (QKD) algorithms, which leverage on the unclonability of single photons. While the progress of QKD in the last decades has been enormous, there are still critical challenges derived by the limits of quantum communications. Due to the impossibility of amplifying single photons, quantum networks are currently unable to scale up globally; their data transfer is considerably slower than classical optical communications, which already count with hundreds of high-bandwidth intercontinental lines, communication speed close to the light limit and massive investments for the next years.

BRIEF SUMMARY

After a complete lecture of the present disclosure, the person skilled in the art will appreciate that the inventors developed a physical implementation of the OTP that is compatible with the existing optical communication infrastructure and offers unconditionally security in the key distribution.

BRIEF DESCRIPTION OF THE DRAWINGS

Alternative embodiments of the present invention will be described and explained below with regard to drawings which are not to scale and in which FIG. 11 schematically illustrates with regard to the illustrations FIG. 11(*a*) to (*c*) a Protocol scheme for perfect secrecy key generation on classical channels.

DETAILED DESCRIPTION

For a better understanding, the Vernam cipher on classical channels will be explained. It is well known that chaos generates time varying signals that are mathematically unpredictable over long times. This originates from the sensitivity to different input conditions: two nearby input states $x(t=0)$ and $x'(0)=x(0)+\varepsilon$, even in the limit of $\varepsilon \to 0$, always originate trajectories with exponentially diverging distance $\Delta(t)=|x(t)-x'(f)|\sim e^{\mu f}$ in time, with $\mu$ the largest Lyapunov coefficient of the flow.

By leveraging on this property, the inventors explain that it is possible to create a bidirectional communication channel in which the users mix independent time-varying chaotic processes, securely exchanging random keys of arbitrary length.

Figure 11:
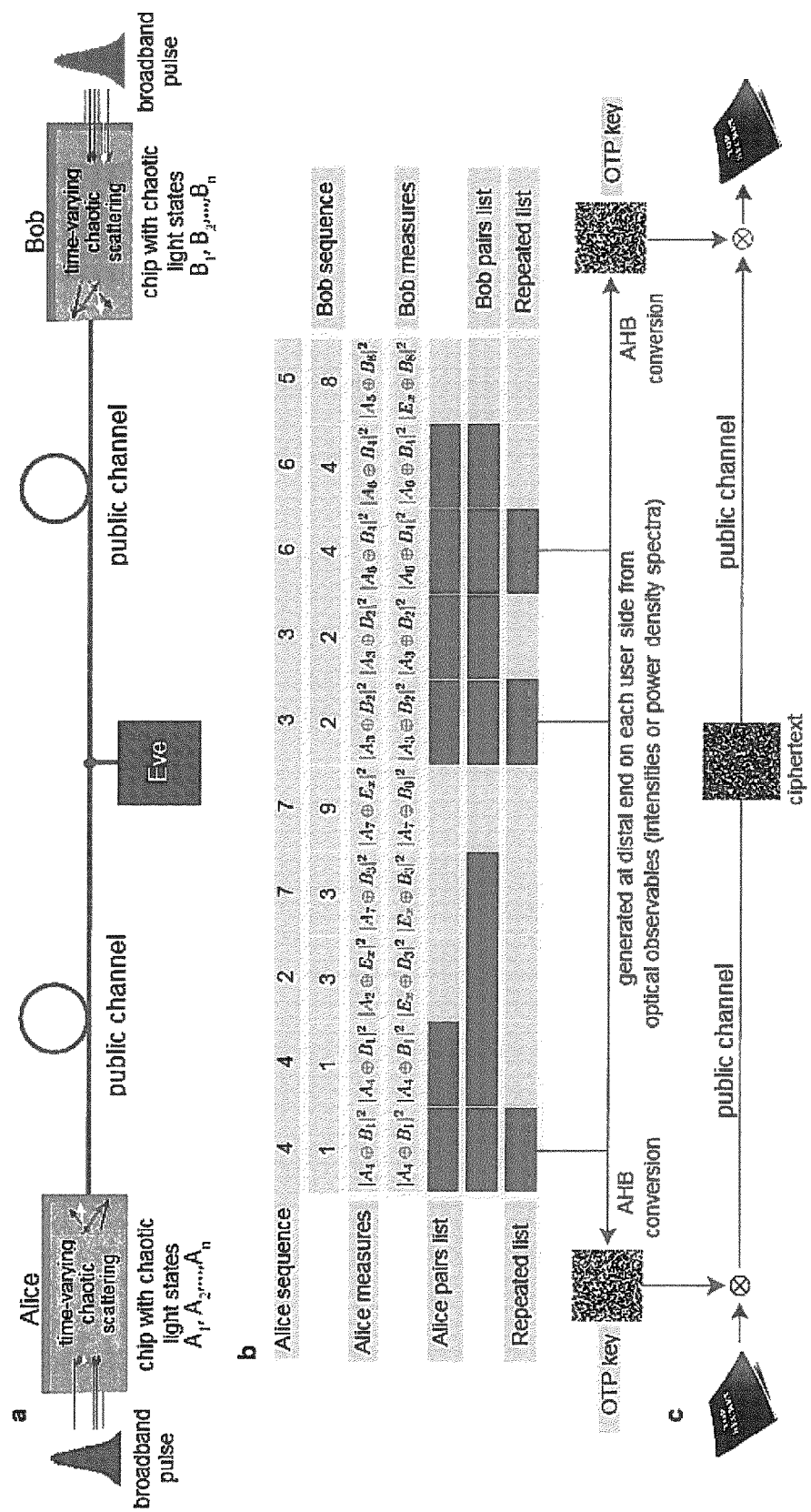

With regard to FIG. 11, a Protocol scheme for perfect secrecy key generation on classical channels is shown. FIG. 11(*a*) shows a communication setup with users Alice and Bob and an attacker Eve, where Alice and Bob participate in a cryptography key distribution system, such as the cryptography key distribution system as described above with regard to FIG. 1 and the description of which is incorporated by reference. FIG. 11(*b*) illustrates communication and key generation steps, wherein Alice and Bob send different chaotic states $A_n$, $B_{n'}$ and always measure correlated mixed chaotic states when Eve does not actively interfere on the channel with additional states $E_x$. In FIG. 11(*c*), an encryption and decryption scheme is schematically illustrated.

In the system shown in FIG. 11(*a*), each of the two users Alice and Bob has an optical encryption terminal for generating and distributing a cryptographic key signal in a cryptography key distribution system with at least two optical encryption terminals, the optical encryption terminal comprising an electronic processing unit, wherein the optical encryption terminal is configured to selectively receive first optical input signals generated by a source of electromagnetic radiation and second optical input signals generated by a further optical encryption terminal, selectively output first optical output signals to a detection element and second optical output signals to the further optical encryption terminal, the first optical output signals being based on the second optical input signals being transformed in accordance with an optical encryption pattern provided at the optical encryption terminal; and determine, using the electronic processing unit, a cryptographic key signal on the basis of at least one radiometric and/or photometric quantity associated with the first optical output signals detected by the detection element. According to some special illustrative examples herein, the optical encryption pattern may comprise a plurality of regions of a first material randomly arranged in a second material, wherein the first and second materials differ in at least one optical characteristic from each other. For example, the first material may have a greater absorptive and/or transmissive and/or diffractive characteristic with regard to the electromagnetic radiation than the second material. Additionally or alternatively, the plurality of regions of the first material may be arranged in accordance with a random and/or chaotic and/or predefined scattering pattern.

In accordance with special illustrative and nonlimiting examples herein, the optical encryption pattern may be implemented by a fingerprint chip. For example, Alice and Bob may possess two chips that generate chaotic light states that are transmitted on a public classical optical channel. Each light state, indicated as $A_n$ for Alice and $B_{n'}$ for Bob, is a random superposition of optical waves at different frequencies:

$$A_n = \sum_m a_{nm} \cos(\omega_m t + \varphi_{nm}), B_n I = \sum_m b_n I_m \cos(\omega_m t + \psi_n I_m), \quad (6)$$

The above equation comprises uncorrelated random amplitudes $a_{nm}$, $b_{n'm}$, and phases $\varphi_{nm}$, $\psi_{n'm}$. The states as expressed by equation (6) are generated from the chaotic scattering of an identical broadband pulse with different frequencies $\omega_1, \ldots \omega_m$, launched inside each chip with diverse input conditions n and n' (position, angle, polarization, time modulation, ...) arbitrarily chosen by Alice and Bob. Being not required to be identical pulses, their differences constitute the main source of uncertainty and set the desired communication bit error rate (BER) in the communication. The scattering system comprises a large number of point scatterers.

For the sake of the present discussion, it is assumed that the chips satisfy the following conditions:

1. The scattering process inside each chip is fully chaotic and any launching condition with light entering the scatterers follows a chaotic dynamics.

2. Alice and Bob's chips are in thermodynamic equilibrium with the environment, with no structural change appreciable for light propagation during the communication of each state.

3. Any modification to the distribution of scatterers inside the chips leads to a new chaotic system with exponentially diverging trajectories with respect to the previous one.

4. The chips are structurally modified in time before and after each communication by two physical irreversible processes (e.g., deformations, addition of scatterers, ... ), chosen and applied independently by Alice and Bob, creating a new chaotic scattering system in which all trajectories are exponentially different from the previous one.

The use of static light scatterers in information security offers computational and probable security in both authentication problems and cryptographic key generation, providing advantages over electronic schemes in terms of volumetric physical data storage vs standard electronic databases.

The security of schemes based on complex scattering structures, however, relies on i) the condition that the physical scattering objects are kept secret to an adversary, and on ii) the assumption that these structures are unfeasible to clone.

However, these arguments do not provide unconditional security. While it was demonstrated in recent work that it is indeed experimentally possible to clone a physically unclonable function, perfect secrecy requires to prove the system security in the limit where the adversary accesses the system before or after the communication, copying all the system's parts (despite how difficult this operation could be). At such, all existing schemes based on classical scatterers do suffer from the same security concerns as in their electronic counterparts and arising from the lack of perfect secrecy.

The person skilled in the art will appreciate that the inventors considered the limit of perfect secrecy without assuming the conditions i) and ii). However, the inventors considered an adversary possessing the technology to clone any type of scattering structure.

Another element of novelty with respect to classical schemes based on physical unclonable function is the absence of the hard requirement to perform a first encounter (or equivalent secure communication) among the users, apart from authentication protocols. This condition makes current classical schemes inferior to QKD, which does not require any initial setup apart from users' authentication. The system here presented, by using a suitably defined time varying complex system, does not require any initial secure communications (apart from authentication) thus providing a classical alternative to QKD. During each step of the communication Alice and Bob randomly choose an input condition n and n', respectively, send light signals in the system, and measure the output at their end as illustrated in FIG. 11(b). After the measurement, Alice and Bob choose (with random probabilities) either to keep the launching condition or to change it. The process is then repeated. Due to the reciprocity of the communication network that connects Alice and Bob, if Eve does not perform an active manipulation of the signal, Alice and Bob measure identical optical observables (intensity, power density spectra, . . . ). For instance, when Alice sends a chaotic wavepacket An to Bob, he measures an optical observable, e.g. the intensity $|A_n \oplus B_{n'}|^2$ associated with the combined light state $A_n \oplus B_{n'}$ ($\oplus$ is the operator that combines the states after the propagation over the channel). In this configuration, when Alice measures the output at her end, she measures the reciprocal state $B_{n'} \oplus A_n$ with different phases but same amplitudes and an identical optical observable $|A_n \oplus B_{n'}|^2 = |B_{n'} \oplus A_n|^2$.

At the conclusion of the chosen sequence, Alice and Bob record all cases of the acquired data that did not change, and communicate this information over the public line, allowing to extract an OTP key by the sequence of overlapping repeated sequences. By using the adapted high boost (AHB) technique, the key is generated by converting the exchanged intensities or power density spectra into binary sequences.

With this protocol, the amount of exchanged data required to generate an OTP key for a message of length $L_m$ is $L_m/N_b$, being $N_b$ the number of bits generated from each transmitted combined state $A_n \oplus B_{n'}$. The exchanged key is then used at each user's end to encode and decode data via bitwise XOR, following the Vernam cipher (FIG. 1c).

The communication protocol described in FIG. 11 can be regarded as a classical version of the original BB84 QKD (Quantum Key Distribution) scheme developed by Bennett and Brassard, in which the scatterers act as generator of random states, and the reciprocal communication line provides correlated measured states.

At variance with classical schemes based on complex scatterers, the protocol here presented does not require first encounter or initial secure communication among the users (apart from authentication) thus providing a classical alternative to QKD.

In the quantum limit, when a user (say Bob), launches a single photon in the chip, the receiver (Alice) measures a photon emerging at a random position from the chip. If Alice injects the photon back in the same scattering channel, the reciprocity theorem of quantum mechanics guarantees that Bob measures the emerging photon in the same input channel he originally used. This process shares some similarities to the quantum BB84 scheme, with scattering channels playing the role of random polarization states. However, there are also differences. In order for the user to exchange the same sequence of bits, they may initially agree on a common dictionary that associates the same string of bit to correlated input-output positions in Alice and Bob's chips. This operation is not required in the classical limit (as the users measure the outcome of large ensemble of photons on all channels) and in the BB84 scheme.

With regard to perfect secrecy of the system, the inventors give the following explanation. Shannon demonstrated that the Vernam cipher has the perfect secret property if: i) the key exchanged is as long as the message, ii) each key is used only once and is uncorrelated to the new one, iii) the key is known only by the users. The scheme of FIG. 11(a) exchanges keys of arbitrary length on a classical optical channel at full speed. It therefore offers a viable implementation of the first requirement.

The covariance matrix $K_{nn'} = \langle A_n A_{n'}' \rangle$ of the correlation among Alice chaotic wavepackets, where the $\langle \ldots \rangle$ denoting averaging over amplitudes and phases, is a delta function:

$$K_{nn'} = \left\langle \sum_{mm'} a_{nm} a_{n'm'} \int dt \, \cos(w_m^t + \phi_{nm}) \cos(w_m^t + \phi_{n'm'}) \right\rangle = \sigma_n^2 \delta_{nn'} \quad (7)$$

with $\sigma_n^2 = K_{nn}$. Equation (7) arises from the fact that amplitudes are uncorrelated, with $\langle a_{nm} a'_{n'm'} \rangle = 0$ for $n \neq n'$ and $m \neq m'$. The same condition holds at Bob's end, with $B_{nn'} I = \langle B_n B_{n'} \rangle = X^2 \delta_{nn'}$.

This implies that both Alice and Bob states are uncorrelated to each other, and keys generated from combined states $A_n \oplus B_n$ are also uncorrelated. Therefore, the protocol designed in FIG. 11 satisfies the second requirement.

With regard to perfect secrecy of the key distribution scheme, the inventors explain as follows, wherein the ideal case (Kerckhoffs's principle) is considered in which the system falls in the hands of the adversary, who knows all the details of the enciphering/deciphering process and has access to the ciphertext. In this case, the only unknowns are the key and the input conditions (including the arbitrary chosen transformations) of the users.

As the system is classical, Eve can store all the signals launched by Alice and Bob during the communication and then she can attempt a search on each user's chip for the input conditions that generated the states she measured. Once Eve knows the input conditions, she can launch the same states and try to recreate the key.

However, the second law of thermodynamics prevents this attack. Every time Alice and Bob changes the chip with an irreversible physical process, they increase the total entropy of the system and the environment, creating new chaotic structures exponentially different from the ones used in the communication (see points 3-4 above). If Eve accesses the system, it is impossible to recreate the initial chips and to perform any search, as this requires reverting the transformation of Alice and Bob with an entropy decrease, thus violating the second law.

Another possibility for Eve is to make an identical copy of the system in all its parts, and attempt the search at the next communication. This task requires Eve to generate the same chaotic scatterers as of Alice and Bob's, so that their transformations are cloned by Eve prior to the communication. As the chips are not isolated systems and are in equilibrium with the environment (see point 2 above), this task requires to replicate the surroundings of Alice and Bob's chips. This condition is essential for enabling Eve's copied chips of Eve to reach the same equilibrium state of the original chips of Alice and Bob's chips. The second principle of thermodynamics makes this condition impossible. Eve, in fact, does not know and cannot replicate the exact time at which Alice and Bob perform their transformations. If Eve does the transformation after Alice or Bob, the environment will be different, as it existed at least one irreversible transformation in time (the one of Alice or Bob) that increased its entropy, and vice-versa if Eve performs the transformation before the users. It will be therefore impossible for Eve to clone the same transformation of Alice and Bob. Due to points 3-4 above, Eve will generate new chaotic scatters that are exponentially different from the ones that Alice or Bob are using and, as such, useless.

The only search possible is a brute force attack on the key. However, as the Vernam cipher holds the perfect secrecy, this attack does not produce any information. This leaves to the attacker just one possibility: extract the key from the information available on the system.

In any possible attack, the data available to an attacker are the observables related to the chaotic wavepackets $A_n$ and $B_n'$ flowing over the communication line. Eve can measure these states and, from the measurements, can attempt to reconstruct Alice and Bob's key. In the analysis below we demonstrate that the outcome is always a key in which each bit has 50% probability of being correct and 50% probability of being wrong, regardless the type of attack employed. This implies perfect secrecy: the a posteriori probabilities of Eve's key representing Alice and Bob's key is identically the same as the a priori probability of guessing Alice and Bob's key before the interception.

In the optical communication scheme of FIG. 11(a), the solely experimental observables related to the chaotic state $A_n$ and $B_n'$ are noninstantaneous quantities in frequency or time, such as power density spectra or intensities, while instantaneous values of amplitude and phase are not observable. This limitation also applies to interferometric detection and time gating, which require periodic signals in time or precise knowledge in advance of the pulse's properties. To measure the instantaneous state of a randomly generated chaotic wavepacket $A_n$ or $B_n'$ that is never replicated and whose shape is unknown, the only possibility is to accelerate electrons at relativistic speed in order to follow the dynamics of photons, but this is impossible as it requires an infinite amount of energy.

Referring to the protocol scheme of FIG. 11, the person skilled in the art will appreciate that generally, a method of generating cryptographic key in a cryptography key distribution system having a first optical encryption terminal and a second optical encryption terminal is implemented, the method comprising: providing the first optical encryption terminal with electromagnetic radiation of a first source of electromagnetic radiation as first optical input signals, transforming the first optical input signals into first optical output signals in accordance with a first optical encryption pattern formed at the first optical encryption terminal, providing the second optical encryption terminal with the first optical output signals as second optical input signals, transforming the second optical input signals into second optical output signals in accordance with a second optical encryption pattern formed at the second optical encryption terminal, detecting at least one first radiometric and/or photometric quantity associated with the second optical output signals, and determining a first cryptographic key on the basis of the at least one detected first radiometric and/or photometric quantity. In accordance with some other illustrative embodiments herein, the first and second optical encryption patterns may be formed in a photonic nano structure, biomaterials or by using directly human interfaces, such as, e.g., human fingerprints or retinas.

In some embodiments, the method may further comprise providing the second optical encryption terminal with electromagnetic radiation of a second source of electromagnetic radiation as third optical input signals, transforming the third optical input signals into third optical output signals in accordance with the second optical encryption pattern, providing the first optical encryption terminal with the third optical output signals as fourth optical input signals, transforming the fourth optical input signals into fourth optical output signals in accordance with the first optical encryption pattern, detecting at least one second radiometric and/or photometric quantity associated with the fourth optical output signals, and determining a second cryptographic key on the basis of the at least one detected second photometric quantity. For example, the first and second cryptographic keys are identical. In accordance with some illustrative embodiments, the first and/or second optical encryption patterns may be modified before and after each communication, wherein the first and/or second optical encryption patterns may be modified by a reversible or irreversible mechanical deformation applied to the first and/or second optical encryption patterns or a droplet of a liquid, e.g., water or any other liquid which contains colloidal occlusions that act as additional scatterers, may be dropped onto at least one of the first and second optical encryption patterns for temporarily or permanently changing optical properties of the at least one of the first and second optical encryption patterns. In this way, a new chaotic scattering system can be temporarily or permanently generated by at least one of Alice and Bob in the scheme of FIG. 11(a).

Regarding security against time domain attacks, the inventors analyzed the limit in which Eve developed a technology to access instantaneous values of intensity. In this context, the inventors considered a scenario independent from the source and channel used, which are set to mathematical Dirac delta $\delta(t)$ with constant spectrum.

In this case, the intensity of the combined state com state $I_{A_n B_n'}(t) = |A_n \oplus B_n'|^2 = |A_n(t) \otimes B_n'(t)|^2$, with $\otimes$ the convolution operator. During each step of the communication, Eve can measure and store the intensities $|A_n(t)|^2$ and $|B_n'(t)|^2$ of transmitted states, and then attempt the reconstruction of the mixed state $|A_n \otimes B_n'|^2$ by combining the states at disposal via $|A_n|^2 \oplus B_n'|^2$, with $\oplus$ a chosen operator. We here considered all the possible cases of $\oplus = +, \cdot, \otimes$ (sum, product, convolution). The outcome of this attack is quantified by the average Shannon information entropy contained in each bit measured by Eve, and calculated from the average Shannon information entropy $H = -d \log_2 d - (1-d) \log_2(1-d)$ per bit, with d the difference in bits between the key of one user (Alice) and the key reconstructed by Eve. The Shannon entropy H quantifies the uncertainty of Eve for every bit measured. When d=0 (Eve measures the same of Alice) or d=1 (Eve measures the opposite of Alice) the information entropy of Eve is zero, because Eve predicts the key exchanged by Alice and Bob with no uncertainty. In the other cases H is a positive function with maximum of H=1. In this condition Eve has 1 bit of uncertainty for every bit measured and zero information on the key.

Referring to FIG. 11, a process of generating a key randomly on the end of at least one of Alice and Bob without exchanging the key over the communication line in a cryptography key distribution system, e.g., the system disclosed with regard to FIG. 1 above, will be described.

Herein, a key may be generated before, after or during each step of a communication between Alice and Bob (see FIG. 11(a)). For example, at least one of Alice and Bob may randomly choose an input condition n and n!, respectively.

In accordance with some illustrative embodiment herein, at least one of the optical encryption terminals of Alice and Bob may have at least two input terminals configured for receiving optical input signals generated by a generated by a source of electromagnetic radiation, and one of the at least two input terminals may be selected and optical input signals may be provided to the the selected optical input terminal.

After a measurement, Alice and/or Bob may choose (with random probabilities) either to keep the launching condition or to change it. The process may then be repeated.

In accordance with some illustrative embodiment herein, in response to measuring an optical signal in response to the optical input signals input via the selected optical input terminal, the selecting of an input terminal and the measuring of optical output signals may be repeated until all input terminals are selected. All cases of measured optical signals may be recorded and the recorded cases may be provided at each of the first and second optical encryption terminals. Accordingly, at both sides of the cryptohraphy key distribution system, all recorded cases may be available and each of Alice and Bob may be able to extract at least one optical signal of the measured optical signals which is identical at the first and second optical encryption terminals. That is, when each of Alice and Bob measure an optical observable (such as intensity, power density spectra etc.) as an optical signal at their respective end in response to an input signal, a reciprocal state with different phases but same amplitudes and an identical optical observable is measured. Therefore, Alice and Bob record all cases of acquired data corresponding to the measured optical signals and data representing measured optical signals matching each other in the recorded cases may be identified and extracted as an extracted optical signal for Alice and Bob.

Based on the chosen input condition, light signals are sent into the system via the optical encryption terminals of Alice and Bob by applying input signals at the optical encryption terminals and output signals are measured as outputs at the optical encryption terminals as outputs of the optical encryption terminals in response to input signals passing through both optical encryption terminals (see FIG. 11(b)). On the basis of the extracted optical signal, a key may be generated at the optical encryption terminals of Alice and Bob, e.g., by using the adapted high boost (AHB) technique, by converting exchanged intensities of power density spectra into binary sequences.

The person skilled in the art will appreciate that, due to the reciprocity of the communication network that connects Alice and Bob, if Eve does not perform an active manipulation of the signal, Alice and Bob measure identical optical observables (intensity, power density spectra, . . . ). For instance, when Alice sends a chaotic wavepacket to Bob, he measures an optical observable, e.g. the intensity associated with the combined light state. In this configuration, when Alice measures the output at her end, she measures the reciprocal state with different phases but same amplitudes and an identical optical observable.

At the conclusion of the chosen sequence, Alice and Bob record all cases of the acquired data that did not change, and communicate this information over the public line, allowing to extract an OTP key by the sequence of overlapping repeated sequences.

By using the adapted high boost (AHB) technique, the key is generated by converting the exchanged intensities or power density spectra into binary sequences.

With this protocol, the amount of exchanged data required to generate an OTP key for a message of length Lm is Lm, being Nb the number of bits generated from each transmitted combined state.

Figure 12:
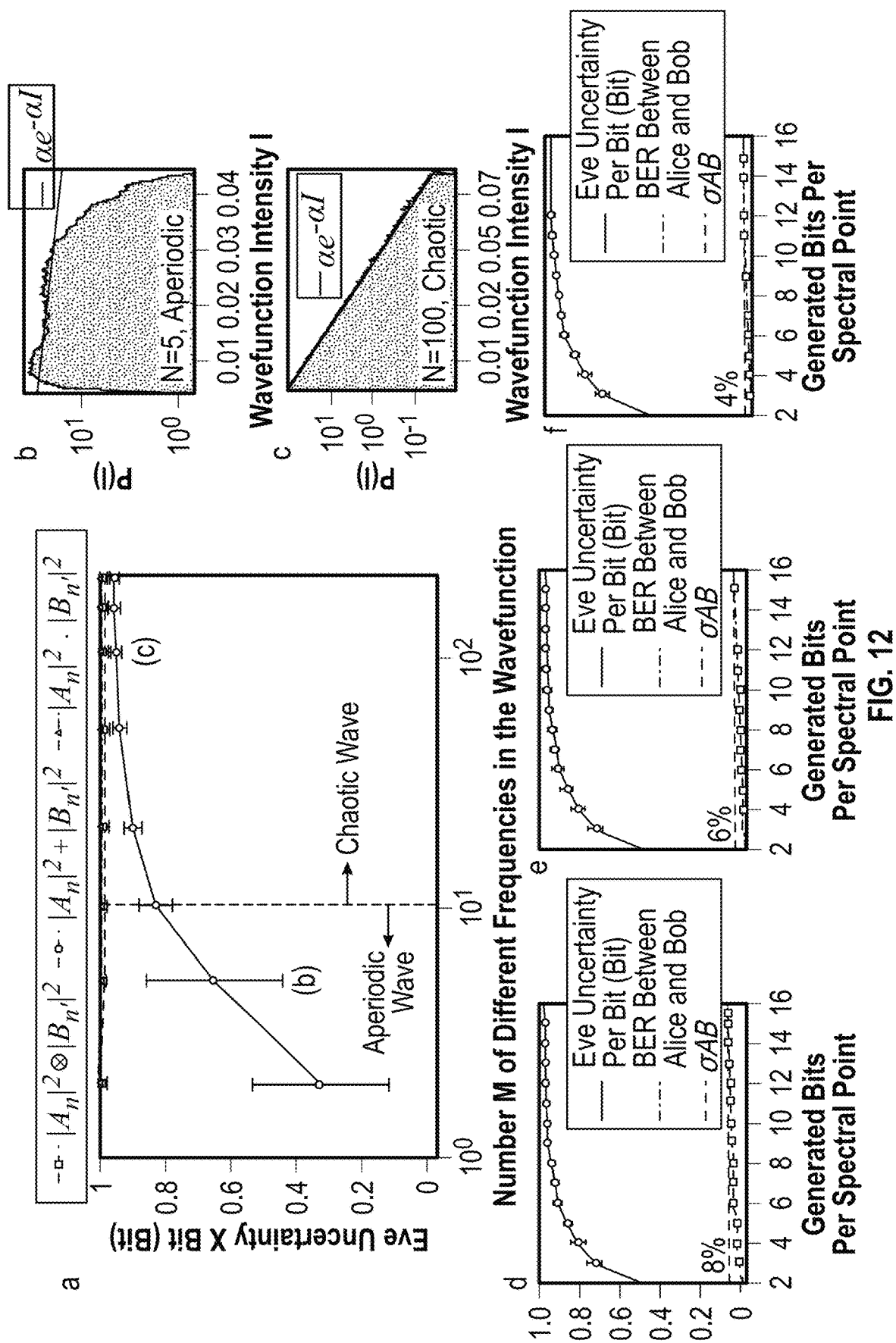
FIG. 12 schematically illustrates with regard to the diagrams in FIG. 12(*a*) to (*f*) a protocol security against time-domain and spectral attacks.

The exchanged key is then used at each user's end to encode and decode data via bitwise XOR, following the Vernam cipher (see FIG. 11(c)) FIG. 12 shows the average uncertainty of Eve when Alice and Bob mix random wavepackets described by Eq. (6) and containing an increasing number of different frequencies $\omega_1, \ldots, \omega_M$. In FIG. 12, protocol security against time-domain and spectral attacks is illustrated. FIG. 12(a) shows an uncertainty per bit measured by an ideal attacker for all possible types of attempted time-domain key reconstruction: $\otimes$ (red line), + (green line), · (blue line) when the users mix random wavepackets possessing an increasing number M of different frequencies. FIG. 12(b)-(c) shows statistics of Intensity of single wavepackets for aperiodic cases (see FIG. 12(b)) and chaotic cases (see FIG. 12(c)). FIG. 12(d)-(f) show results of spectral attacks, where Eve's uncertainty per bit is illustrated with a solid green line, and BER between Alice and Bob keys is illustrated with a solid red line for different standard deviations σAB between the power density spectra of the combined states measured by Alice and Bob, as a function of the number of bit N extracted for each spectral point measured. The illustration of FIG. 12 reports average values (solid lines) and standard deviations (error bars).

A chaotic wave, arising from chaotic scattering, obeys a universal gaussian statistics for the intensity $P(I)=\alpha e^{-\alpha I}$ ($I=A^2_n$ for Alice and $1=B^2_n{}'$ for Bob), and it is attained at sufficiently large M where the states $A_n$ and $B_n{}'$ are completely randomized. At lower M, the wavepackets $A_n$ and $B_n{}'$ are aperiodic superpositions of waves with no general behavior.

In the limit of small M, the statistics of the wavepackets are case by case different, and Eve's uncertainty oscillates in a rather large interval indicating situations in which on average the attacker can infer the key by combining her measurements via $\otimes$. Using different operators, as intuitively expected, yields no information. When the number M of frequencies increases and the states $A_n$ and $B_n{}'$ become chaotic waves, each implementation shows the same universal features and the variance of the uncertainty collapse. In this limit, the uncertainty of Eve becomes unitary (H≥0.998±0.01): the information accessible from the data transmitted is not sufficient to reconstruct the complex chaotic state being formed at Alice and Bob's end and the system is unconditionally secure. Active attacks introduce deterministic errors in the communication sequence between Alice and Bob with no information for Eve. These errors are small and scale as 1/N, with N»1 the number of chaotic states available in Alice and Bob's chips.

These errors can also be eliminated by using information reconciliation and privacy amplification, both conducted over the public authenticated channel. With information reconciliation, Alice and Bob distill an identical key at each user's side by exchange of minimal information (such as the mere bit parity of block key sequences). The second phase, privacy amplification, is then applied to eliminate effectively the information acquired by Eve during the reconciliation step. Privacy amplification is typically performed by using universal hash functions, which generate a new shorter key, on which Eve has zero information.

With regard to security against spectral attacks, the transfer function H(ω) of the system connecting Alice and Bob is represented as follows:

$$H(\omega) = S(\omega) \cdot H_A^{(n)}(\omega) \cdot H_B^{(n)}(\omega) \cdot C(\omega) \cdot \alpha(\omega), \quad (8)$$

Herein, $H_A^{(n)}(\omega)$ and $H_B^{(n)}(\omega)$ represent the transfer function of the chip of Alice and Bob, respectively, C(ω) is the contribution of the transmission system, S(ω) is the spectrum of the input source, and α(ω) is the coupling coefficient with spectrum analyzer, with |α(ω)|≤1 for energy conservation. For reciprocity, the coefficient α(ω) is the same for both users. The power density spectra $P_A = |H_A^{(n)}(\omega)|^2$ and $P_B = |H_A^{(n)}(\omega)|^2$ are random spectra that change at every transmission step n, due to the different input conditions selected by each user. In a spectral attack, Eve measures the spectra $P_{Alice}$ and $P_{Bob}$ transmitted over the communication line with identical copies of Alice and Bob's spectrum analyzers, and then attempts a reconstruction of the combined state measured at the distal end via $P_{Alice}P_{Bob}/P_s$, with $P_s$ the spectrum of the source. As demonstrated in the following, the chaotic nature of the wavepackets $A_n$ and Bn' makes it theoretically impossible to reach the correlation values that Alice and Bob measure in their combined spectra, furnishing zero information on the key shared by Alice and Bob. The uncertainty contained in the reciprocal power density spectra of Alice and Bob arises from the following uncorrelated components:

Statistical fluctuations ΔS of the power density spectrum of the source $P_s = |S(\omega)|^2$.

Noise thermal fluctuation ΔC in the communication channel.

Fluctuations $\Delta_A$, $\Delta_B$ in the input conditions selected by Alice and Bob, respectively.

The statistical uncertainty $\Delta_M$ provided by the measurement apparatus used.

The coupling coefficient α(ω) with the spectrum analyzer, which is a systematic source of uncertainty (type B according to NIST guidelines) that is not a-priori known. To evaluate α(ω), the user must measure the absolute value of a spectrum and normalize it. To do so, the user must use another measurement instrument, which introduces another coupling coefficient that the user does not know. This argument can be iterated at infinity, without the user knowing the first coupling coefficient. It is the same problem of measuring the exact temperature of a body: one needs to know in advance the temperature of the thermometer, as it reads the equilibrium temperature between the coupled environments of the thermometer and the body.

In an experimental implementation, the main statistical components of uncertainty is the fluctuation of the source: $\Delta_{A,B,C,M} \ll \Delta_S$, (as discussed quantitatively in the experimental implementation part). This is also a general case the users can always choose, as the source is in the physical hand and controlled by the users at the time of the communication. In the limit of acceptable bit error rate (BER), As can always be increased if necessary by adding artificial time fluctuations at the time of the communication.

The total standard uncertainty Δ when measuring a user spectrum PBob is then expressed by:

$$\Delta = \frac{\partial P_{Bob}}{\partial P_S} \Delta_S = |H_A^{(n)} \cdot H_B^{(n)} \cdot C \cdot \alpha|^2 \Delta_S \quad (9)$$

If the main the middle attacker Eve wants to attempt a reconstruction of the spectrum PBob, she needs to perform at least three measurements:

1. The spectrum sent by Alice $P_{EA}$ is $$P_{EA}(\omega) = |S(\omega) \cdot H_A^{(n)}(\omega) \cdot C_A(\omega)\alpha(\omega)|^2, \quad (10)$$

with $C_A(W)$ the transfer function of the communication line connecting the Alice with Eve. The ideal scenario for Eve is to use an exact copy of the analyzer of Alice and Bob, in order to measure exactly the same α(ω).

2. The spectrum sent by Bob $P_{EB}$ is $$P_{EB}(w) = |S(w) \cdot H_B^{(n)}(w) \cdot C_B(w) \cdot \alpha(w)|^2, \quad (11)$$

with $C_B(W)$ the transfer function of the communication channel between Bob with Eve.

3. The source spectrum is $P'_s = |S(\omega)\alpha(\omega)|^2$ which essential because of the use of chaotic uncorrelated spectra, which do not allow to estimate $P_s$ from measurements 1-2 above. In this case, the best choice for the attacker is to use an identical copy of the spectrum analyzer of the users. This will minimize any other statistical uncertainty that can be introduced at this stage due to, e.g., different sensors, different resolution, and any different component used for the measure.

Once measurements 1-3 above are in place, Eve can attempt a reconstruction of $P_{Bob}$ via $P_{EA} P_{EB}/P_{EB}/P'_s$.

This operation returns an estimate expressed by:

$$\frac{P_{EA} \cdot P_{EB}}{P'_S} = (P_{Bob}) \frac{1}{|\alpha|^2} + \Delta' \quad (12)$$

with $C_A C_B = C$ and total uncertainty Δ' evaluated from each independent measure performed by Eve:

$$\Delta' = \frac{1}{|\alpha^2|} \sqrt{\left(\frac{\partial P_{EA}}{\partial P_S}\right)^2 \frac{P_{EB}^2}{P_S^2} + \left(\frac{\partial P_{EB}}{\partial P_S}\right)^2 \frac{P_{EA}^2}{P_S^2} + \frac{P_{EA}^2 P_{EB}^2}{P_S^4} \Delta_S} = \sqrt{3} \frac{\Delta}{|\alpha|^2} . \quad (13)$$

Equations (12)-(13) show that in the ideal scenario the measurements of Eve contains: i) at least one systematic multiplicative uncertainty, which Alice and Bob do not experience, and ii) a statistical uncertainty that is at least √3 higher that the one of Bob and Alice. These results are the theoretical limit for an ideal adversary with an infinite technological power and in the Kerckhoffs limit. While neither the users nor the attacker know c(ω), the statistical uncertainty $\Delta_s$ is a quantity that cannot be removed by the adversary as the source is in the physical hand of the users at the time of the communication.

The inventors analyzed the security of the system in the theoretical limit at the worst case for the users, in which $|\alpha(\omega)|^2 = 1$ for each frequency considered. This limit is practically impossible to achieve because it implies a technology that can measure a state without perturbing it, and this would at least violate the projection postulate of quantum mechanics related to possible outcomes in a measurement of a physical observable. However, the inventors will explain below that even in this case the system is unconditionally secure.

The inventors considered different communications scenario, in which Alice and Bob measure correlated spectra with different statistical fluctuations, and developed a multi-bit AHB transform, inspired by random bit generation concepts, which optimizes the extraction of information from the acquired spectra at each user's end. Commercially available line detectors furnish at least 16 bits for each spectral point: if we maximize the use of this information in the generated key, we can highly reduce the communication workload between Alice and Bob for generating the key.

In their security analysis, the inventors considered statistical fluctuations between Alice and Bob power density spectra with standard deviation $\sigma_{AB} \leq 8\%$, which is typically met in classical communication networks. The maximum tolerable BER is set equal to the statistical fluctuations in the spectra $\sigma_{AB}$. This choice implies that in all cases considered, the BER is lower than the tolerable limit of 11% set for QKD schemes.

The diagrammatic illustrations in FIG. 12(d)-(f) show the outcomes in terms of BER and adversary uncertainty per bit resulting from a spectral attack at the theoretical limit, with $|C(\omega)|=1$, and at different GAB. These results are calculated from a statistical set of $10^6$ different chaotic power density spectra measured by Alice $P_{Alice}$, Bob $P_{Bob}=P_{Alice}+\Delta$ and reconstructed by Eve $P_E=P_{Alice}+\Delta'$ at the theoretical limit. The spectra possess the following statistics: $\langle\Delta\rangle=\langle\Delta'\rangle=0$, $\sqrt{\langle\Delta^2\rangle}=\sigma_{AB}$, $\langle\Delta'^2\rangle=\sqrt{3}\sigma_{AB}$.

The results as shown in diagrammatic illustrations in FIG. 12(d)-(f) demonstrate that independently from the communications scenario considered, when the bit error rate (BER) between Alice and Bob reaches $\sigma_{AB}$, the users can distill an OTP key with $N_b > 10$ bits per spectral point measured, while maintaining a unitary uncertainty to the attacker (uncertainty per bit higher than 0.99 bit).

Referring to FIG. 12(a), the variance in Eve's uncertainty is negligible. This arises from the use of chaotic spectra with universal statistics because the outcomes are independent on the particular sequence considered and identically apply to all sequences possessing the same universal properties. If the limit of $N_b$ is set to the point where the BER equals the standard deviation in the spectra $\sigma_{AB}$, the possible number of bits extracted N per spectral point measured increases from (d) $N_b=11$, to (e) $N_b=12$, and (f) $N_b=14$ and can be controlled by reducing the uncertainty $\Delta$ between the spectra of Alice and Bob.

These results demonstrate that at the theoretical limit and in the worst case for the users, the attacker has zero mathematical information on the users' key and the system is unconditionally secure.

Key Generation Throughput

In the absence of active eavesdropping, the number of pulses $N_p$ to be transmitted for generating an OTP key is:

$$N = \frac{L_m}{N_b \cdot P_{OV}} \quad (14)$$

and equal to the ratio between the length of message $L_m$ and the number of bits $N_b$ extracted from each combined state $A_n \oplus B_n'$, multiplied by the probability $P_{ov}$ of observing a repeated state at the same time position in Alice and Bob's sequences. The maximum key generation throughput is observed when $P_{(ov)}$ is maximal.

The inventors demonstrate the probability $P^{(ov)}$ for different values of the users probabilities $P^{(Alice)}$ and $P^{(Bob)}$ to change state after each step. A maximum value of $P^{(ov)}=10\%$ is obtained when $P^{(Alice)}=P^{(Bob)}=0.25$. In this condition, by using standard detectors at 1024 bits and by extracting 10 bits per spectral sample, the protocol requires the transmission of $N_p=^L m$ pulses, corresponding to $\approx 1/1000$ of the length of the message.

In the presence of active eavesdropping, the key generation throughput decreases due to the additional error states that the eavesdropper is introducing. The inventors demonstrate that the throughput variation introduced by these attacks is in the range of a few percents.

Regarding a physical implementation, the design and engineering of the chips, will be discussed by demonstrating points 1-4 above which are required by the communication protocol.

For providing integrated biometric silicon chips, chaotic chips are in some illustrative embodiments herein developed from human fingerprints, which are highly complex and already implemented in electronic documents nearly worldwide.

Figure 13:
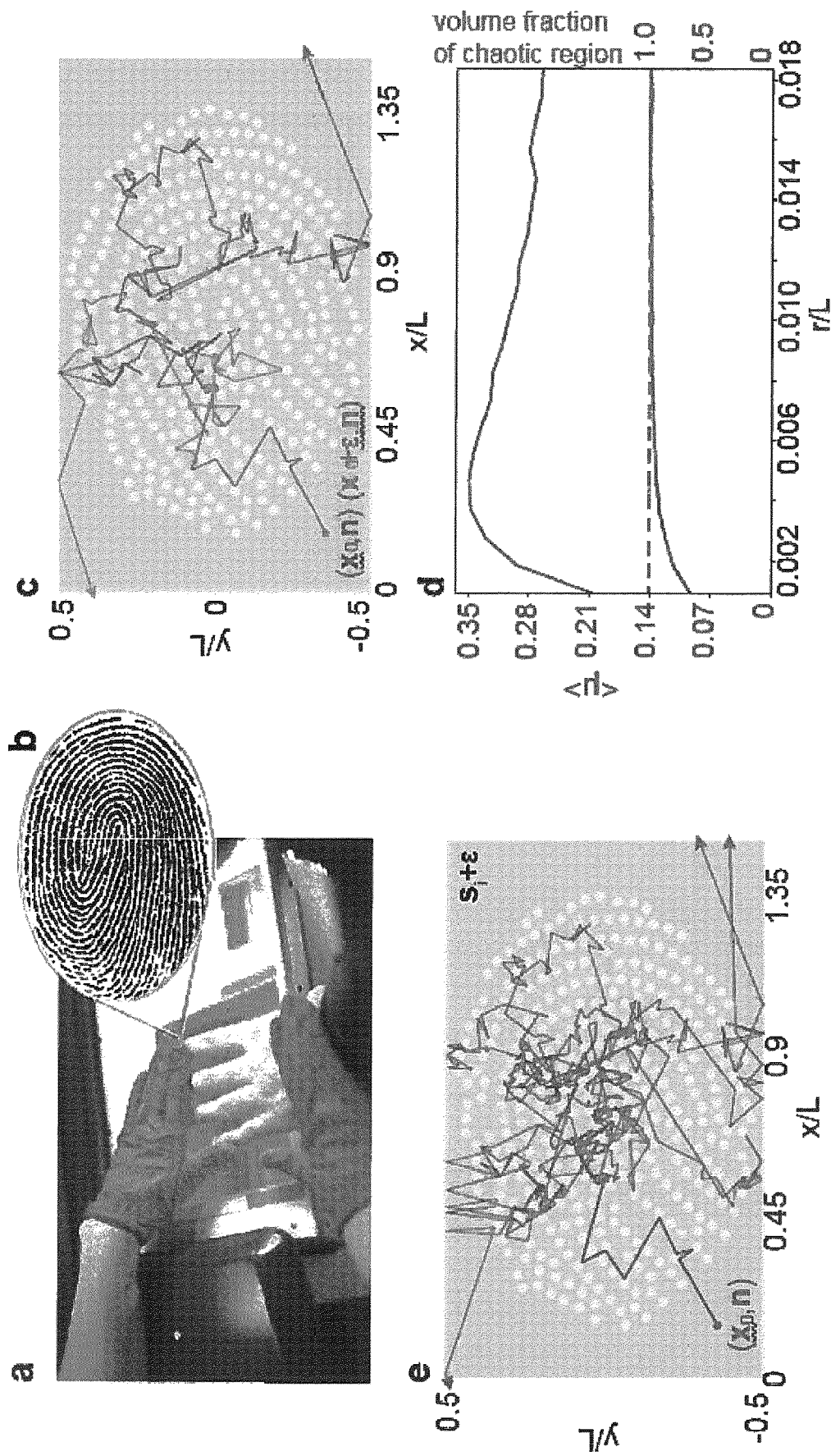
FIG. 13 schematically shows an integrated fingerprint silicon chip design and chaotic analysis in accordance with some special illustrative embodiments of the present disclosure.

Reference is made to FIG. 13 showing an integrated fingerprint silicon chip design and chaotic analysis in accordance with some special illustrative embodiments of the present disclosure. FIG. 13(a)-(b) illustrate an acquisition of a biometric fingerprint and a transformation into a chaotic resonator. FIG. 13(c) illustrates dynamics of two trajectories displaced by a smallest number E representable at a computer. FIG. 13(d) shows an averaged Lyapunov exponent ($\mu$) in the phase space of possible input conditions and percent of the phase space filled with chaotic dynamics for different radius r of the scatterers. FIG. 13(e) illustrates dynamics of three identical input conditions in three infinitesimally different resonators.

For example, after biometric scanning as shown in FIG. 13(a)-(b), the digital image of a user fingerprint is transformed into a chaotic fingerprint microresonator composed by a series of point scatterers made by reflective nanodisks of constant radius. FIG. 13(c) illustrates dynamics of two exemplified trajectories in the chaotic fingerprint microresonator. Herein, the microresonator acts as a chaotic optical billiard for the dynamics of exemplified light rays.

The person skilled in the art will appreciate that a microresonator may generally represent an optical microcavity which may be understood as being implanted by a structure formed by reflecting faces on the two sides of a spacer layer or optical medium, or by wrapping a waveguide in a circular fashion to form a ring. The former type forms a standing wave cavity, and the latter forms a traveling wave cavity. In accordance with some illustrative examples, a microcavity may be only a few micrometers thick, the spacer layer sometimes even being in the nanometer range. The person skilled in the art will understand that with common lasers, this forms an optical cavity or optical resonator, allowing a standing wave to form inside the spacer layer, or a traveling wave that goes around in the ring.

Referring to FIG. 13(c)-(e), the inventors optimized the chaotic properties of the resonator fabricated in the process illustrated in FIG. 13(a) against requirements 1 and 3 above from the cryptographic communication protocol. The obtained fingerprint resonator is characterized by a large number of disjoint convex bodies, which are randomly displaced in space, representing a finite version of the Lorentz gas billiard. This family of billiards possess a strong chaotic behavior, arising from hyperbolic motion of exponentially dispersing wavefronts. FIG. 13(c) shows the propagation of light rays of two input conditions ($x_0$, n) (solid red line) and ($x_0+\epsilon$, n) (solid green line) having the same initial orientation n and spatially displaced by the smallest floating point number $\epsilon=2.2 \cdot 10^{-16}$ representable at the computer. After just a few collisions and despite the infinitesimal displacement, the dynamics diverges exponentially into two completely different trajectories.

Referring to FIG. 13(d), a quantitative analysis of the microresonator's chaos is provided by calculating the average Lyapunov exponent (p), which quantifies the average exponential grow of different input conditions, and the volume of phase space of input conditions filled by chaotic dynamics as a function of the scatterers' radius. For example, assuming a designed fingerprint resonator with $n_s$=322 scatterers, such a resonator possesses a phase space that is fully chaotic (as requested at point 1) for a radius r of scatters satisfying r≥0.008 L, where L represents a resonator width along a direction y in FIG. 13(c). In this regime, the fingerprint structure is strongly chaotic with an average Lyapunov exponent in the range from about 0.21 to about 0.35 as indicated in FIG. 13(d).

This implies that two different input conditions undergo exponential separation after n scattering collisions with an average rate ~$e^{(\mu)n}$, providing uncorrelated trajectories very quickly as illustrated in FIG. 13(c).

Referring to FIG. 13(e), the behavior of the fingerprint structure is analyzed against points 3 to 4 of the above requirements of the cryptographic algorithm. The plot shows the dynamics of three identical input conditions (solid blue, red, and green lines) launched in three different fingerprint resonators implemented by randomly shifting the positions of each scatterer $s_i$ by the smallest floating point number E representable at the computer; a vector with random orientation $\epsilon_i$, with $|\epsilon_i|=\epsilon_{min}$. The analysis shows that an infinitesimal transformation in the fingerprint's scatterers, initiates a chaotic structure with exponentially diverging trajectories with respect to the old one. This is a general result along with other possible transformations that can satisfy requirements 3 to 4.

Figure 14:
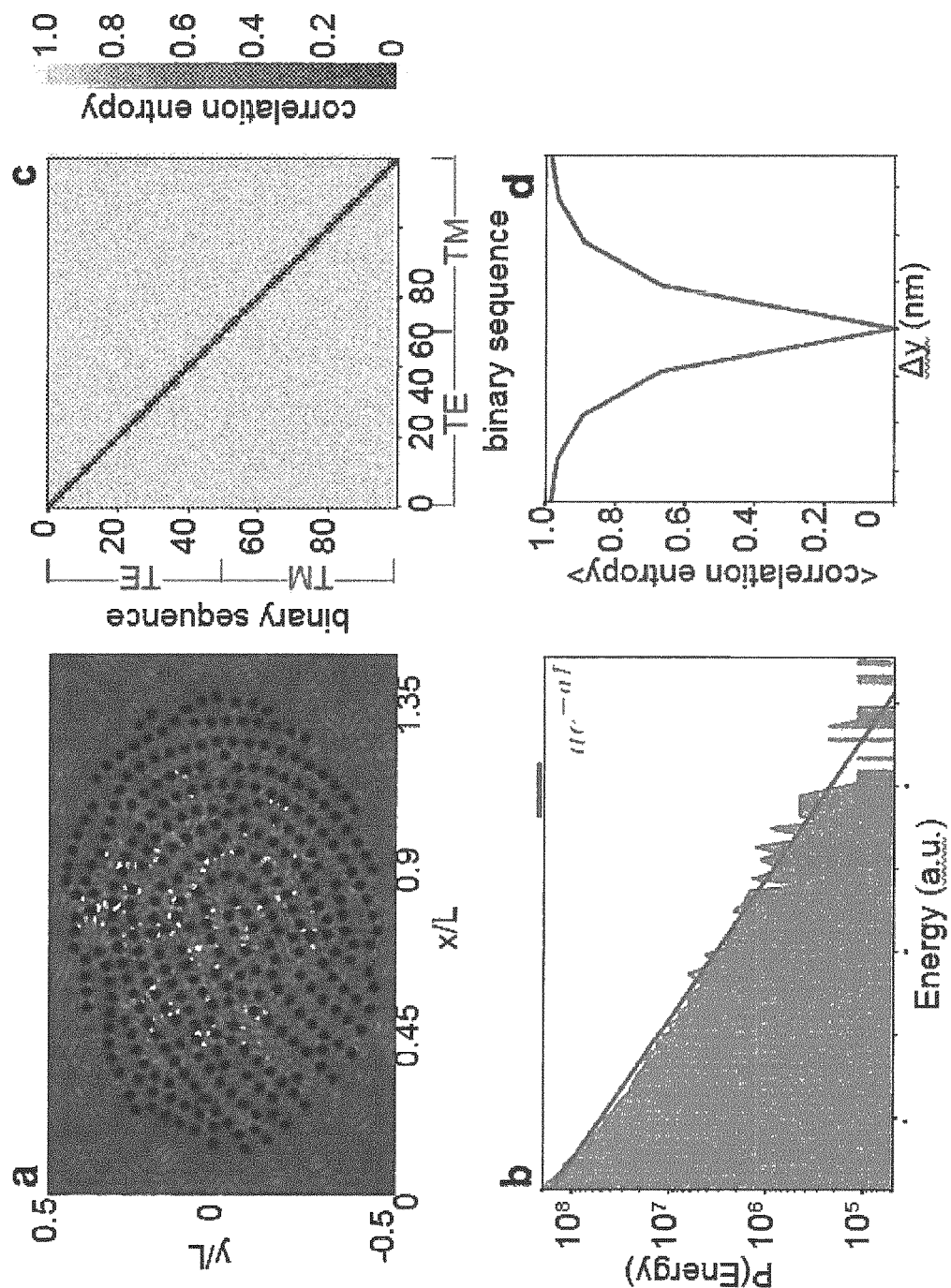
FIG. 14 schematically illustrates a wave analysis of fingerprint chips from FDTD simulations as performed by the inventors.

Now, with reference to FIG. 14, a wave analysis of fingerprint chips from FDTD simulations performed by the inventors is presented. Herein, FIG. 14 (a) illustrates an electromagnetic energy distribution in a resonator made by air pillars on a silicon substrate for an input pulse at λ=1550 nm and 150 fs long. FIG. 14(b) illustrates a probability distribution of the electromagnetic energy inside the resonator. FIGS. 14(c) and (d) illustrates a correlation entropy between the binary sequences generated from transmitted electromagnetic spectra obtained by shifting the launching position of the input beam within 1 μm from x=y=0 with displacements of 20 nm for TE polarized and TM polarized excitations, wherein an average correlation entropy for displacements lies within ±150 nm.

Referring to FIG. 14(a), the typical dynamics of light in a fully chaotic fingerprint resonator with L=7 μm and r=0.012 L is shown, the dynamics being calculated from Finite-Difference Time-Domain (FDTD) simulations for a structure of air holes on a silicon substrate excited by a TE polarized, 150 fs long pulse centered at λ=1550 nm. The chaotic scattering of light with the structure completely randomizes the wavefront, generating electromagnetic chaotic wavepackets with universal gaussian energy statistics, as illustrated in the plot shown in FIG. 14(b).

Referring to FIG. 14(c)-(d), the correlations among different chaotic states that can be generated from transmitted power density spectra (PDS) from the resonator are analyzed in detail. It is notes that electromagnetic spectra are advantageous over intensity signals, as the former favor simpler and less expensive experimental implementation. Herein, the inventors calculated transmitted electromagnetic spectra for both TE and TM polarized point sources of 150 fs duration, centered at the wavelength λ=1550 nm, and launched at x=y=0 with displacements $y_1$, $y_2$, . . . along y within 1 μm range with 20 nm resolution. For each input position, the inventors computed the transmitted energy spectrum from the chip arising from TE and TM input light and transformed it into a binary sequence by the AHB technique. The inventors then computed the entropy correlation matrix H, with elements $H_{ij}=-d_{ij} \log_2 d_{ij}-(1-d_{ij}) \log_2(1-d_{ij})$ being the Shannon information entropy of the hamming distance $d_{ij}$ among the bit sequences i and j arising from PDS obtained by input shifts $y_i$ and $y_j$.

The person skilled in the art will appreciate that the entropy correlation matrix for the fully chaotic fingerprint resonator is strongly diagonal (see FIG. 14(c)), showing that the generated bit sequences from light with different input polarizations launched at each spatial displacement are completely uncorrelated. Referring to FIG. 14(d), a quantitative analysis of the correlation length from the calculation of the average correlation entropy within a displacement of 300 nm is provided. It shows that a displacement beyond 200 nm provides uncorrelated sequences.

After a complete lecture of the present disclosure, the person skilled in the art will appreciate that, in the communication system of FIG. 11, by using simple displacement and two polarizations (not including combinations), the inventors can generate $(1000/0.2 \cdot 2)^2=10^8$ different spectra for every mm of chip length L. If we measure each spectrum with a commercially available line detector of 1024 pixel and convert each pixel in N bits, we can theoretically generate 0.1·N Tb of different keys for every mm of chip unit length L, and for every communication.

In accordance with some specific illustrative examples herein and as presented in the context of the following experimental demonstration, fingerprint chips may be fabricated by e-beam lithography, patterning the fingerprint resonator structure onto a silicon substrate developed with a silicon on insulator (SOI) platform that is CMOS compatible, industry ready and operating in the standard telecommunication C+L band.

Figure 15:
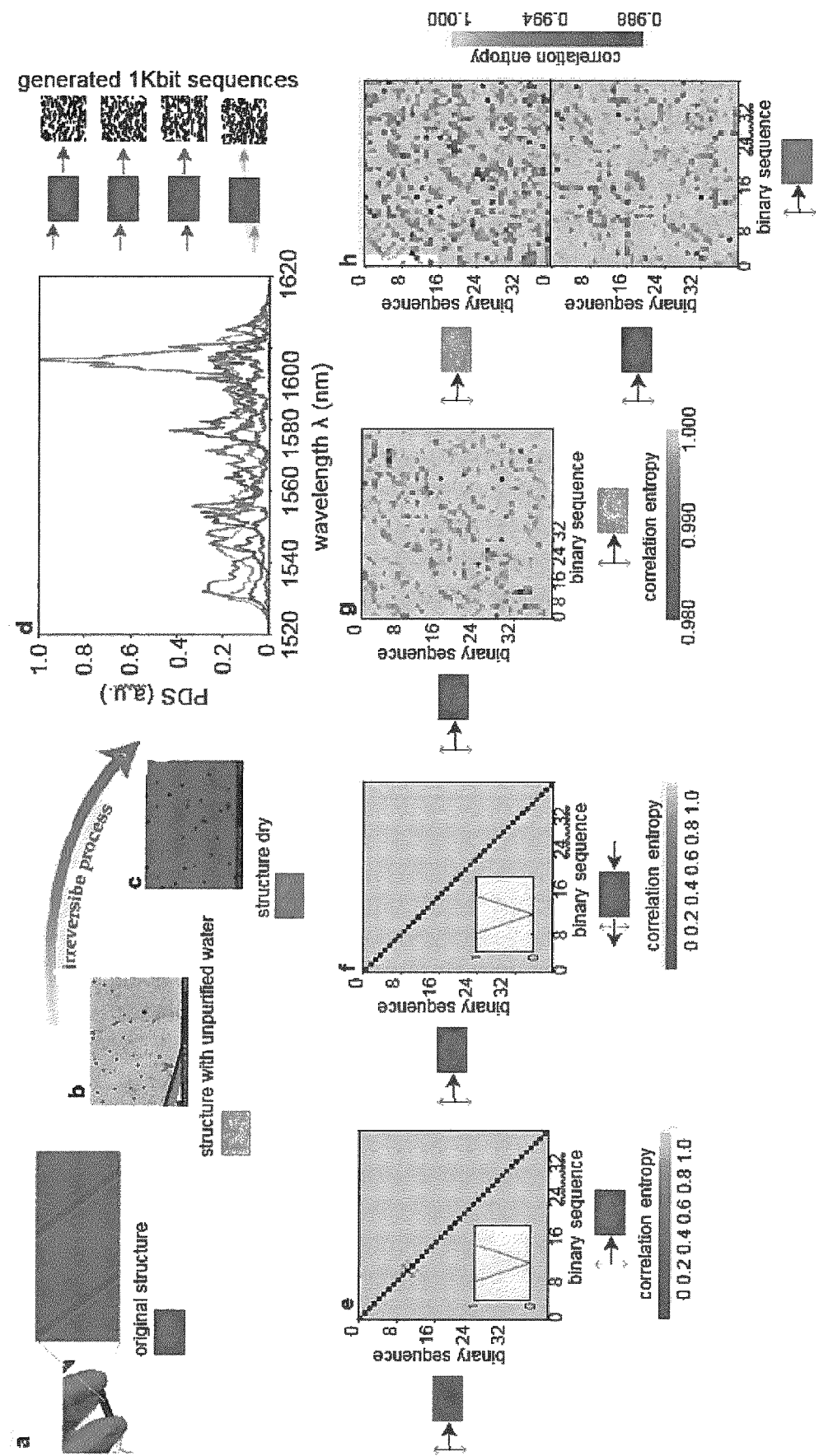
FIG. 15 illustrates experiments on single fingerprint chips.

Referring to FIG. 15, experiments on single fingerprint chips are illustrated and will be discussed below. Herein, FIG. 15(a) shows a scanning electron microscope (SEM) image of a fabricated sample. FIG. 15(b) shows transmission spectra and generated bit sequences corresponding to four different input positions, spaced by 10 μm each. FIGS. 15(c), (d), (g), and (h) show correlation entropy tables between the bit sequences generated from identical input positions in the same chip (see FIG. 15(c)), the same chip in direct and reciprocal configuration (see FIG. 15(d)), the original chip (see FIG. 15(g)) and the chip modified in FIG. 15(e), the chip modified in FIG. 15(e) and the chip modified in FIG. 15(f) and the original structure (see FIG. 15(h)). FIG. 15(e)-(f) show examples of irreversible transformation sequence, characterized by deposition on the chip surface of water not purified with colloidal suspensions, and FIG. 15(f) shows the same chip dried out.

Referring to FIG. 15(a), a scanning electron microscope (SEM) image of an illustrative fingerprint chip is shown. The whole structure may be L=40 μm wide and 100 μm long.

Referring to FIG. 15(b)-(c), an example of a simple irreversible process that can be applied to the chip, is shown. It consists in first depositing on top of the sample a non-purified drop of water, which naturally contains colloidal occlusions that act as additional scatterers (see FIG. 15(b)). It is noted by the inventors that the distribution of scatterers in these fluid structures is not repeatable. When the chip dries out naturally, another distribution of impurities is obtained on the chip's surface (see FIG. 15(c)).

After a complete lecture of the present disclosure, the person skilled in the art will appreciate that, in accordance with some illustrative embodiments of the present disclosure, a droplet of a liquid, e.g., water or any other liquid which contains colloidal occlusions that act as additional scatterers, likewise doped hydrogels, which are continuously deformable with temperature, pressure, light or electrical signals, may be dropped onto an optical encryption pattern prior to applying input signals to the optical encryption pattern. The ones skilled in the art will also appreciate using the concept of elasto-optic metamaterials that combines optics and solid mechanics; in this sense, other examples of additional scatterers include metamaterial-based optical devices.

A metamaterial is a compound that is engineered and assembled from multiple elements such as metals and plastics materials going beyond materials found in nature. It is their precise shape, geometry, size, orientation and arrangement that will allow them to manipulate electromagnetic waves beyond what is feasible by using conventional materials. Thereby, EM waves can be manipulated by blocking, absorbing, enhancing, or bending waves.

As an elasto-optic effect the skilled person understands for instance a change in the refractive index of an optical fiber caused by a variation in the length of the fiber core in response to mechanical stress.

As an elasto-optic metamaterial the skilled person understands a metamaterial that is capable of processing/controlling/changing light by changing its refractive index through optic transformation and the volume of its unit cells (elastic) from atmospheric conditions such as temperature, pressure, light, electric signals, etc. Several methods can be used to dope a metamaterial so that it is more sensitive to atmospheric conditions in order to manipulate EM waves. One example is a mesoscopically homogeneous nanoporous microstructure as an example of combining optics with solid mechanics.

Also, Microgels (MGs) can be applied to non-metamaterials, directly onto any structure with the function of allowing such structure to be molecularly altered by environmental conditions (light, temperature, pressure, etc.) Exploring the degrees of freedom of microgels will increase the sensitivity range (wavelength shift) and response time influenced by those environmental conditions.

The inventors characterized the chips in FIG. 15(a)-(c) by launched light signals of 100 nm bandwidth, centered around the communication wavelength 1550 nm, by end fire coupling with a 60× aspheric lens, mounted on a XYZ translational stage with repeatable spatial shifts of 0.5 μm.

Referring to FIG. 15(d), transmission optical spectra recorded at different input positions, indicated on the right, and the corresponding generated bit sequences, each of 1024 bits, for the original chip (see FIG. 15(a)), are shown.

Referring to FIG. 15(e), the entropy correlation among 40 different input positions shifted by 1 μm each is shown.

The inventors point out that, in agreement with the theoretical predictions presented above regarding FIG. 14(c)-(d), the generated bit sequences are completely uncorrelated with each other.

Referring to FIG. 15(f), the optical reciprocal behavior of the chip against requirement 2 of the cryptography scheme of FIG. 11 is verified. FIG. 15(f) shows the correlation among bit sequences created by launching signal from the input and collecting transmission spectra at the output, versus the bit sequences measured by launching signals from the output and collecting spectra at the input. The chips are stable with perfectly correlated bit sequences generated in direct and reciprocal launching conditions (according to FIG. 15(f)diagonal). The sequences are completely uncorrelated to each other (see FIG. 15(f): yellow area).

Referring to FIG. 15(g), the entropy correlation between the bit sequences created from the same positions in the chips at FIGS. 15(a) and (b) are analyzed, before and after the transformation, respectively; while FIG. 15(h) shows the correlations among sequences generated from chips at FIGS. 15(a), (b) and (c). The sequences are completely uncorrelated with each other, with an average correlation entropy per bit of (H)=0.998±0.001 bit, experimentally demonstrating that the irreversible transformation (a,b,c) generated completely different chip responses.

After a complete lecture of the present disclosure, the person skilled in the art will appreciate that, when the chip structure of FIG. 15(b) is employed for communication, an attacker will never be able to recreate any of the generated states once the chip is irreversibly modified in FIG. 15(c) after the communication. This process can be iterated at will, also integrated with other possible irreversible transformations including heat and sample deformations. FIGS. 15(g)-(h) show experimentally that these chips satisfy the requirements at points 3-4 of the communication protocol.

Now, an integration of an on-chip implementation with ultrafast light modulation will be discussed. As shown in FIG. 14(c), the fingerprint chip generates at every spatial point uncorrelated data sequences from TE and TM polarized light. Supplementary, FIG. 15(a) demonstrates this point experimentally, by reporting experimental results on the correlation between 40 different sequences generated by launching in the sample light at different spatial positions, with different linear polarizations TE and TM. The use of different input position and light polarizations opens to integrated ultrafast light control with the block level diagram illustrated in FIG. 15(b).

The initial stage is composed of a modified Mach-Zehnder interferometer, excited by an unpolarized source, or equivalently a combination of TE and TM polarized light sources. The Mach-Zehnder interferometer is composed by a y-junction fiber polarization splitter, followed by two ultrafast electro-optical (EO) modulators and a final y-junction for recombining the two polarization arms. The output fiber is then connected to a 1×N optical switch matrix, which will provide ultrafast selection of the input channel on the fingerprint chip. With this integrated structure, it is possible to achieve the generation of $4 \cdot N^2$ different spectra at each communication. Both EO modulators and switch matrices can provide modulations up to hundreds of GHz and with hundreds of channels with the technology currently available, thus enabling on-chip integrated applications for ultrafast cryptographic communication with the protocol developed in this work.

Now, cryptographic transmission and system security against spectral attacks will be discussed with regard to FIG. 16 where experiments on key distribution and attacks in the spectral domain are illustrated. FIG. 16(a) illustrated an experimental setup. FIG. 16(b) illustrated a communication sequence between Alice and Bob. FIG. 16(c)-(e) show examples of data sent during one communication step including the individual random spectra of the user as measured from the communication line (see FIG. 16(c)), the combined spectra at the distal end measured by Alice and Bob (see FIG. 16(d)), and the absolute spectral differences in the combined states measured by the users (solid blue line) and the state reconstructed by an ideal attacker (solid orange line) in FIG. 16(e). FIG. 16(f)-(h) show encryption and decryption experiments, where a Panel shows the results of Eve from the best possible attempt to recreate the key of the users.

In this regard, the inventors used the setup of FIG. 16(a), assembled with inexpensive and off the shelf classical optical components. The inventors employed a standard single mode telecommunication fiber SMF-28 that connects two fully chaotic chips with L=40 μm and different user fingerprints. The inventors chose different input coupling conditions by mounting the chips on XYZ translation stages with 1 μm spatial shifts. As in the previous experiments, the inventors employed light pulses with 100 nm bandwidth and measured power density spectra with 0.1 nm resolution. The inventors then selected random input conditions, collected the spectra and generated the key at each user's end. The inventors assumed an ideal attacker in control of the communication channel and with an unlimited technological power.

Referring to FIG. 16(b), a typical communication with a list of input positions selected by each user is shown.

Referring to FIG. 16(c)-(d), the transmission for one set of input conditions is analyzed, showing: the power density spectra sent by Alice and Bob (see FIG. 16(c)) and the spectra measured at the distal end by the users (see FIG. 16(d)). The power density spectrum of the combined state $PDS_{B22A30}$ measured by Alice is perfectly correlated to the spectrum $PDS_{A30B22}$ measured by Bob. The solid blue line in FIG. 16(e) quantifies the exact difference between the data measured by Alice and Bob. This is calculated in absolute value, by directly extracting the PDS amplitude as read by the spectrum analyzer. The spectral difference lies between $10^{-4}$ and $10^{-1}$.

Referring to FIG. 16(e), the solid orange line shows the difference between the spectrum measured at Bob's end and the one reconstructed by Eve with a spectral attack. In this case Eve measures the spectra $P_{B22}$ and $P_{A30}$ transmitted in the communication line with identical copies of Alice and Bob's spectrum analyzers (here implemented by using the same instruments), then attempts a reconstruction of the combined state measured at the distal end via $P_{B22} P_{A30}/P_s$, with $P_s$ representing the spectrum of the source. The person skilled in the art will appreciate that the chaotic nature of the wavepackets $A_n$ and $B_{n'}$ makes it theoretically impossible to reach the correlation values that Alice and Bob measure in their combined spectra. The theoretical limit of the closest representation $P_{Eve}$ of the spectra of the combined states measured by one user $P_{Alice/Bob}$ is:

$$P_{Eve}(\omega) = \frac{1}{|\alpha|^2}\left(P_{Alice/Bob} + \sqrt{3} \cdot \right)\Delta, \quad (15)$$

with $|a(\omega)|^2 \le 1$ representing an unknown coupling coefficient (systematic uncertainty) and A the statistical fluctuation of the source $P_s$ spectrum. Referring to FIG. 16(e), equation (13) is quantified by measuring $P_s$ with Alice and Bob's spectrum analyzers and collecting $P_{B22}$ and $P_{A30}$ by connecting the SMF-28 fiber directly into the user spectrometer of each user, without using any component that is not present in the communication setup and that might introduce additional uncertainty. Even in this measurement scenario, there are significant differences between Bob and Eve's spectra.

Referring to FIG. 16(f)-(h), these results are visualized with encryption and decryption experiments. According to FIG. 16(f), Alice encodes the data being sent out with a key generated from the sequence of repeated spectra with the AHB transform optimized for $\sigma_{AB}$=7%, which is the average standard deviation generated in the system of FIG. 16(a). The encoding procedures follows the Vernam cipher with a bitwise XOR between the image and the key. The ciphertext generated is then transmitted to Bob end, who decodes it with his own generated key (see FIG. 16(g)). To decrypt the image, Bob performs a bitwise XOR between the ciphertext and his own generated key from the combined spectra measured at his end. The image decoded by Bob is correctly retrieved from the original. Conversely, the image decoded by Eve with the key reconstructed by the spectral attack described in FIG. 16(e) is just white noise with no information on the message.

The person skilled in the art will appreciate that, with this elementary setup and with the chips designed (L=40 μm), about 402-$N_b$-1024=2. $N_b$ Mbit of different keys may be extracted at each transmission, requiring to exchange $$\frac{L_m}{N_b \cdot 1024}$$

spectra for distributing an OTP for a message of length $L_m$. For $N_b \ge 10$, this is at least 10240 smaller than the length of the message.

Figure 16:
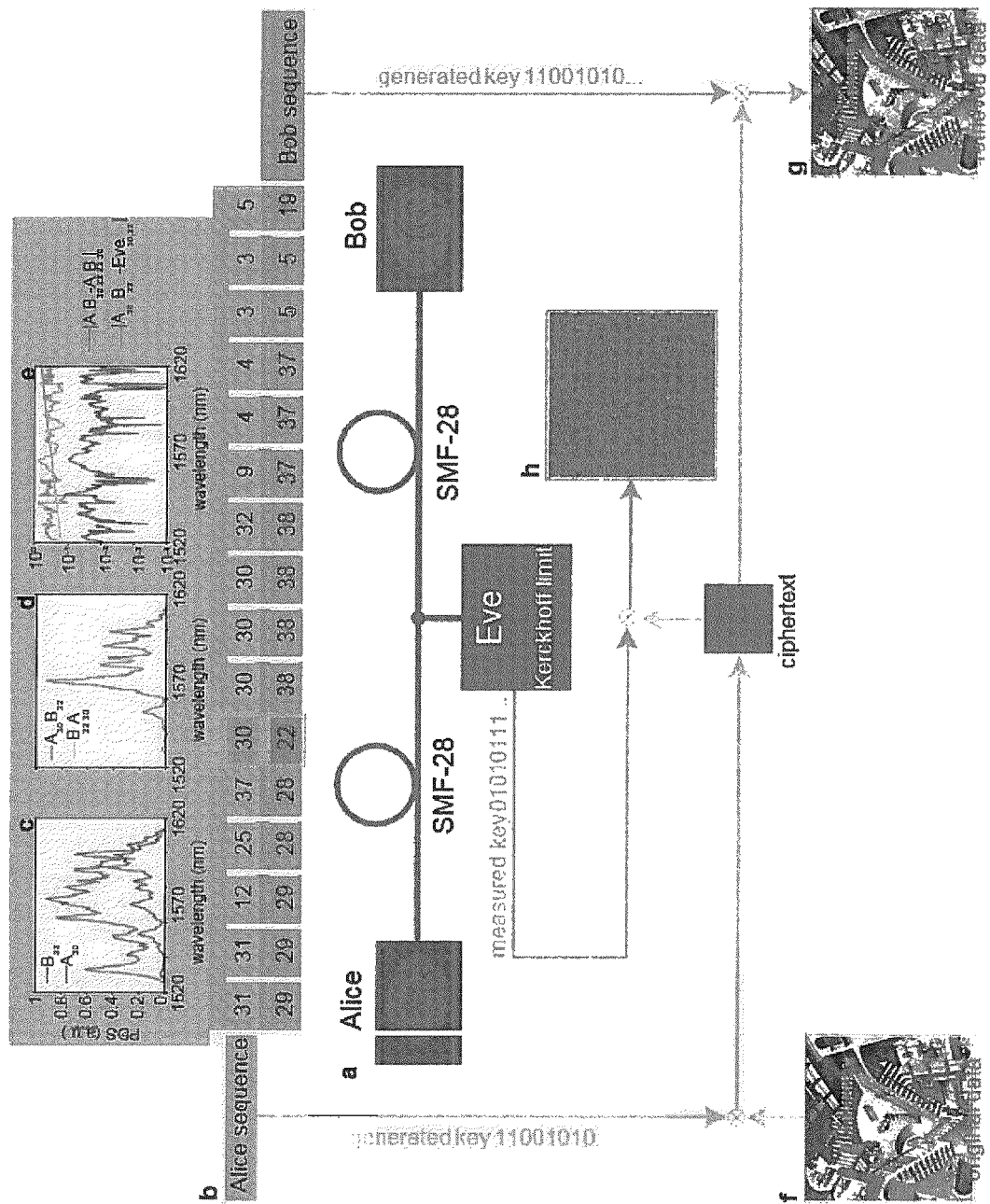

According to the above, the inventors presented the results of the NIST statistical test suite applied to the keys generated with the system of FIG. 16. The inventors considered a statistical population of 1000 random bit sequences of 1000 bits each, and the inventors showed that the key generated with the nonlinear AHB transform passed all the tests, validating the scheme against the NIST standards for real world cryptographic applications.

In summary, the inventors have designed, analyzed and experimentally demonstrated a protocol for a perfect secrecy cryptography that uses CMOS compatible fingerprint silicon chips. Key attributes of such cryptographic system are:

- The system provides a physical implementation of the one-time pad by using a public classical optical communication network.
- The systems' security is evaluated following the Kerckhoff principle, in which the attacker controls the communication channel, accesses the system before or after the communication and has the technology to exactly copy any of its part. The second law of thermodynamics and the exponential sensitivity of chaos prevents the attacker from getting any information on the key being exchanged by the users, regardless of the attacker's technological power and knowledge of the system. Theory confirmed by experiments shows that the outcome of any attack is binary sequence at maximal entropy with the key exchanged by the users.
- The protocol is fully compatible with many techniques of privacy amplification and information reconciliation, which have been already developed for quantum cryptography schemes.
- Beyond the initial communication required for authenticating the users, the system does not require electronic databases, private keys or confidential communications.

Combined with the technology maturity, speed and scalability of classical optical communications, the results as shown by the inventors open a new pathway towards implementing perfect secrecy cryptography at the global scale with contained costs.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

In addition to the above general and detailed description, reference is made to "Perfect secrecy cryptography via correlated mixing of chaotic waves in irreversible time-varying silicon chips" authored by A. Di Falco, V. Mazzone, A. Cruz & A. Fratalocchi which is provided below.

Perfect Secrecy Cryptography Via Correlated Mixing of Chaotic Waves in Irreversible Time-Varying Silicon Chips I. Time Domain Attacks: Calculation We generated chaotic states A n (t) and B n0 (t) possessing m=1, ..., M different frequencies $\omega_m = 2\pi/\lambda m$ and $\lambda m = m$, acquiring time sequences with random amplitudes $a_{nm}$, $b_{nm} \in [0,1]$, phases $\emptyset_{nm}$, $\psi_{nm} \in [0, 2\pi]$. Each generated state $A_n(t)$ and $B_n'(t)$ is then converted into a bit sequence of length L=10000 bits by the AHB technique. The AHB transformation initially applies a transform $\Delta$, such as, e.g., a convolution kernel, to the data sequence to be converted, and then uses a Gabor transform G to generate a binary sequence. For a given sequence of numbers $Y_I(I=1, \ldots, L)$, the AHB is compactly represented as follows:

$$AHB\{Y_I\} = G\{\Delta(Y_I)\}, G\{X_I\} = \begin{cases} 0, & X_I < th \\ 1, & X_I \geq th \end{cases}, \quad (1)$$

In our analysis we used a differential convolution filter $\Delta(Y_I) = \Delta \otimes Y_I = [1, -1] \otimes Y_I$, with $\otimes$ a discrete convolution, and a Gabor transform with threshold th=0. The average uncertainty per bit is evaluated as follows. After chaotic states are converted into binary sequences, we calculated the normalized hamming distanced ab among two binary sequences a and b as follows:

$$d_{ab} = \frac{1}{L} \sum_{l=1}^{L} |a_l - b_1| \quad (2)$$

This value furnishes the probability with which, on average, one bit is different in the two sequences. We then converted the resulting value to Shannon information entropy $H = -d_{ab} \log_2 d_{ab} - (1-d_{ab}) \log_2 (1-d_{ab})$. We evaluated results from a statistics of 10000 samples.

II. Active Attacks

In this scenario Eve measures the data and decides to replace the state with another one from a different chip, with $E_1, \ldots, E_p$ states according to a probability $P_{eve}$. These attacks are particularly dangerous if they allow the enemy to gain information on the key without the users being aware of that.

Figure 1:
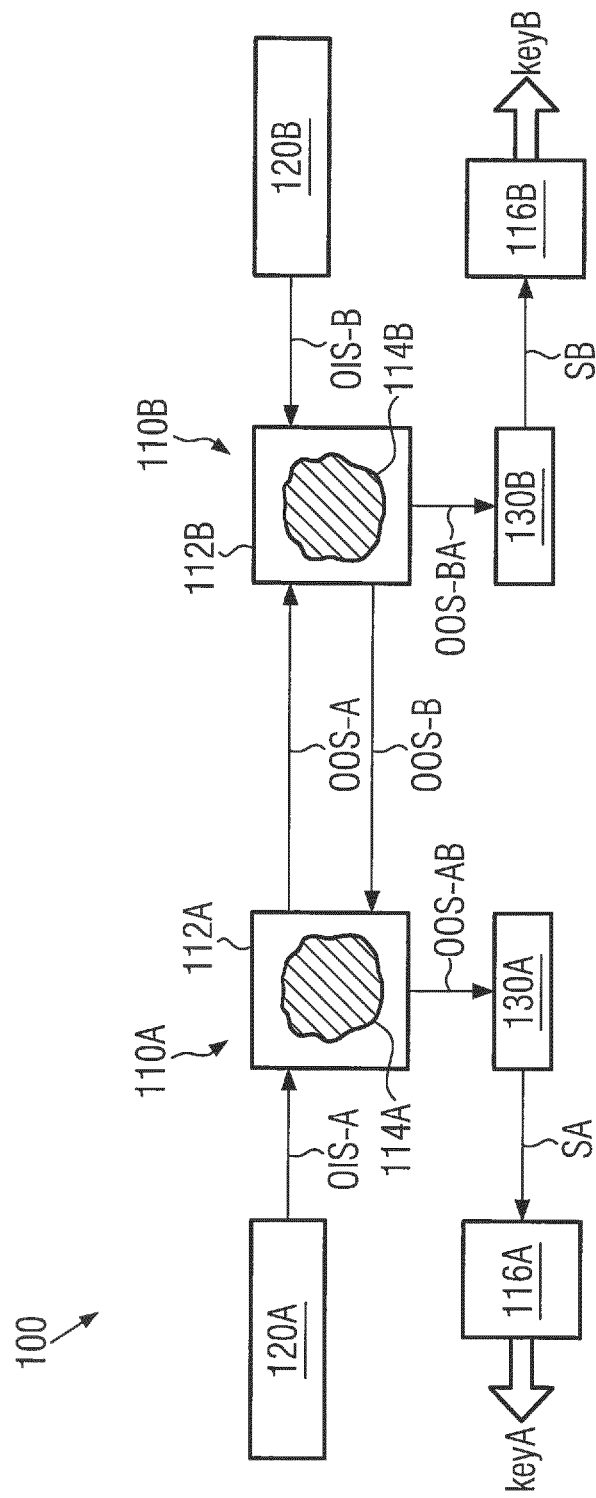

The security of the protocol of FIG. 1 of the main text arises from the fact that, when active eavesdropping happens, the users measure uncorrelated states. If Alice and Bob send out $A_i$ and Bob $B_j$, respectively, and Eve replace these states with $E_x$, Alice measures $E_x \oplus B_j$ and Bob $A_i \oplus E_x$. These states are not correlated: in the best ideal scenario the fake state $E_x$ comes from a chip with a chaotic structure that is exponentially different from the one used by Alice and Bob (point 4 of the communication scheme). If Eve replaces one state, a user measures the correct state $A_i \oplus B_j$, while the other measures an uncorrelated state, either $E_x \oplus B_j$ or $A_i \oplus E_x$. The bidirectional communication of FIG. 1 of the main text can identify these error states and minimize their presence in the final key.

Figure 17:
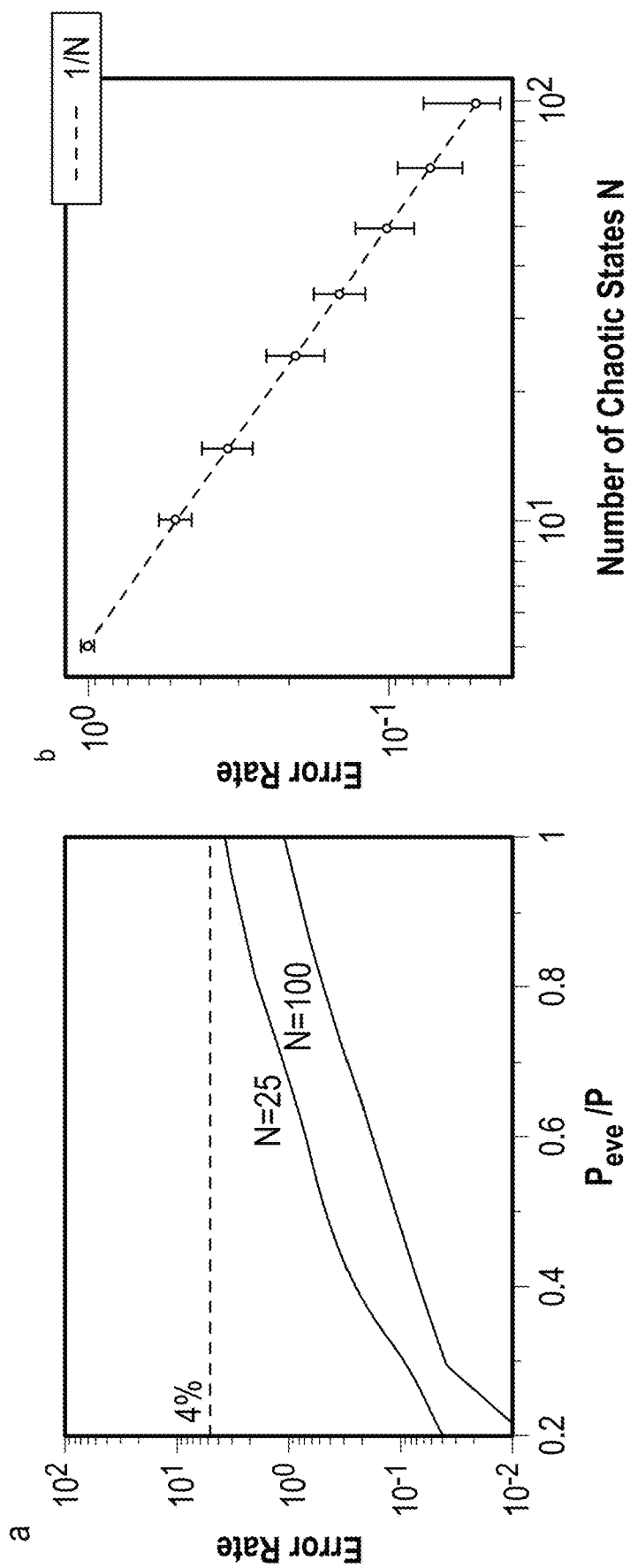

FIG. 17 illustrates the outcomes of active attacks for different probabilities of $P_{eve}$, normalized with respect to the probability chosen by the users $P_{Alice}$, $P_{Bob}$ to change state after each communication step. We considered the best scenario for Eve, in which $P_{Alice} = P_{Bob} = P$. Graph a of FIG. 17 shows that even in the best scenario $P_{eve}/P = 1$ when Eve uses the same probability of Alice and Bob, the error rate introduced in the sequences measured by the users is small and below 4% with only N=25 different chaotic waves. Graph b of FIG. 17 shows that the error rate introduced by Eve is inversely proportional to the number of chaotic states N, and for a chip with a large number of states N»1, the error rate introduced by this attack tends to zero. Error rate introduced in the communication by active intercept-resend attacks as a function of (a) the state changing probability of Eve and (b), the number of chaotic states N in each chip. The simulations are performed from the analysis of $10^7$ sequences of different states. Each element of the sequence for Alice and Bob is an integer random number $n \in [0, N]$ and $n' \in [0, N]$, respectively, representing the chaotic wavepacket generated by the input conditions n and n' in Alice and Bob chips. We assume each chip containing N independent and uncorrelated chaotic states. The generation of a new state in the sequence happens with probability P, identical for Alice and Bob. The action of Eve is simulated at each step by the substitution of a state with a new one from another chip, introducing a communication error between the repeated sequences of Alice and Bob. Eve's decision to change the state occurs with probability $P_{eve}$.

III. Sources of Uncertainty in the Communication Scheme

The uncertainty contained in the reciprocal power density spectra of Alice and Bob arises from the following uncorrelated components:

Statistical fluctuations $\Delta_s$ of source spectrum.
Noise thermal fluctuation $\Delta_c$ of the communication channel.
Fluctuations $\Delta_A$, $\Delta_B$ in the input conditions.
Uncertainty $\Delta_M$ of the measurement apparatus.
The coupling coefficient $\alpha(\omega)$: this is a systematic source of uncertainty (type B of NIST guidelines (L. E. Bassham, III, A. L. Rukhin, J. Soto, J. R. Nechvatal, M. E. Smid, E. B. Barker, S. D. Leigh, M. Levenson, M. Vangel, D. L. Banks, N. A. Heckert, J. F. Dray, and S. Vo, SP 800-22 Rev. 1a. A Statistical Test Suite for Random and Pseudorandom Number Generators for Cryptographic Applications, Tech. Rep. (Gaithersburg, MD, United States, 2010))). To evaluate $\alpha(\omega)$, the user must measure the absolute value of a spectrum and normalize it. To do so, the user must use another measurement instrument, which introduces an unknown coupling coefficient. This argument can be iterated at infinity, without the user knowing the first coefficient. It is the same problem of measuring the exact temperature of a body: one needs to know in advance the temperature of the thermometer, as it reads the equilibrium temperature between the coupled environments of the thermometer and the body.

Typical optical sources have statistical fluctuations in power amplitudes of the order of few percents. Just to make a specific example, the CL band tunable source T100S-HP from EXFO ensures an absolute wavelength accuracy better than ±20 pm and a power repeatability sweep-to-sweep better than ±0.05 dB, which implies differences as small as ±1% at every wavelength. The optics/optomechanics available today are stable to fluctuations below 10 nm, providing very little variations in measured optical observable if compared to source fluctuations. Thermal fluctuations in the communication channel are also negligible and typically few orders of magnitude smaller than the source's amplitude. Measurement instruments available today have a dynamic range in the range of tens of dB and a spectral accuracy in the range of tens of picometers, thus providing very precise reading with standard deviation much smaller than sources amplitude variations. In an typical experimental implementation, we are therefore in the situation where $\Delta_{A,B,C,M} \ll \Delta_s$.

IV. Multi-Bit AHB Transform

Figure 18:
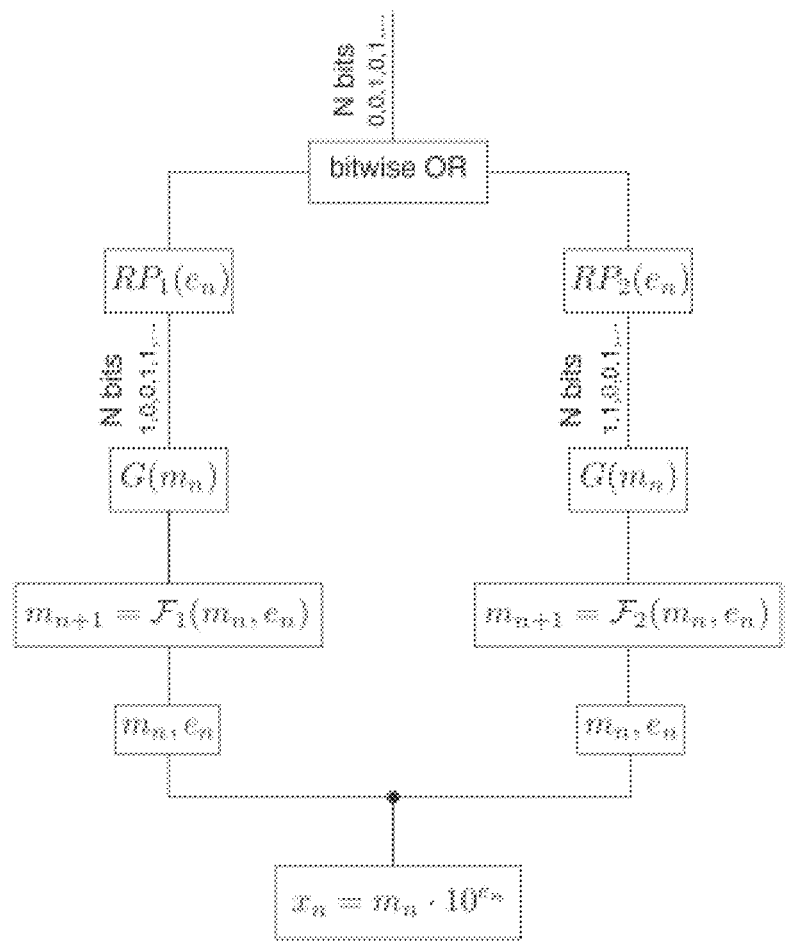

FIG. 18 provides a block scheme of the procedure. FIG. 18 is a block scheme of the multi-bit AHB transform. Each single point $x_n$ in the acquired user's spectrum is first decomposed into its mantissa $m_n$ and unsigned exponent $e_n$. The physical data generated $(m_n, e_n)$ is then modified by two nonlinear filter functions $m_n+1=F_{12}(m_n, e_n)$ N times, generating two independent data sequences that are then converted into binary by a Gabor transform with threshold th=0.5. The two generated sequences are randomly permuted consecutively in $RP_1$ and $RP_2$, by using a random seed equal to the exponent $e_n$, and finally merged together with a bitwise OR operation into a single output sequence of N bits. The nonlinear filter we used is the chaotic one dimensional tent map: $F(m_n, e_n)=\mu$ for $m_n, m_n \leq \frac{1}{2}$ and $F(m_n, e_n)\mu(1-m_n)$ for $m_n \geq \frac{1}{2}$ with variable $\mu$. We used $\mu=\mu_0+(2-\mu_0)\beta \times e_n$, with $1<\mu_0 \leq 2$ and x=1, 2 indicating each map. In the chosen range of values of $\mu_0$ and for any non-rational number $m_n$, the transformation maps the interval (0, 1) onto itself, generating white noise data with exponentially different trajectories for infinites imally different input conditions. The advantage of this map is that it possesses a Lyapunov coefficient $\lambda=\log \mu$, which can be controlled from $\lambda \sim 0$ (chaos after an infinite number of steps) to log 2=0.69 (chaos after a single iteration), allowing a fine control over the dynamics of exponential separation of nearby trajectories.

The values of the coefficients $\mu_0$, $\beta_1$ and $\beta_2$ that guarantee a minimum bit error rate (BER) among the users are calculated by training the algorithm from a dataset of PDS spectra of combined states $P_{Alice}$ and $P_{Bob}$ where:

$P_{Alice}$ is the spectrum measured by Alice.

$P_{Bob}$ is the spectrum measured by Bob.

We considered different communication scenario, in which Alice and Bob measure spectral differences $P_{Alice}-P_{Bob}$ with standard deviations $\sigma_{AB}=\sqrt{((P_{Alice}-P_{Bob})^2)} \leq 8\%$.

For each value of GAB, we generated a dataset of different chaotic spectra with the following procedure. The chaotic spectrum $P_{Alice}$ measured by Alice is generated from a random field following Eqs. (1) of the main text with 1000 different frequencies. The spectrum measured by Bob is generated as $P_{Bob}=P_{Alice}+\Delta$, with the spectral difference $\Delta$ representing the uncertainty of Bob's measure.

In our analysis we considered uncertainty $\Delta$ with $\langle \Delta \rangle=0$ and $\sqrt{\langle \Delta^2 \rangle}=\sigma_{AB}$, which represent statistical fluctuations of the source.

We find optimized values of $\mu_0$, $\beta_1$ and $\beta_2$ against the following desired quantities:

The minimal BER between the bit sequences generated by Alice and Bob at their distal end.

The average number of zeros $N_2$ contained in the key generated by each user to be 50% of the key length. This is one of the various statistical requirements for the key to appear as random as possible (L. E. Bassham, III, A. L. Rukhin, J. Soto, J. R. Nechvatal, M. E. Smid, E. B. Barker, S. D. Leigh, M. Levenson, M. Vangel, D. L. Banks, N. A. Heckert, J. F. Dray, and S. Vo, SP 800-22 Rev. 1a. A Statistical Test Suite for Random and Pseudorandom Number Generators for Cryptographic Applications, Tech. Rep. (Gaithersburg, MD, United States, 2010)).

These requirements are imposed by minimizing the norm of the following vectorial cost function C: $C(B_a, B_b, \mu_0, \beta_1, \beta_2)=(BER, 0.5-N_{za}, 0.5-N_{zb})$, (3) with $B_x$ the bit sequence generated from the chaotic spectrum of each user: Alice (x=a), Bob (x=b), BER the bit error rate between $B_a$ and $B_b$, $N_{zx}$ the number of zeros in the key of each user. For each value of N and $\sigma_{AB}$, the minimization of C is carried by a Nelder-Mead algorithm (F. Gao and L. Han, Computational Optimization and Applications 51, 259 (2012)).

Figure 2A:
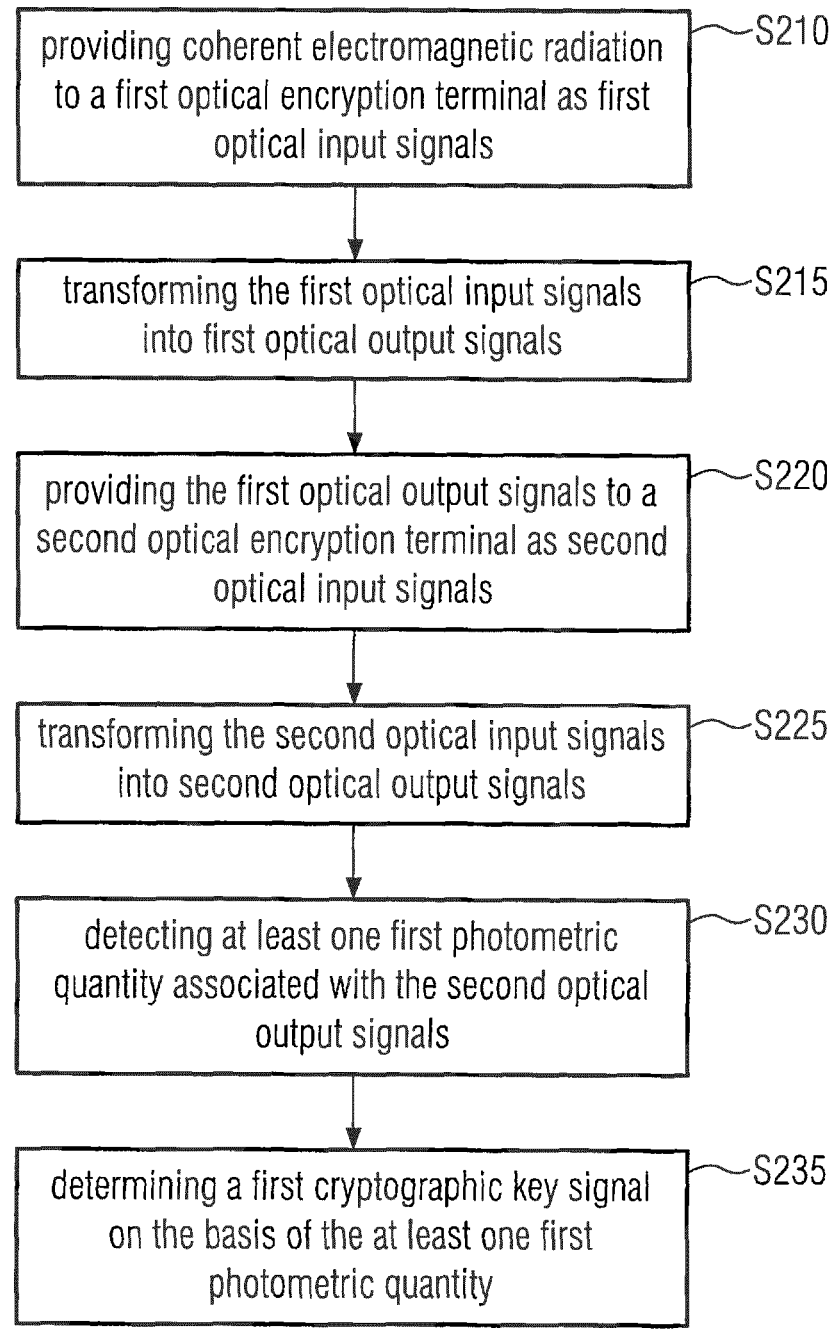
Figure 2B:
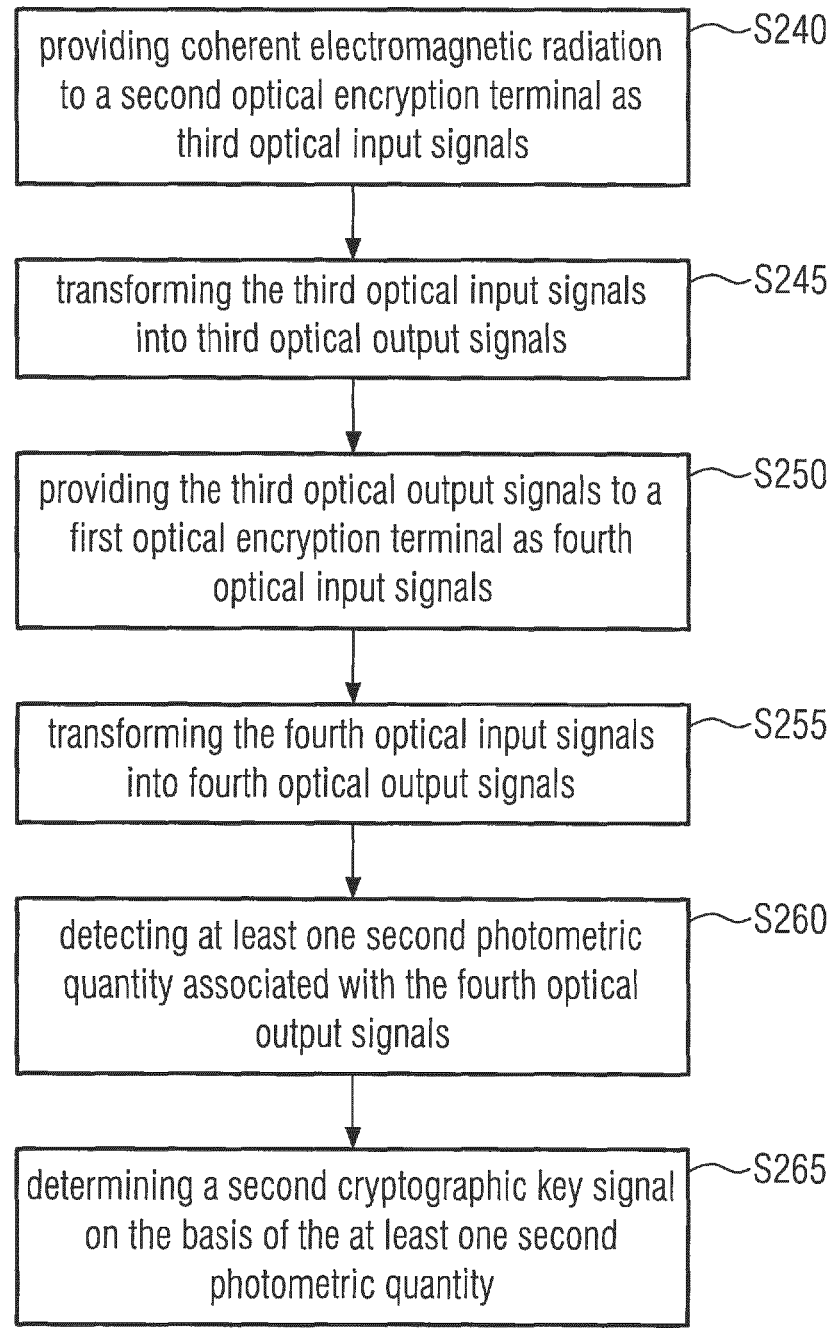
Figure 19:
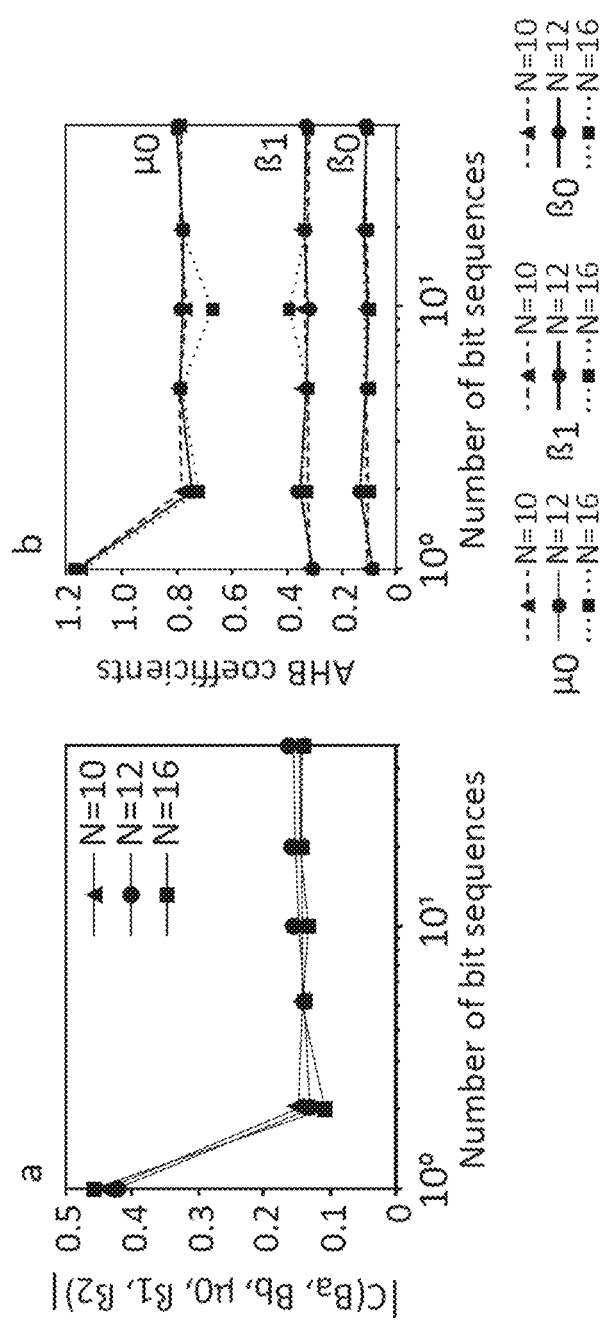

FIG. 19 shows training of the nonlinear AHB transform for generating optimized bit sequences in the case of $\sigma_{AB}=8\%$. (a) Norm of the cost function |C| and (b) optimized AHB coefficients ($\mu_0$, $\beta_1$, $\beta_2$) versus the number of bit sequences N ch composing the training dataset. FIG. 19 shows a typical training in the case of different N and $\sigma_{AB}=8\%$. Graph a of FIG. 19 plots the minimization of the cost function versus the number of bit sequences $N_{ch}$ considered in the dataset for N=10 (green), N=12 (red) and N=16 (blue). The function converges rapidly after 2 bit sequence, showing that very few spectra are necessary for training the AHB algorithm to generate optimized bit sequences. This result depends on the fact that we are generating bit sequences from chaotic spectra with universal probability density (see FIG. 2c of the main text). This implies that each spectrum has the same statistics and when a sufficiently large number of frequencies is considered, even a single spectrum is statistically representative. Graph b of FIG. 19 shows the corresponding optimized values of $\mu_0$, $\beta_1$, and $\beta_2$ for the three cases considered N=10, 12, 16.

They all converge to the same value independently from the N considered. The same result is observed by fixing N and changing $\sigma_{AB}$: optimized $\mu_0$, $\beta_1$, and $\beta_2$ converge to the same value (not shown here for simplicity). This implies that the desired cost function C has a global minimum that allows to generate optimized bit sequences irrespective of the input conditions N and $\sigma_{AB}$.

Figure 20:
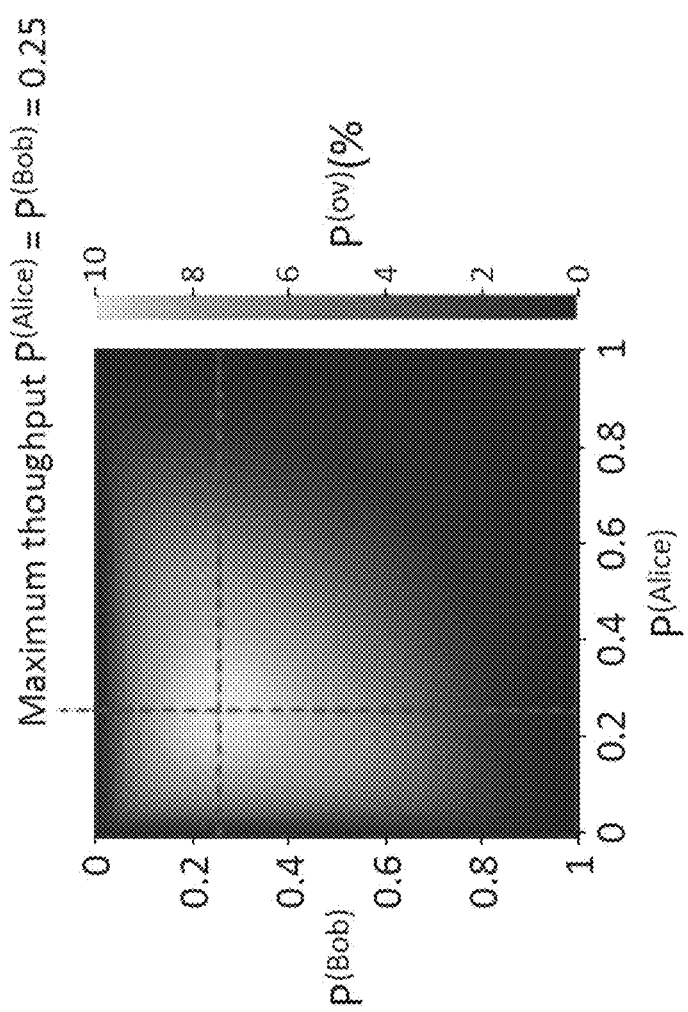

FIG. 20 shows probability $P^{(ov)}$ of observing repeated states at the same position in Alice and Bob's sequences as a function of the users probabilities $P^{(Alice)}$ and $P^{(Bob)}$ to change state after each repeated communication. The calculations are performed on a statistical sample of 1000 sequences, each of 100000 states.

V. Billiard Dynamics Simulations: Computational Details

Figure 21:
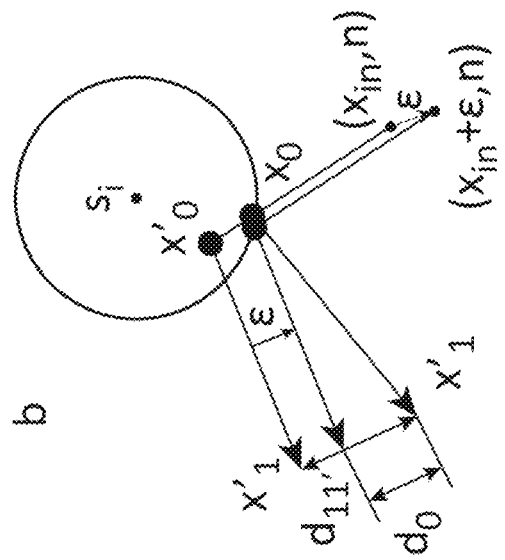
Figure 21:
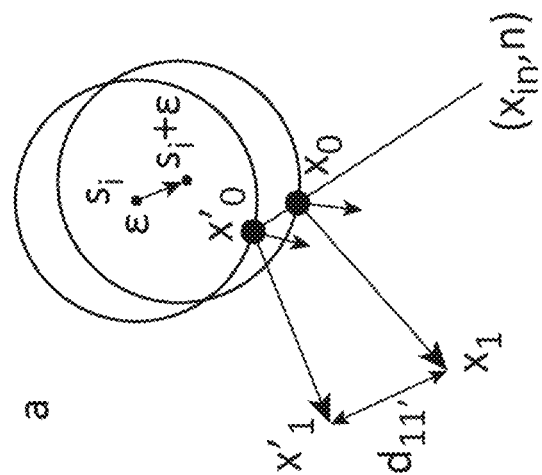

FIG. 21 shows geometrical calculation of reflected trajectories of an identical input condition impinging two scatterers displaced by $\epsilon$(a). Equivalent calculation in a configuration in which the scatter is held fixed.

Figure 3:
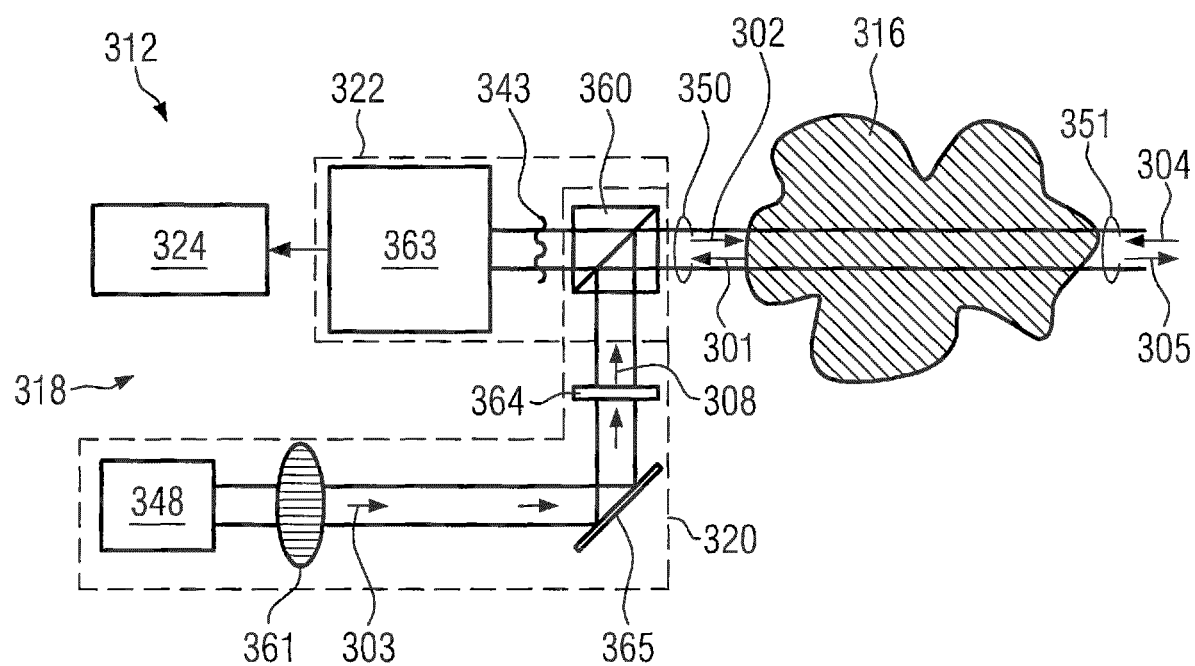

Optical billiards are mathematical models for the study of chaos of classical and quantum waves propagating into microresonators. They study the particle dynamics of light following the motion of light rays inside the resonator, with elastic reflection at the boundary due to snell law (E. Ott, Chaos in Dynamical Systems, 2nd ed. (Cambridge University Press, 2002); N. Chernov and R. Markarian, Chaotic billiards (American Mathematical Society, 2006)). In the fingerprint resonators of FIG. 3 of the main text, the dynamics starts from an initial position $x_0=(x_0, y_0)$ and initial velocity vector $n=(n_x, n_y)=(\cos \alpha, \sin \alpha)$, evolving the particle position x at t+Δt by:

$$\begin{cases} x(t+\Delta t) = x_0 + n_x \Delta t. \\ y(t+\Delta t) = y_0 + n_y \Delta t. \end{cases} \quad (4)$$

as long as the particle does not collide with a scatterer. When this event happens at $x_1=(x_1, y_1)$, the particle is reflected on the scatterer surface along the new velocity vector $n_1$, and motion (4) starts again until the next collision.

A trajectory in the billiard evolution consists in the map $M=(x_0, x_1, \ldots, x_n)$ of the collision points at successive times until the particle escapes the billiard. As the particle motion is strongly chaotic, it is important not to use any numerical iterative solution for evaluating the scattering collision points $(x_0, x_1, \ldots, x_n)$. In our study, we employ analytic solutions for calculating the intersection points between the trajectory of (4) and the scatterers, in order to estimate the properties of the chaotic dynamics as accurately as possible.

The calculation of the Lyapunov exponent follows from the algorithm detailed in E. Ott, Chaos in Dynamical Systems, 2nd ed. (Cambridge University Press, 2002). The phase space of input conditions is represented by all the possible input vectors starting from an initial position $x_0$ (0, $y_0$) displaced along the y axis, and directed along all the possible directions $n=(\cos \alpha, \sin \alpha)$ with $$a \in \left[-\frac{\pi}{2}, \frac{\pi}{2}\right].$$

For each input condition $(x_0, n)$, we add the smallest spatial displacement representable at the computer and evolve the dynamics $(x_0, n)$ and $(x'_0=x_0+\epsilon, n)$, calculating the collisions maps $M=(x_0, x_1, \ldots, x_n)$ and $M'=(x'_0, x'_1, \ldots, x'_n)$ at successive iterations. We then evaluate the largest Lyapunov exponent by μ=1/n log.

$$\mu = \frac{1}{n} \log \cdot \frac{|x_n - x'_n|}{x_n - x'_n}.$$

The average Lyapunov exponent is computed by average (μ) over the space of different input positions $y_0 \in [-L, L]$, and angular orientations $n=(\cos \alpha, \sin \alpha)$.

Figure 22:
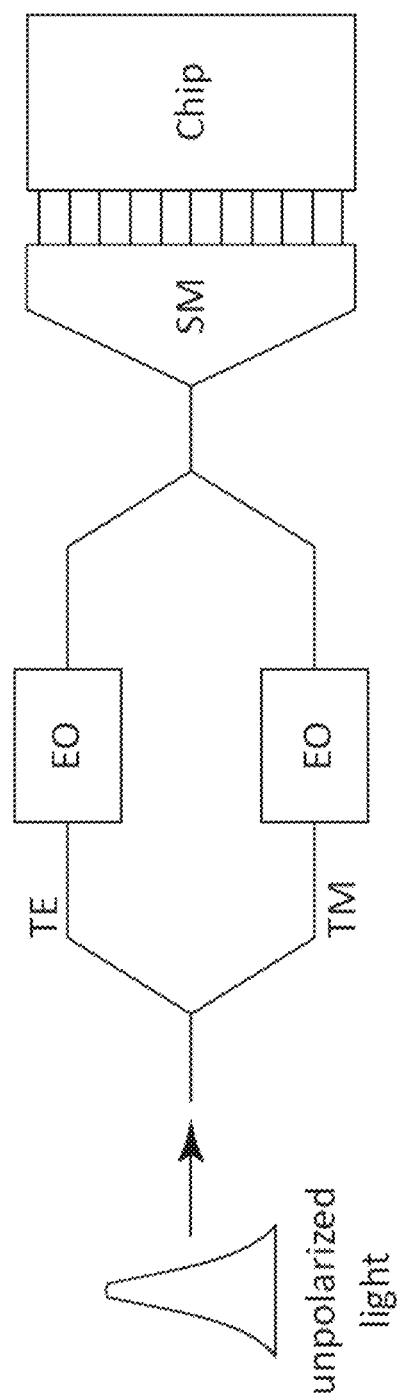

FIG. 22 is a block scheme for integrated ultrafast light modulation with on-chip light couplings from end-to-end of the communication line: (EO: electro-optic modulator, SM: switch matrix).

Figure 23:
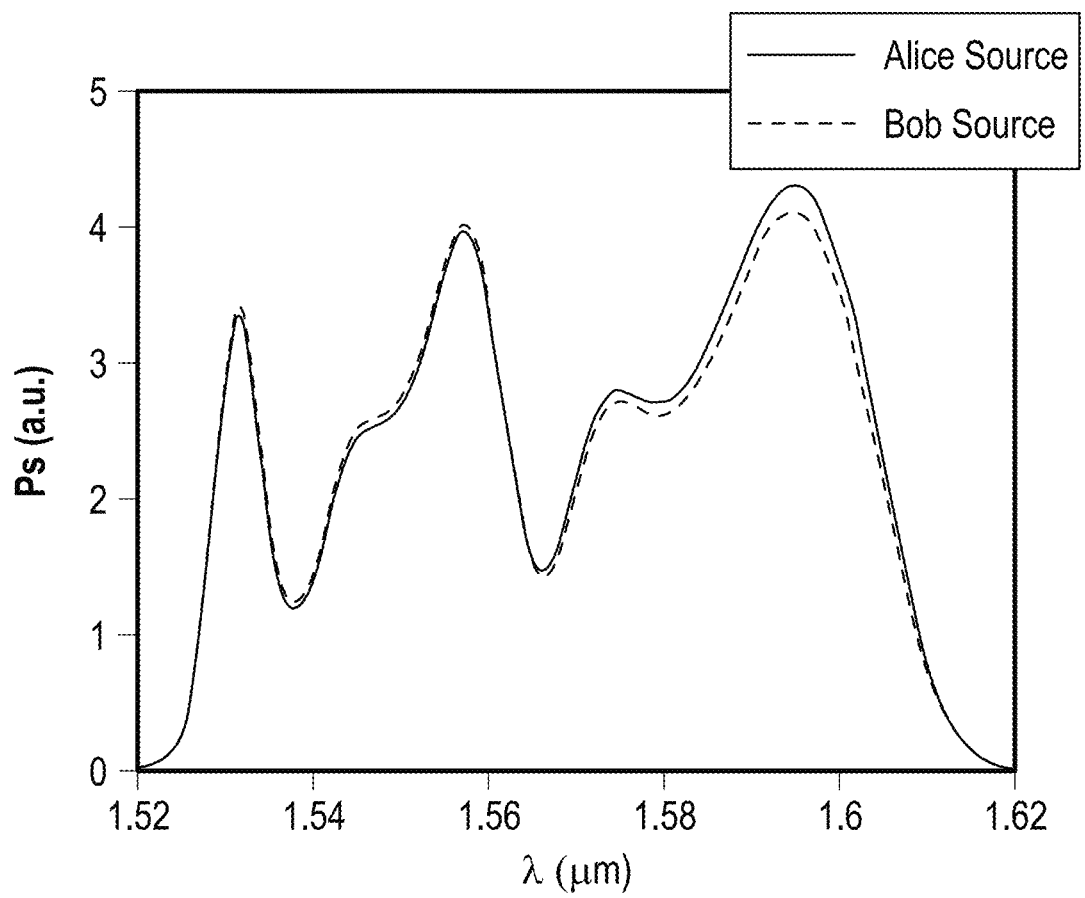

FIG. 23 shows power density spectrum $P_s(\omega)$ of the source used by Alice (red line) and Bob (blue line), measured with the spectrometer used by each user.

VI. Dynamic Exponential Separation of Identical Input Conditions in Transformed Fingerprint Billiards We consider the propagation of identical input conditions in billiard structures subjected to infinitesimal displacement of the scatterers positions $s'_i \to s_i + \epsilon$, being epsilon an infinitesimal quantity along an arbitrary direction of the space. The collision maps arising from the dynamics of same input condition launched in the original and displaced billiard are denoted as $M=(x_0, x_1, \ldots, x_n)$ and $M'=(x'_0, x'_1, \ldots, x'_n)$, respectively.

To demonstrate that the evolution represented by M and M' undergo exponential separation, we used mathematical induction. We begin by considering the dynamics at the first collision points $x_0$ and $x'_0$ starting from an identical input condition $(x_{in}, n)$. Graph a of FIG. 21 shows the geometrical calculation of the reflected trajectories, which impinge in the successive scatterer in the new collision points $x_1$, $x'_1$. FIG. 21 shows how the same construction can be obtained in an equivalent configuration by fixing the position of the scatterer to the original unmodified billiard, and displacing the input condition by the same infinitesimal transformation E applied to the scatterer. The resulting distance among new collision points $d_{11}'$ can then expressed by:

$$d_{11}' \sim d_0 - \epsilon. \quad (5)$$

being $d_0$ the distance between the collision points as if they were originated from the unmodified billiard. As the latter is fully chaotic, the distance $d_0 = \epsilon e^\mu$ grows exponentially with respect to the original displacement $\epsilon$. This implies that the distance $d_{11}' = \epsilon e^\mu + \sim \epsilon e^\mu$ also grows exponentially. We now consider the n+1-th collision $(x_{n+1}, \ldots, x'_{n+1})$, assuming that the distance $d_{n,n}=|x_n-x'_n| \sim e^{\mu n}$ after the n-th collision grew exponentially. By repeating the same construction of FIG. 21, we obtain that the distance at the n+1 collision grows exponentially. By induction, this implies that the distance of the trajectories originated by an identical input condition in the original and modified billiards grow exponentially at the beginning and keeps increasing exponentially at every collision. For this family of transformations all trajectories will be affected and no old trajectory is observed in the modified billiard, as there will be at least one different reflection that will induce an exponentially diverging motion.

Figure 24:
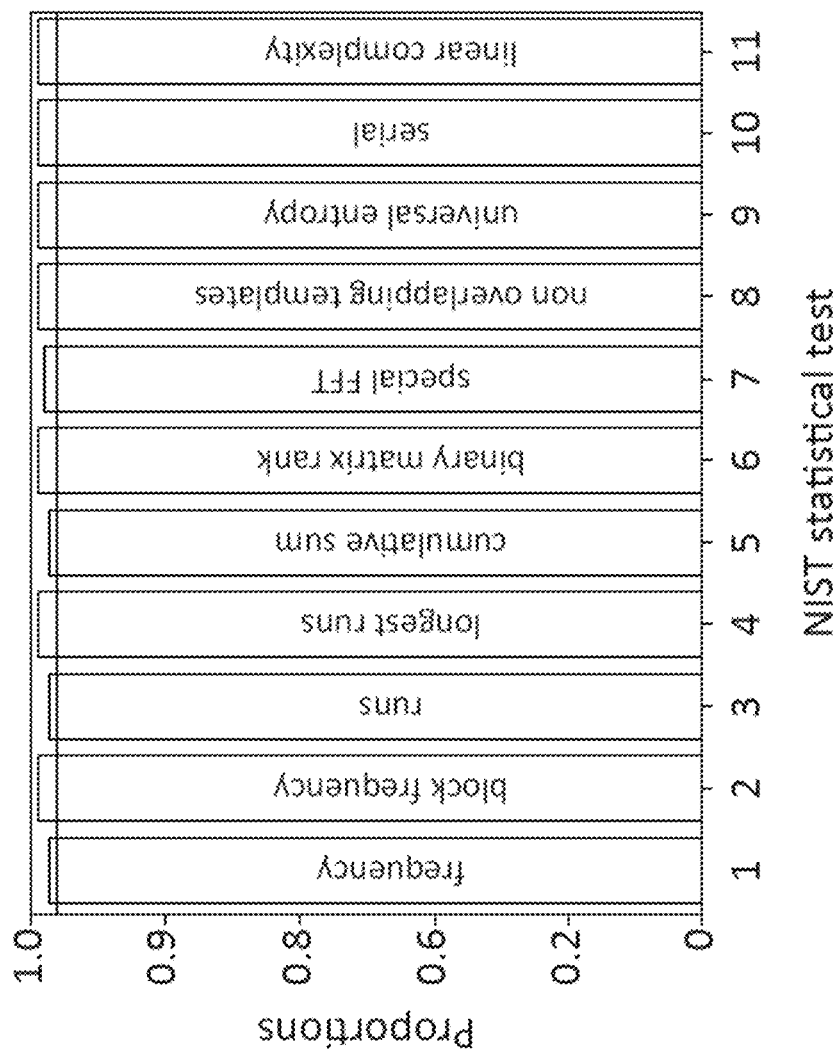

A similar result can be obtained by adding different scatterers to the fingerprint pattern, in the limit when each new scatterer is hit at least one time during the dynamics of one input condition in the unmodified structure. This is demonstrated as follows. Let us consider first the case of the addition of a single scatterer. Two identical input conditions in the original and modified resonator observe the same trajectory until one ray hits the new scatterer. From this point, one trajectory is reflected at a different angle. In a fully chaotic structure, this implies the creation of a trajectory that diverges exponentially form the first one. The addition of one scatterer generates a new family of exponentially diverging trajectories for all input conditions that, in the unmodified resonator, generated trajectories hitting the new scatter. When a sufficiently large number of scatterers is added and all input conditions hit at least a new scatter, all trajectories are modified exponentially. FIG. 24 shows statistical tests on generated keys. Proportions results on NIST statistical tests for cryptography applications from a statistic population of 1000 keys each of 1000 bits. The red line indicates the minimum threshold to pass each test.

VII. Integrated on-Chip Implementation with Ultrafast Light Modulation

Figure 4:
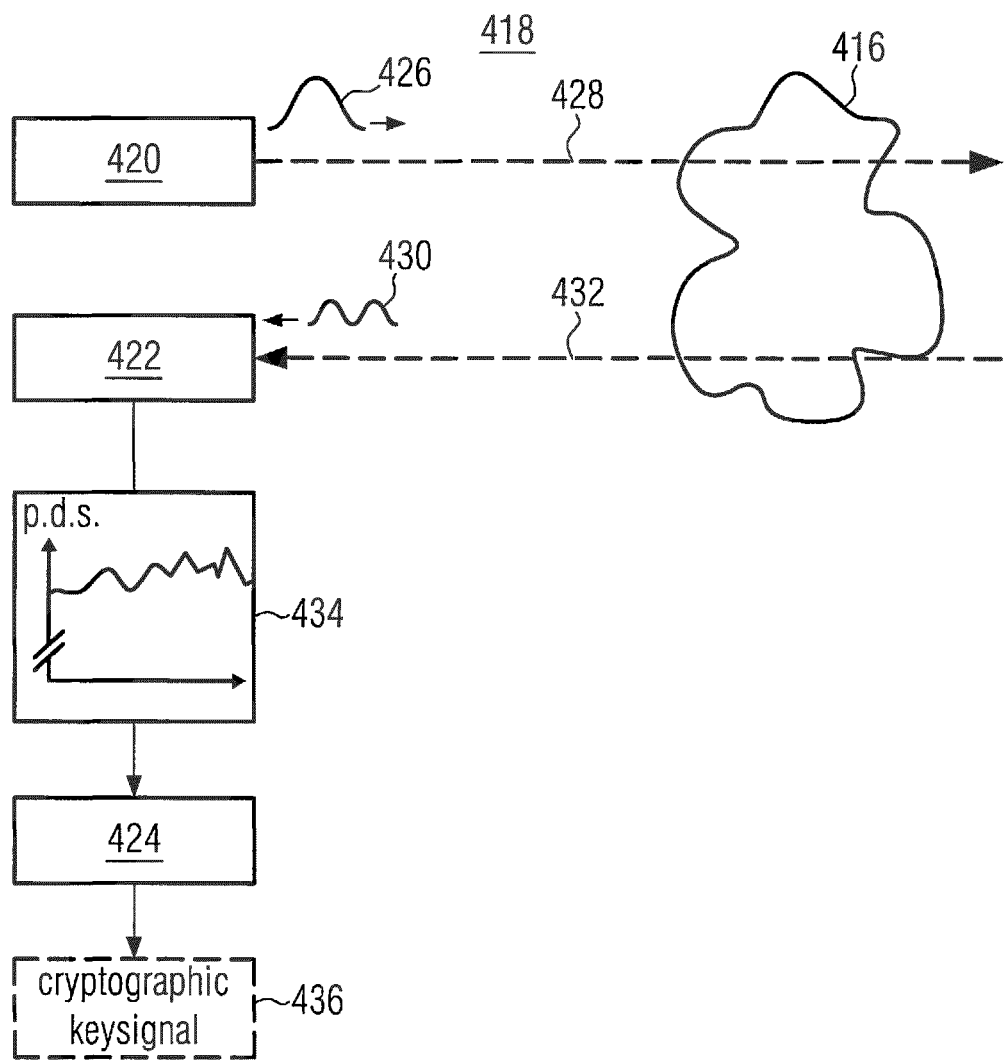
Figure 5:
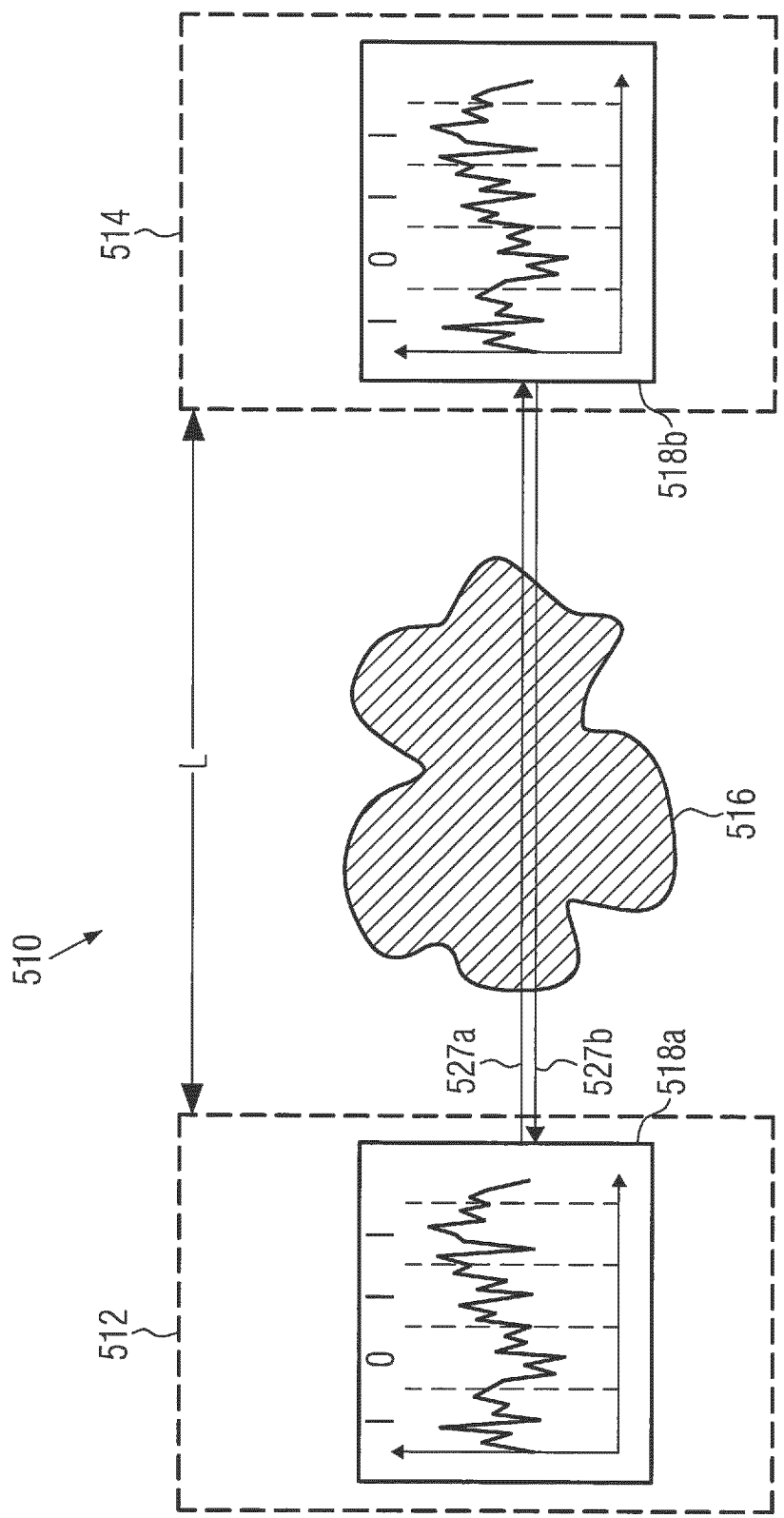
Figure 6A:
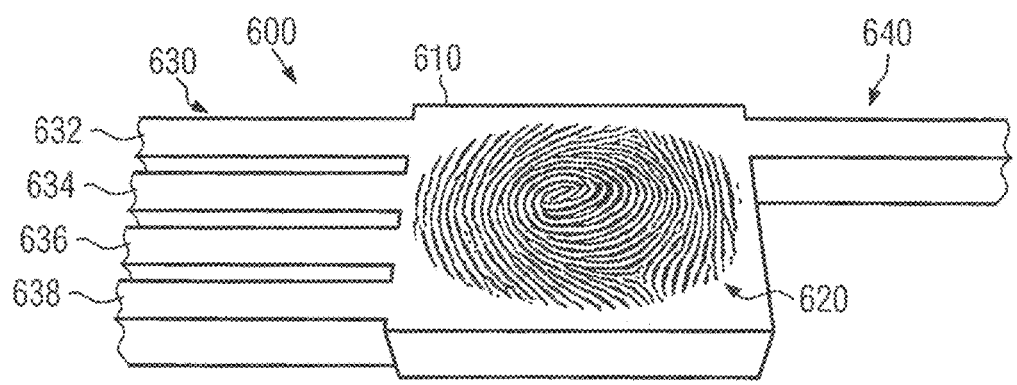
Figure 6B:
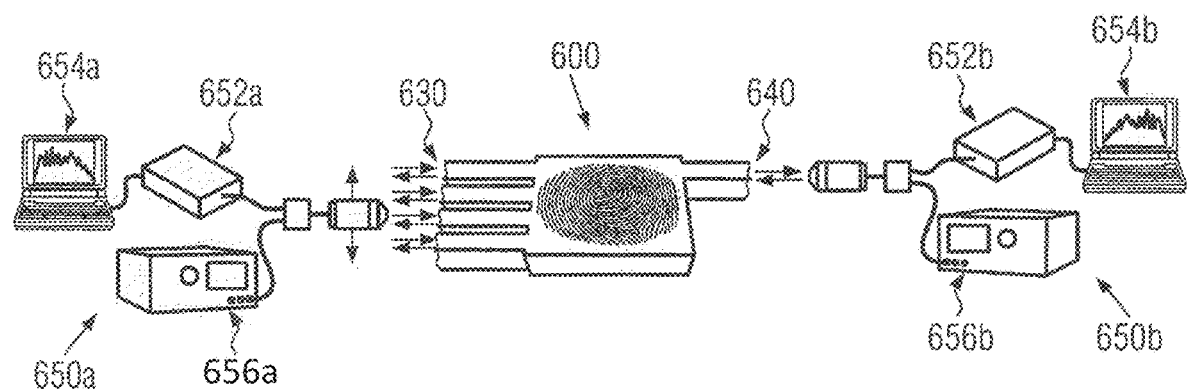
Figure 6C:
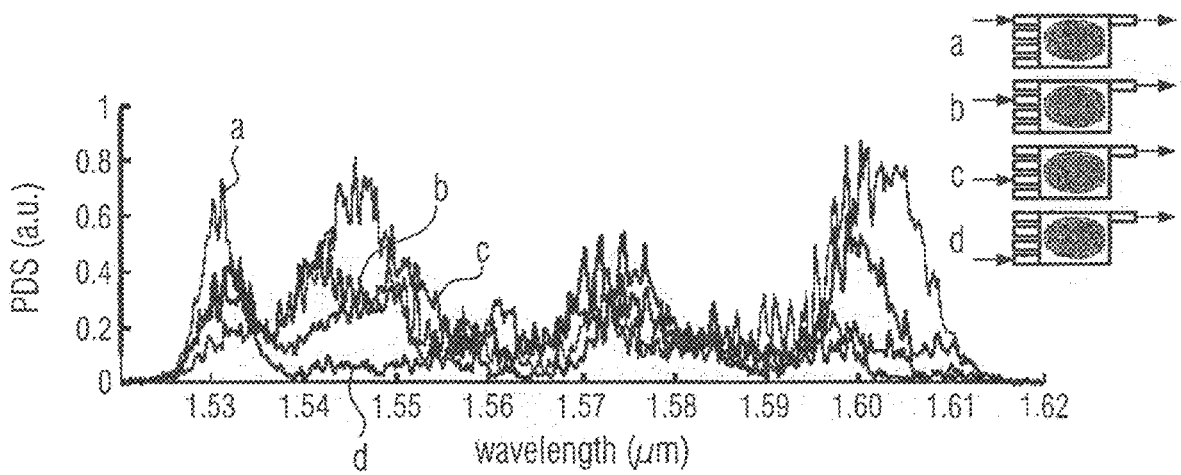
Figure 6D:
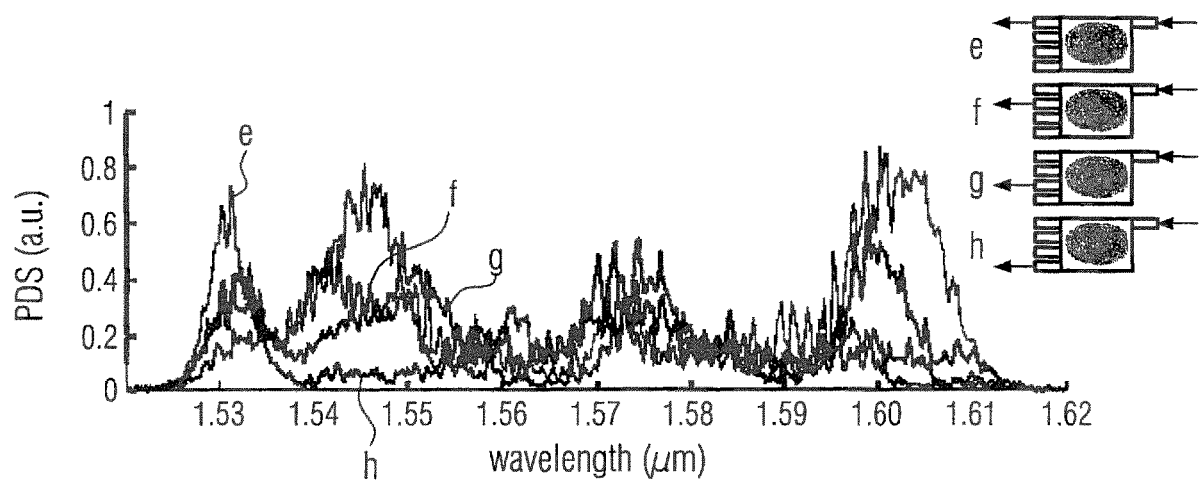
Figure 6E:
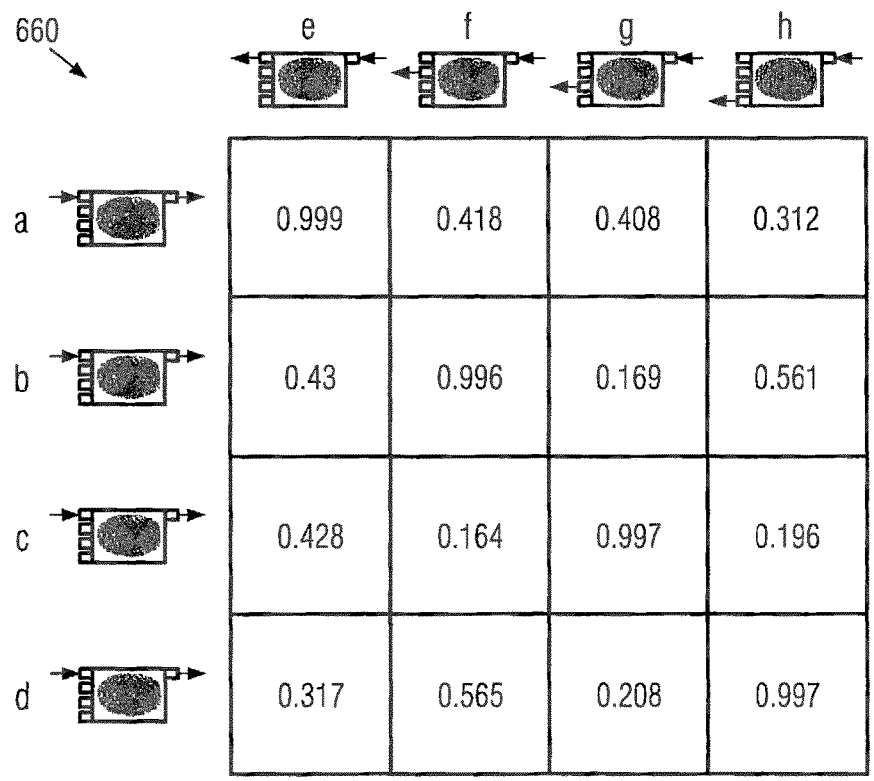
Figure 7:
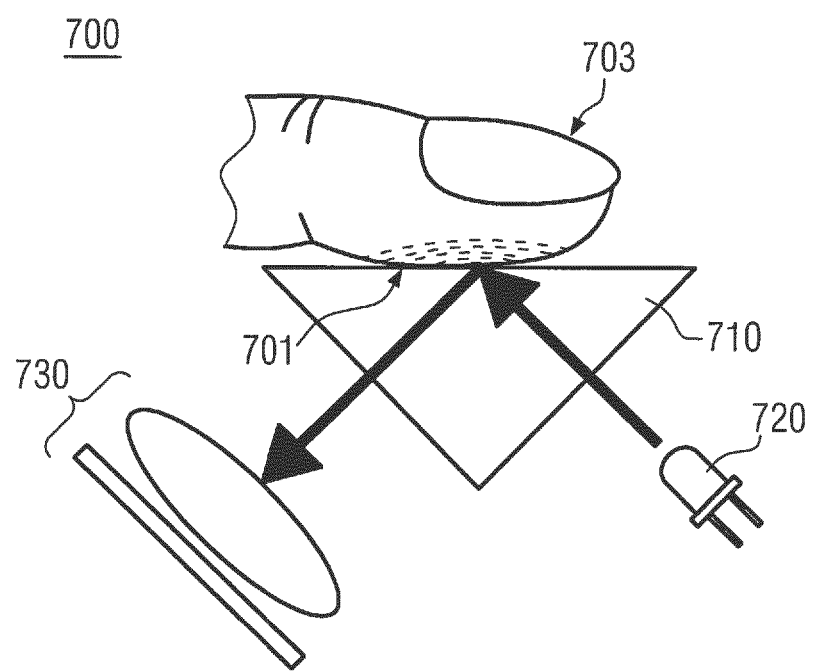
Figure 9:
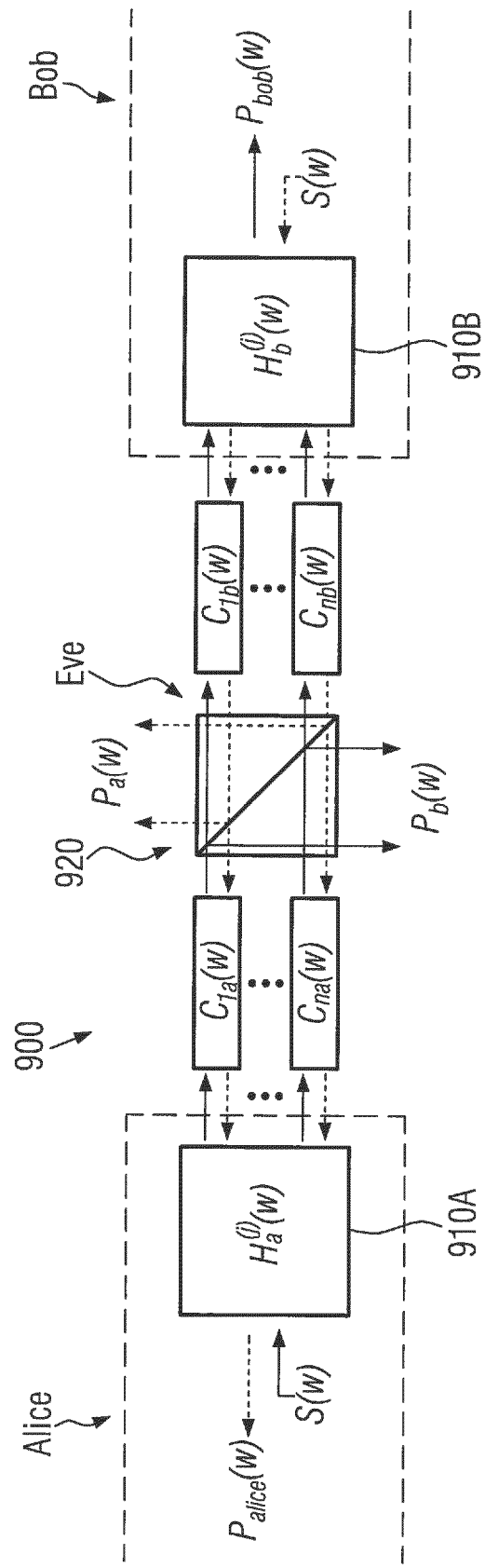
Figure 10A:
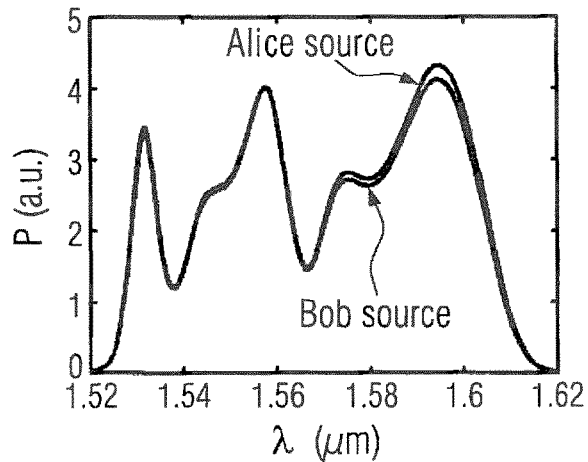
Figure 10C:
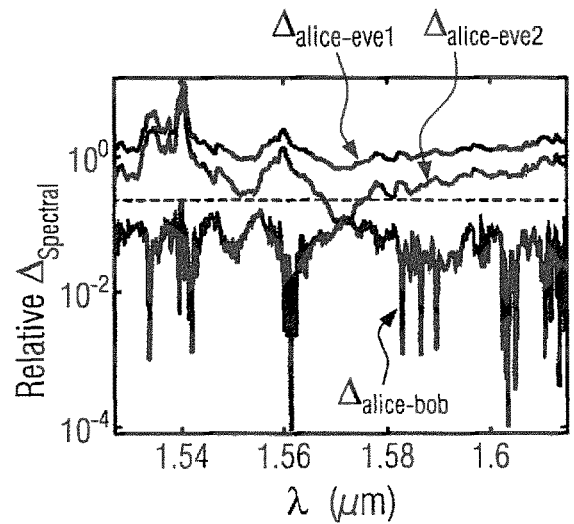
Figure 10B:
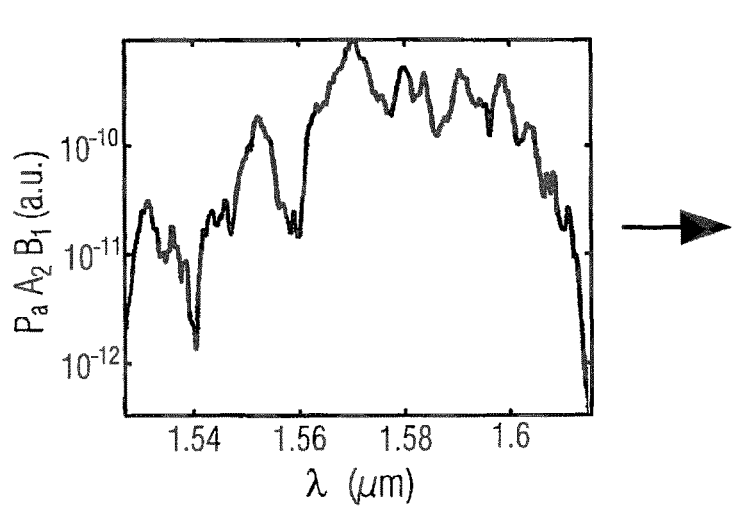
Figure 10D:
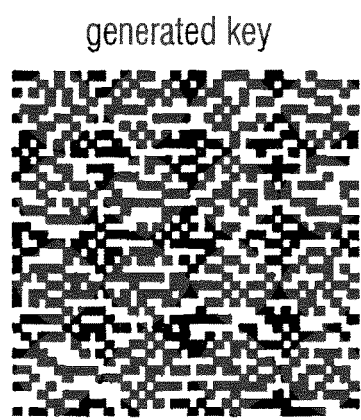

The integrated nature of the fingerprint chips opens to ultrafast modulations with integrated light couplings. While the implementation of a high-dense device of this type goes beyond the scope of this paper, we here discuss a possible implementation with the technology currently available. The results of FIG. 4c show that the fingerprint chip, at every spatial point, generates uncorrelated data sequences from TE and TM polarized light. The use of different input position and light polarizations can be combined into the block scheme of FIG. 22. The initial stage it is composed of a modified Mach-Zender, excited by an unpolarized source, or equivalently a combination of TE and TM polarized light sources. The Mach-Zender interferometer is composed by a y-junction fiber polarization splitter, followed by two ultra-fast electro-optical (EO) modulators and a final y-junction for recombining the two polarization arms. The output fiber is then connected to a 1×N optical switch matrix (R. Stabile, A. Albores-Mejia, A. Rohit, and K. A. Williams, Microsystems & Nanoengineering 2, 15042 EP (2016), review Article).

Both EO modulators and switch matrices can provide modulations up to hundreds of GHz and with hundreds of channels with the technology currently available (R. Stabile, A. Albores-Mejia, A. Rohit, and K. A. Williams, Microsystems & Nanoengineering 2, 15042 EP (2016), review Article), thus providing ultrafast selection of the input position on the fingerprint chip without the use of any mechanical component. The output light from the optical switch is then directly fed on the fingerprint chip via multi-tapered channels couplers (F. E. Doany, B. G. Lee, S. Assefa, W. M. Green, M. Yang, C. L. Schow, C. V. Jahnes, S. Zhang, J. Singer, V. I. Kopp, et al., Journal of Lightwave Technology 29, 475 (2010); V. R. Almeida, R. R. Panepucci, and M. Lipson, Optics letters 28, 1302 (2003); Y. Vlasov, W. M. Green, and F. Xia, Nature photonics 2, 242 (2008)), providing on-chip couplings from end-to-end to the communication line. With this integrated structure, it is possible to achieve the generation of $4 \cdot N^2$ different spectra at each communication.

The invention claimed is:

1. An optical encryption terminal for generating cryptographic keys in a cryptography key distribution system, the optical encryption terminal comprising an electronic processing unit, wherein the optical encryption terminal is configured to:
   in a first mode,
      receive first optical input signals from a source of electromagnetic radiation;
      output first optical output signals to a further optical encryption terminal; in a second mode,
      receive second optical input signals from a further optical encryption terminal;
      output second optical output signals to a detection element, the second optical output signals being based on the second optical input signals being transformed in accordance with an optical encryption pattern provided at the optical encryption terminal; and
   determine, using the electronic processing unit, a cryptographic key based on at least a radiometric and/or photometric quantity associated with the second optical output signals detected by the detection element.

2. The optical encryption terminal of claim 1, wherein the optical encryption pattern comprises a plurality of regions of a first material randomly arranged in a second material, wherein the first and second materials differ in at least one optical characteristic from each other.

3. The optical encryption terminal of claim 2, wherein the first material has a greater absorptive and/or transmissive and/or diffractive characteristic with regard to the electromagnetic radiation than the second material.

4. The optical encryption terminal of claim 2, wherein the plurality of regions of the first material is arranged in accordance with a random and/or chaotic and/or predefined scattering pattern.

5. The optical encryption terminal of claim 1, wherein the optical encryption pattern is formed in a photonic nanostructure.

6. A cryptography key distribution system, comprising:
   a first optical encryption terminal configured to transform optical input signals into optical output signals in accordance with a first optical encryption pattern provided at the first optical encryption terminal;
   a second optical encryption terminal configured to transform optical input signals into optical output signals in accordance with a second optical encryption pattern provided at the second optical encryption terminal;
   a first detection element configured to detect at least one first radiometric and/or photometric quantity associated with first optical output signals of the first optical encryption terminal, the first optical output signals being based on second optical input signals being successively transformed by the second and first optical encryption terminals;
   a second detection element configured to detect at least one second radiometric and/or photometric quantity associated with second optical output signals of the second optical encryption terminal, the second optical output signals being based on first optical input signals being successively transformed by the first and second optical encryption terminals;
   a first electronic processing unit configured to determine a first cryptographic key signal based on the at least one first radiometric and/or photometric quantity detected by the first detection element; and
   a second electronic processing unit configured to determine a second cryptographic key signal based on the at least one second radiometric and/or photometric quantity detected by the second detection element.

7. The cryptography key distribution system of claim 6, wherein the each of the first and second optical encryption patterns comprises a plurality of regions of a first material randomly arranged in a second material, wherein the first and second materials differ in at least one optical characteristic from each other.

8. The cryptography key distribution system of claim 7, wherein the first material has a greater absorptive and/or transmissive and/or diffractive characteristic with regard to the electromagnetic radiation than the second material.

9. The cryptography key distribution system of claim 6, wherein the plurality of regions of the first material is arranged in accordance with a random and/or chaotic and/or predefined scattering pattern of a respective optical encryption terminal.

10. The cryptography key distribution system of claim 6, wherein each of the first and second optical encryption patterns is formed in a photonic structure.

11. The cryptography key distribution system of claim 6, wherein each of the first and second optical encryption patterns comprises an additional scatterer.

12. The cryptography key distribution system of claim 11, wherein the additional scatterer comprises one of a material containing a liquid with colloidal inclusion, a material continuously deformable with temperature, pressure, light or electrical signals, an elasto optic metamaterial, and a metamaterial based optical device.

13. A method of generating cryptographic keys in a cryptography key distribution system, the method comprising:
- transforming first optical input signals at a first optical encryption terminal into first optical output signals in accordance with a first optical encryption pattern formed at the first optical encryption terminal;
- providing a second optical encryption terminal with the first optical output signals as second optical input signals;
- transforming the second optical input signals into second optical output signals in accordance with a second optical encryption pattern formed at the second optical encryption terminal;
- detecting at least a radiometric and/or photometric quantity associated with the second optical output signals; and
- determining a first cryptographic key based on the radiometric and/or photometric quantity.

14. The method of claim 13, further comprising:
- providing the second optical encryption terminal with electromagnetic radiation of a second source of electromagnetic radiation as third optical input signals;
- transforming the third optical input signals into third optical output signals in accordance with the second optical encryption pattern;
- providing the first optical encryption terminal with the third optical output signals as fourth optical input signals;
- transforming the fourth optical input signals into fourth optical output signals in accordance with the first optical encryption pattern;
- detecting at least one second radiometric and/or photometric quantity associated with the fourth optical output signals; and
- determining a second cryptographic key based on the at least one detected second photometric quantity.

15. The method of claim 14, wherein the first and second cryptographic keys are identical.

16. The method of claim 14, wherein each of the first and second optical encryption terminals has at least two input terminals configured for receiving optical input signals generated by a generated by a source of electromagnetic radiation, the method further comprising:
- for at least one of the first and second optical encryption terminals, selecting an input terminal of a selected optical encryption terminal and providing optical input signals to the selected optical encryption terminal via the selected optical input terminal.

17. The method of claim 16, wherein in response to measuring an optical signal in response to the optical input signals input via the selected optical input terminal, repeating the selecting of an input terminal and the measuring of optical output signals until all input terminals are selected, recording all cases of measured optical signals and providing the recorded cases at each of the first and second optical encryption terminals, extracting at least one optical signal of the measured optical signals which is identical at the first and second optical encryption terminals, and generating a key based on the extracted optical signal at the first and second optical encryption terminals.

18. The method of claim 13, wherein the first and/or second optical encryption patterns are modified before and after each communication.

19. The method of claim 18, wherein the first and/or second optical encryption patterns are modified by a reversible or irreversible mechanical deformation applied to the first and/or second optical encryption patterns.

* * * * *